(12) United States Patent
Yamashita et al.

(10) Patent No.: US 7,041,380 B2
(45) Date of Patent: May 9, 2006

(54) PACKAGING MATERIAL FOR BATTERY

(75) Inventors: Rikiya Yamashita, Shinjuku-Ku (JP);
Yoichi Mochizuki, Shinjuku-Ku (JP);
Kazuki Yamada, Shinjuku-Ku (JP);
Masataka Okushita, Shinjuku-Ku (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 575 days.

(21) Appl. No.: 10/362,048

(22) PCT Filed: Jun. 17, 2002

(86) PCT No.: PCT/JP02/06018

§ 371 (c)(1),
(2), (4) Date: Feb. 20, 2003

(87) PCT Pub. No.: WO03/001618

PCT Pub. Date: Jan. 3, 2003

(65) Prior Publication Data
US 2003/0180609 A1 Sep. 25, 2003

(30) Foreign Application Priority Data

| Jun. 20, 2001 | (JP) | ............................. 2001-186110 |
| Jun. 20, 2001 | (JP) | ............................. 2001-186136 |
| Aug. 6, 2001  | (JP) | ............................. 2001-237447 |
| Sep. 20, 2001 | (JP) | ............................. 2001-286578 |

(51) Int. Cl.
*H01M 2/02* (2006.01)
*B32B 27/32* (2006.01)

(52) U.S. Cl. ...................... 428/516; 428/212; 429/127; 429/162; 429/176

(58) Field of Classification Search ................ 428/516, 428/212; 429/162, 127, 176
See application file for complete search history.

(56) References Cited

U.S. PATENT DOCUMENTS

| 4,186,240 A  | * | 1/1980 | Matsuda et al. ............. 428/349 |
| 6,218,017 B1 | * | 4/2001 | Yamashita et al. ........ 428/424.2 |
| 6,761,994 B1 | * | 7/2004 | Yamashita et al. ........... 429/171 |
| 6,841,298 B1 | * | 1/2005 | Yamashita et al. ........... 429/179 |

(Continued)

FOREIGN PATENT DOCUMENTS

EP  0 997 954 A1  5/2000

(Continued)

OTHER PUBLICATIONS

BE 741856 (1970), Derwent Abstract "Gould National Batteries".*

(Continued)

*Primary Examiner*—D. Lawrence Tarazano
(74) *Attorney, Agent, or Firm*—Oliff & Berridge, PLC

(57) ABSTRACT

Disclosed is a packaging material for forming an armor body for a battery, the armor body being adapted for use in such a manner that a battery body is inserted into the armor body and the peripheral edge of the armor body is then heat sealed for hermetic sealing, the packaging material being a laminate comprising at least a substrate layer, an adhesive layer, a barrier layer, a dry laminate layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer. This battery packaging material can impart moisture barrier properties and resistance to contents of the battery.

29 Claims, 29 Drawing Sheets

U.S. PATENT DOCUMENTS

2002/0142178 A1* 10/2002 Yamashita et al. .......... 428/461
2002/0164471 A1* 11/2002 Petricca et al. ............. 428/220
2004/0029001 A1*  2/2004 Yamazaki et al. .......... 429/176
2005/0136324 A1*  6/2005 Yamada et al. ............. 429/175

FOREIGN PATENT DOCUMENTS

| JP | 2000-133219 | 5/2000 |
| JP | 2001-093482 | 4/2001 |
| JP | 2001-102011 | 4/2001 |
| WO | WO99/40634 | 8/1999 |

OTHER PUBLICATIONS

JP 11086842 (Mar. 1999) Derwent Abstract "Showa Aluminum Corp".*

* cited by examiner

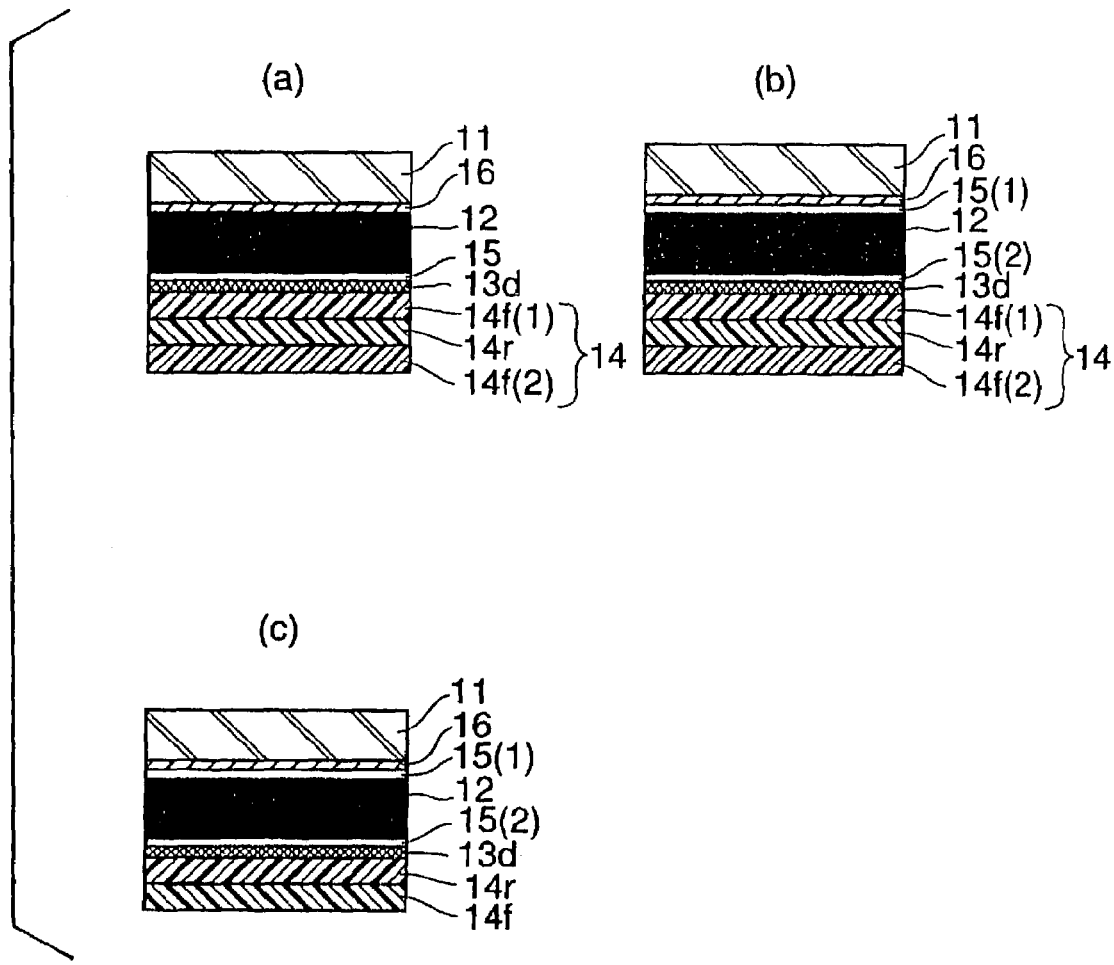
F I G. 1B

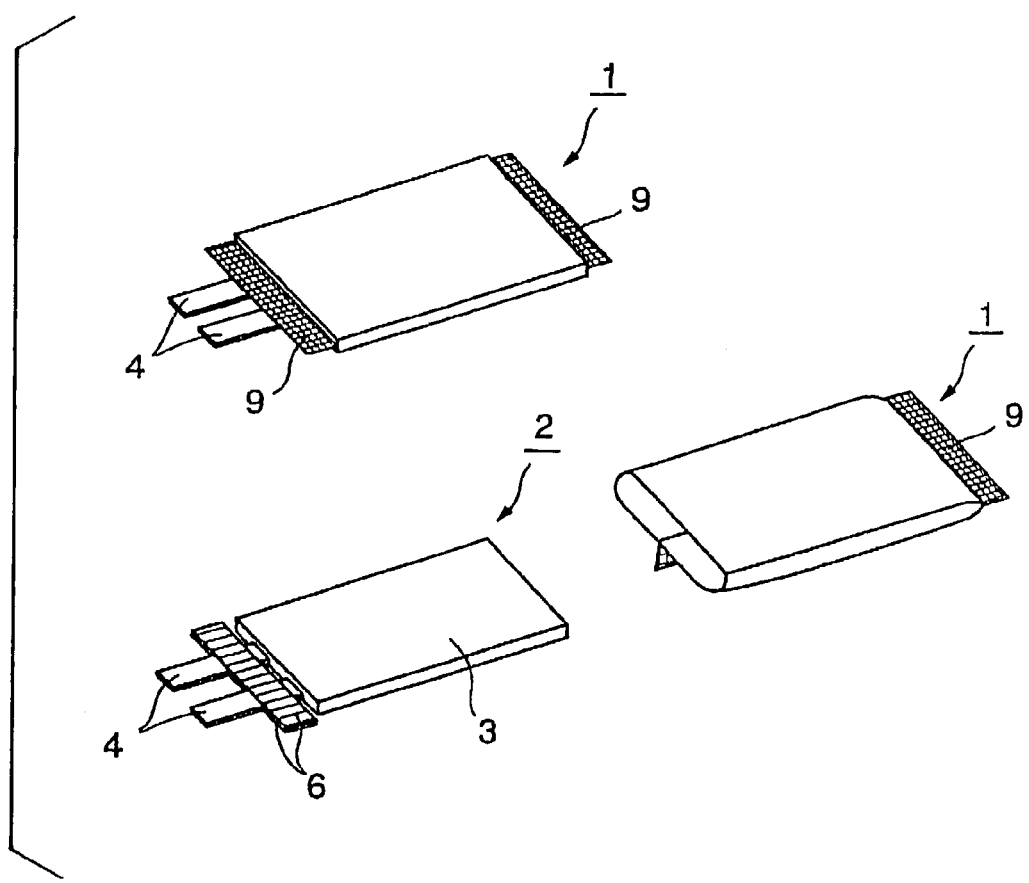
F I G. 2C

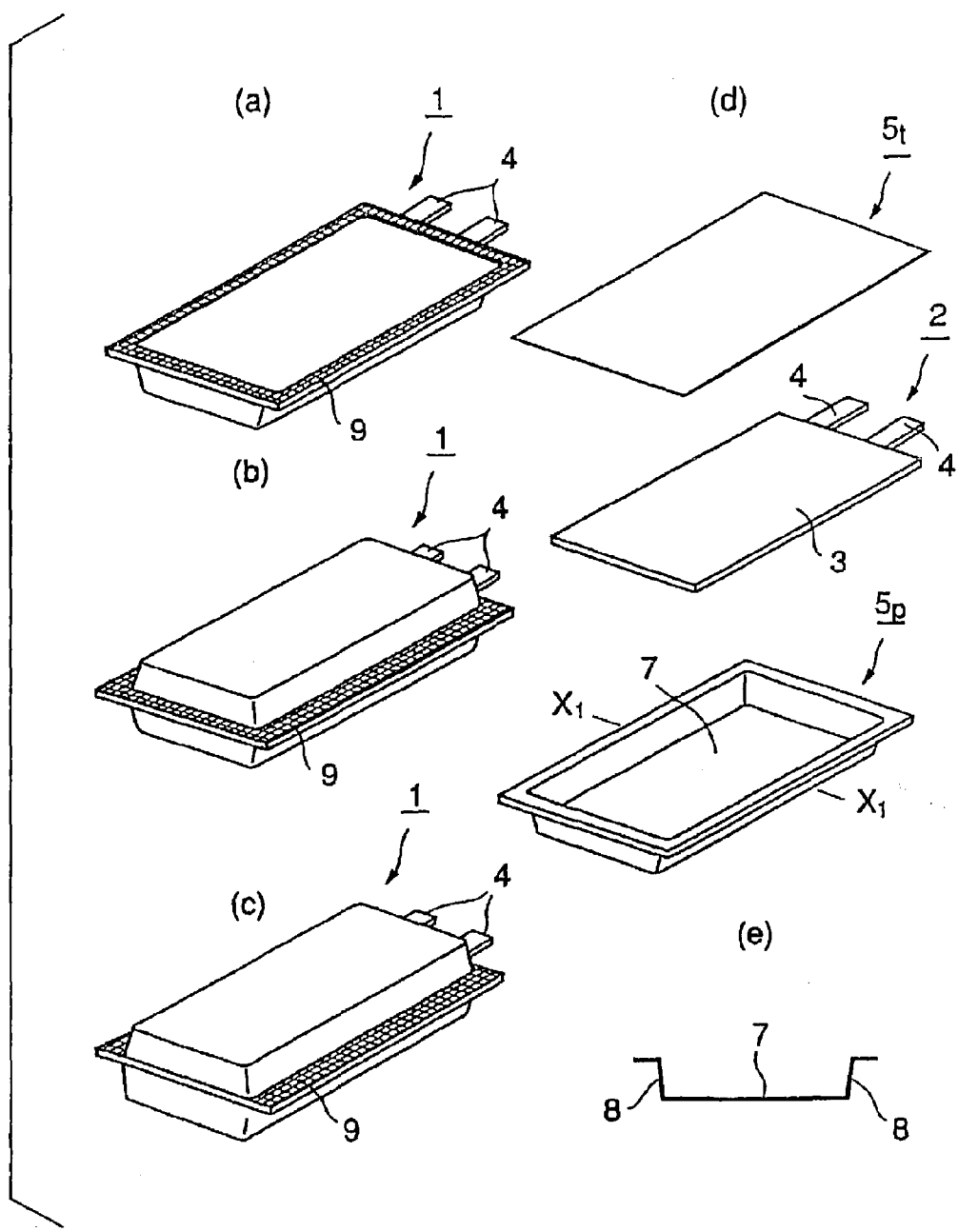
F I G. 2D

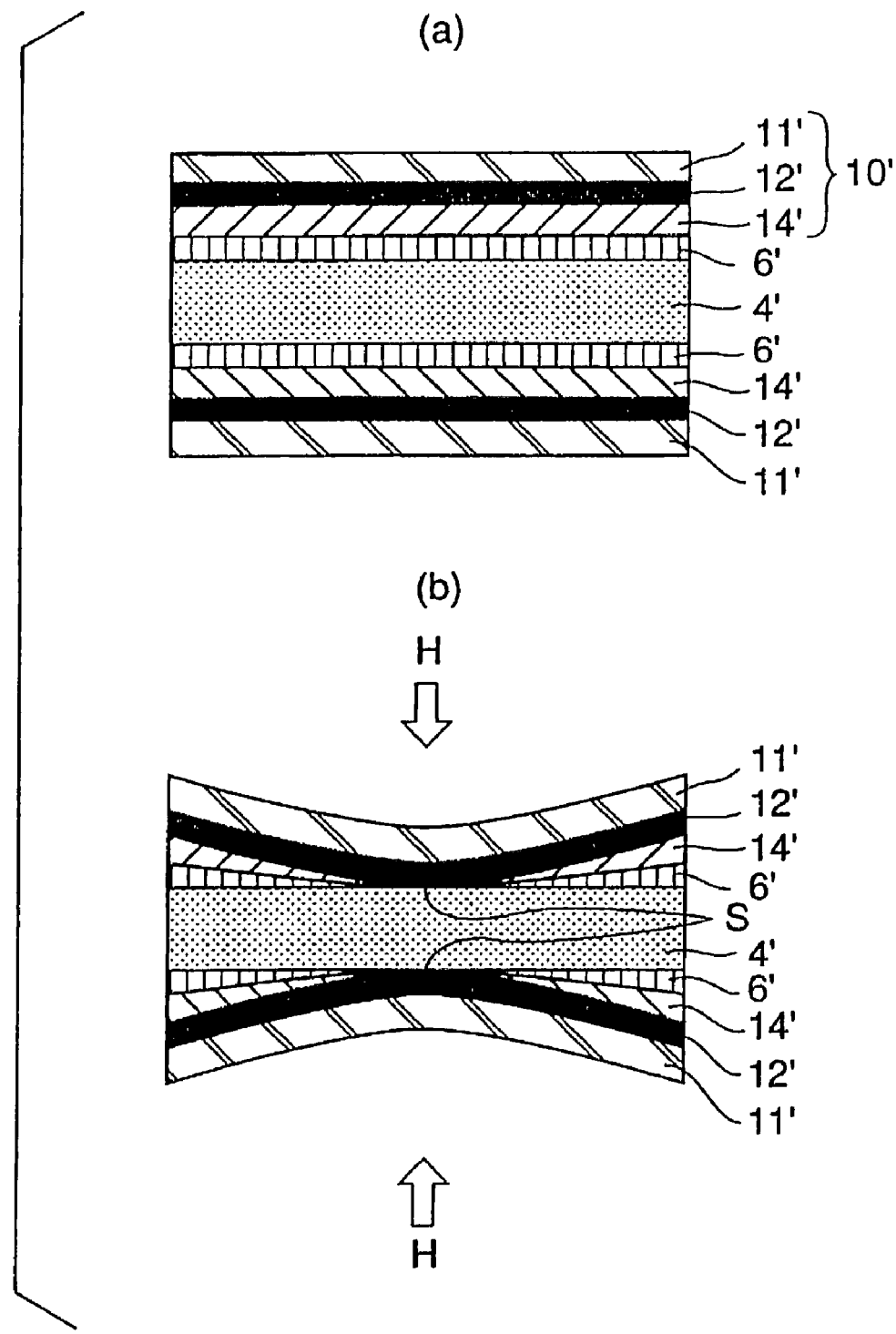
F I G. 2G

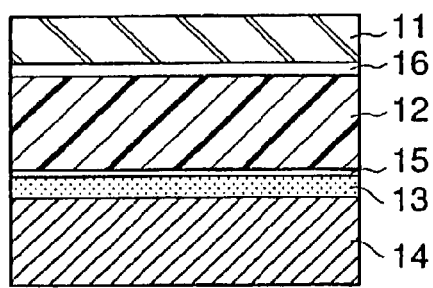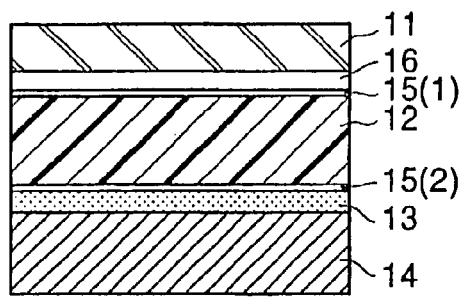
F I G. 3A

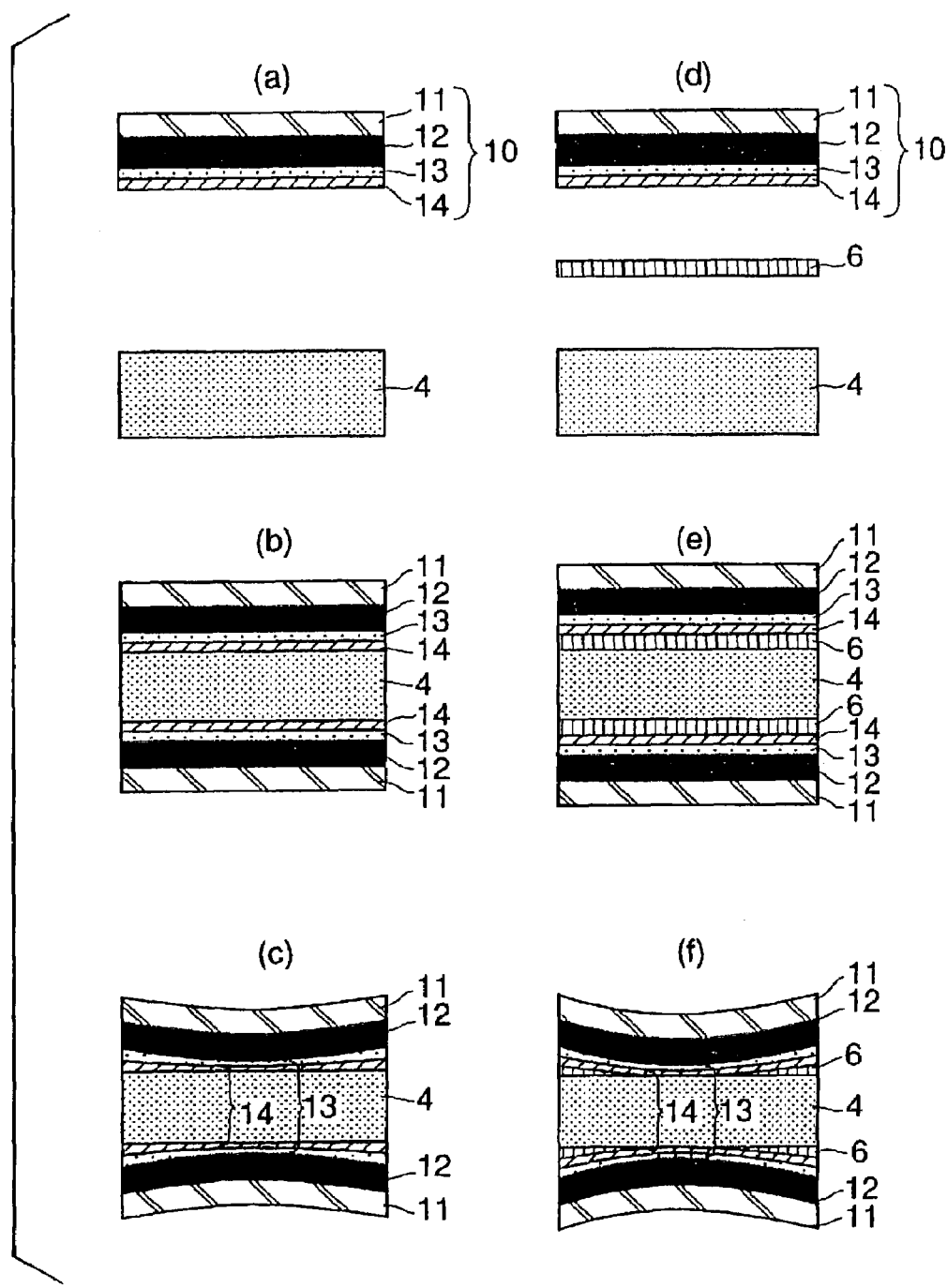
F I G. 3B

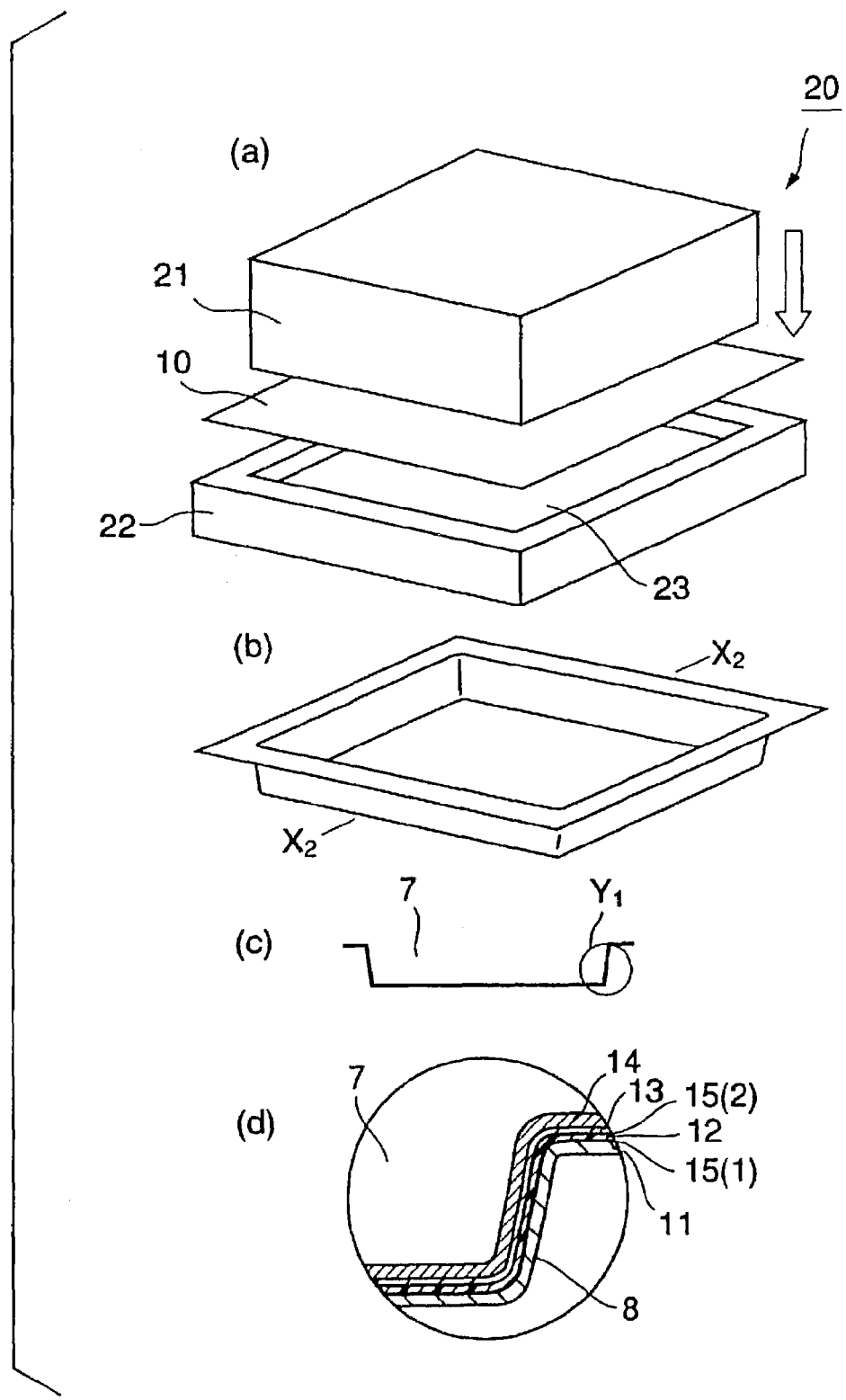
F I G. 3E

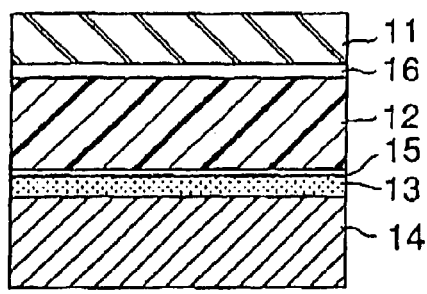
(a)
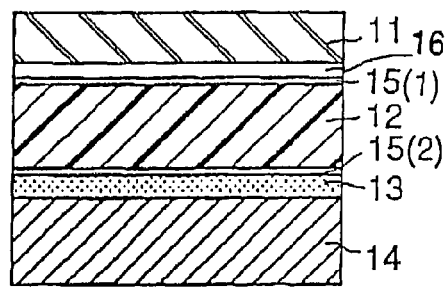
(b)
F I G. 4A
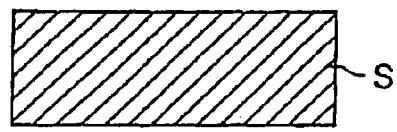
(a)
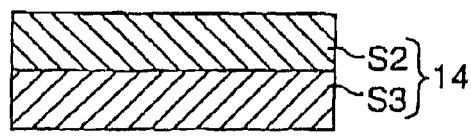
(b)
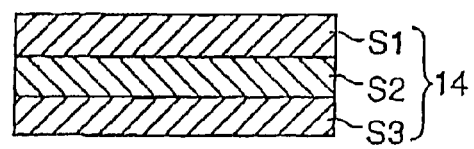
(c)
F I G. 4B

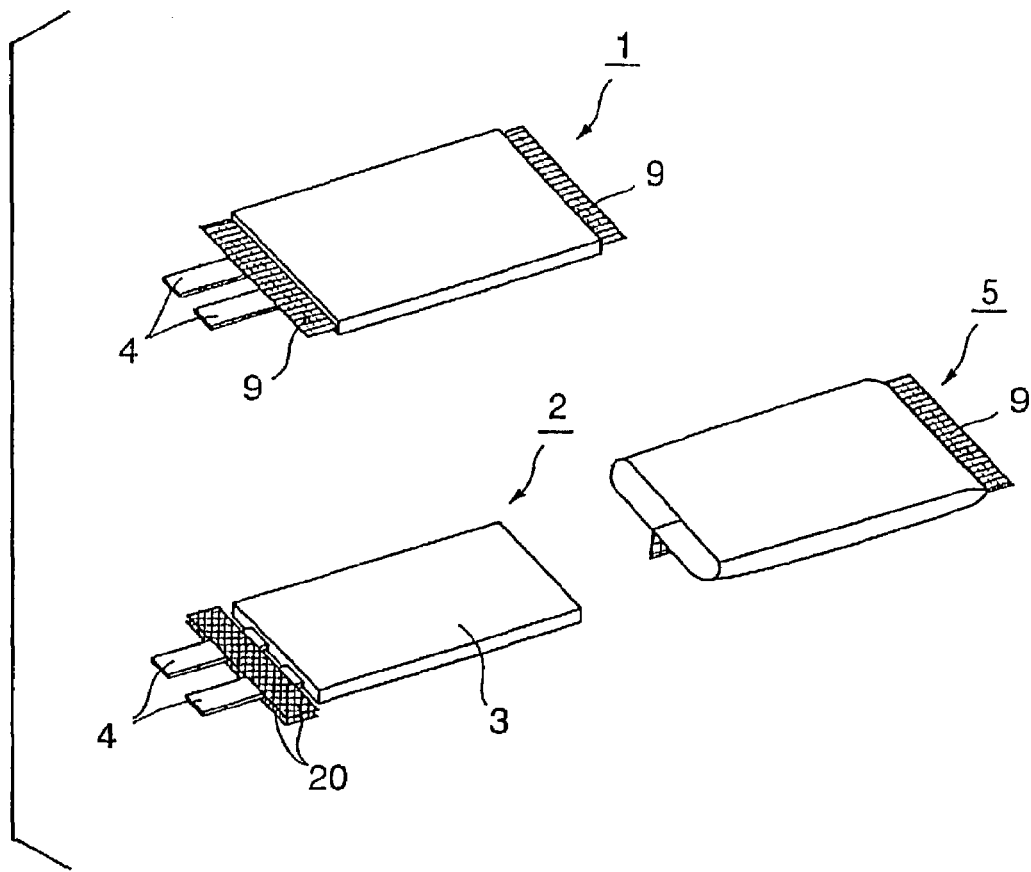
F I G. 4D

PACKAGING MATERIAL FOR BATTERY

BACKGROUND OF THE INVENTION

1. Field of the Invention

The present invention relates to a packaging material for a battery, which has moisture barrier properties and resistance to contents of the battery and is usable for batteries with a liquid or solid organic electrolyte (polyelectrolyte), fuel batteries (cells), capacitors and the like.

2. Background Art

The term "battery" as used in the present invention refers to objects including devices for converting chemical energy to electric energy, for example, lithium ion batteries, lithium polymer batteries, and fuel batteries, or electrolytic capacitors containing liquids, solid ceramics, organic materials or other dielectric materials, for example, liquid capacitors, solid capacitors, and bilayer capacitors.

Batteries are used for applications such as personal computers, portable terminal devices (for example, portable telephones (cellular phones) and PDA), video cameras, electric automobiles, energy storage batteries, robots, and satellites.

Metal cans produced by pressing metals to form cylindrical or rectangular parallelepiped vessels, or bags formed from a laminate of a composite film produced by lamination of plastic films, metal foils and the like (hereinafter referred to as "armor body") have hitherto been used as the armor body for the above batteries.

The conventional armor bodies for batteries, however, have the following problems. In metal cans, since the outer wall of the vessel is rigid, the shape of the battery per se is disadvantageously limited. For this reason, since the hardware side is designed according to the battery, the dimension of the hardware used in the battery is disadvantageously determined by the battery and, thus, the degree of freedom in shape is reduced.

For this reason, the above bag-like armor body is generally used. From the viewpoints of properties required of batteries, moldability or fabricability, profitability and the like, the material for the armor body comprises at least a substrate layer, a barrier layer, a sealant layer, and an adhesive layer for bonding the above layers to each other, and an intermediate layer is optionally provided.

A pouch is formed from a laminate having the above construction for a battery, or alternatively at least one side of the laminate is subjected to press molding to form a housing part for a battery. A battery body is housed in the pouch or the housing part, and, in the pouch type or the emboss type (covered with a lid), the necessary part of the peripheral edge thereof is heat sealed for hermetic sealing to prepare a battery.

The innermost layer in the sealant layer should have heat sealing properties between the innermost layers and, in addition, should have heat sealing properties on leads (metals). For example, the use of an acid-modified polyolefin resin having adhesion to metals in the innermost layer can ensure the adhesion to leads.

A. Stacking the acid-modified polyolefin resin as the innermost layer in the armor body, however, is disadvantageous, for example, in that, as compared with general polyolefin resins, the moldability or fabricability is inferior and, in addition, the cost is higher. For this reason, a method has hitherto been adopted wherein a general polyolefin resin layer is used as the innermost layer of the sealant layer in the armor body and a film for a lead, which is heat bondable to both the innermost layer and the lead, is interposed in the lead part.

More specifically, as shown in FIG. 1G (a), a film 6' for a lead, which has heat sealing properties on both a metal and a sealant layer in the armor body, is interposed between a lead 4 and a sealant layer 14' in a laminate 10' to ensure hermetic sealing properties in the lead part.

A film of the above unsaturated carboxylic acid-grafted polyolefin, a metal-crosslinked polyethylene, or a copolymer of ethylene or propylene with acrylic acid or methacrylic acid may be used as the film for a lead.

The sealant layer in the laminate for constituting the armor body for a battery (hereinafter referred to as "armor body") is formed of polypropylene, for example, from the viewpoints of heat resistance and hermetic sealing properties. In this case, a polypropylene resin, which exhibits good hermetic sealing properties and is likely to be collapsed upon heating and pressing at the time of heat sealing, that is, a polypropylene resin having a large melt index (hereinafter referred to as "MI"), is used. An acid-modified polypropylene film is used as the film for a lead. Upon hermetic heat sealing using the packaging material for a battery having the above construction and the film for a lead having the above construction, as shown in FIG. 1G (b), both the heat seal layer 14' in the armor body and the film layer 6' for a lead are melted, at a portion where the lead exists, by heat and pressure for heat sealing and, further, upon pressing, are often extruded to the outside of the region of the pressing part. As a result, the aluminum foil as the barrier layer 12' in the armor body 10' often comes into contact (S) with the metal lead 4', resulting in short-circuiting.

Further, as shown in FIGS. 1H (a) to 1H (c), upon heat sealing of the peripheral edge of the armor body, microcracks (hereinafter referred to as "root cutting C") often occur in the sealant layer in its portion near the inner edge of the sealed part. Upon root cutting, an electrolysis solution comes into direct contact with the barrier layer. As a result, insulation among the battery body, the metal of the lead, and the barrier layer is broken, and a potential difference occurs. The potential difference results in the formation of throughholes due to the corrosion of the barrier layer and the formation of a reaction product of a metal ion as the electrolyte called "dendrite." These unfavorable phenomena shorten the service life of the battery.

B. Further, stacking the acid-modified polyolefin resin as the sealant layer in the armor body or the innermost layer in the sealant layer is disadvantageous, for example, in that, as compared with general polyolefin resins, the moldability or fabricability is inferior and, in addition, the cost is higher. For this reason, a method has hitherto been adopted wherein a general polyolefin resin layer is used as the sealant layer in the armor body or the innermost layer in the sealant layer and a film for a lead, which is heat bondable to both the sealant layer or the innermost layer in the sealant layer and the lead, is interposed in the lead part.

More specifically, as shown in FIG. 2G (a), a film 6' for a lead, which has heat sealing properties on both a metal lead and a sealant layer in the armor body or the innermost layer in the sealant layer, is interposed between a lead 4 and a heat seal layer 14' in a laminate 10' to ensure hermetic sealing properties in the lead part.

A film of the above unsaturated carboxylic acid-grafted polyolefin, a metal-crosslinked polyethylene, or a copolymer of ethylene or propylene with acrylic acid or methacrylic acid may be used as the film for a lead.

The sealant layer or the innermost layer in the sealant layer in the laminate for constituting the armor body for a battery (hereinafter referred to as "armor body") is formed of polypropylene, for example, from the viewpoints of heat resistance and hermetic sealing properties. In this case, a polypropylene resin, which exhibits good hermetic sealing properties and is likely to be collapsed upon heating and pressing at the time of heat sealing, that is, a polypropylene resin having a large melt index (hereinafter referred to as "MI"), is used. An acid-modified polypropylene film is used as the film for a lead. Upon hermetic heat sealing using the packaging material for a battery having the above construction and the film for a lead having the above construction, as shown in FIG. 2G (b), both the heat seal layer 14' in the armor body and the film layer 6' for a lead are melted, at a portion where the lead exists, by heat and pressure for heat sealing and, further, upon pressing, are often extruded to the outside of the region of the pressing part. As a result, the aluminum foil as the barrier layer 12' in the armor body 10' often comes into contact (S) with the metal lead 4', resulting in short-circuiting.

Further, as shown in FIGS. 2H (a) to 2H (c), upon heat sealing of the peripheral edge of the armor body, microcracks (hereinafter referred to as "root cutting C") often occur in the sealant layer in its portion near the inner edge of the sealed part. Upon root cutting, an electrolysis solution comes into direct contact with the barrier layer. As a result, insulation among the battery body, the metal of the lead, and the barrier layer is broken, and a potential difference occurs. The potential difference results in the formation of throughholes due to the corrosion of the barrier layer and the formation of a reaction product of a metal ion as the electrolyte called "dendrite." These unfavorable phenomena shorten the service life of the battery.

C. Further, stacking the acid-modified polyolefin resin as the sealant in the armor body is disadvantageous, for example, in that, as compared with general polyolefin resins, the moldability or fabricability is inferior and, in addition, the cost is higher. For this reason, a method has hitherto been adopted wherein a general polyolefin resin layer is used as the sealant layer in the armor body and a film for a lead, which is heat bondable to both the sealant layer and the lead, is interposed in the lead part.

Further, in the packaging material for a battery, comprising the substrate layer, the barrier layer, the adhesive resin layer, and the sealant layer, when the sealant layer is formed of, for example, a polypropylene resin, the adhesive resin layer in the laminate of the barrier layer and the sealant layer is formed of acid-modified polypropylene.

An acid-modified polyolefin with a large MI value having good processability is used as the adhesive resin layer in the laminate for constituting the armor body for a battery (hereinafter referred to as "armor body"). The acid-modified polyolefin having a large MI value, however, is a resin which is likely to be collapsed upon exposure to heat and pressure at the time of heat sealing. Upon hermetic heat sealing using the packaging material for a battery having the construction using the above adhesive resin layer, as shown in FIG. 3G (b), all of the adhesive resin layer and the sealant layer 14' in the armor body and the film layer 6' for a lead are melted, at a portion where the lead exists, by heat and pressure for heat sealing and, further, upon pressing, are often extruded to the outside of the region of the pressing part. As a result, the aluminum foil as the barrier layer 12' in the armor body 10' often comes into contact (S) with the metal lead 4', resulting in short-circuiting.

Further, as shown in FIGS. 3H (a) to 3H (c), upon heat sealing of the peripheral edge of the armor body, very small root cutting C often occurs in the adhesive resin layer and the sealant layer in their portion near the inner edge of the sealed part. Upon the occurrence of root cutting, an electrolysis solution comes into direct contact with the barrier layer. As a result, insulation among the battery body, the metal of the lead, and the barrier layer is broken, and a potential difference occurs. The potential difference results in the formation of throughholes due to the corrosion of the barrier layer and the formation of a reaction product of a metal ion as the electrolyte called "dendrite." These unfavorable phenomena shorten the service life of the battery.

D. Further, a pouch-type armor body, in which a laminate is formed into a bag and a battery body is housed in the bag, or an emboss-type armor body, in which the laminate is press molded to form a concave portion and a battery body is housed in the concave portion, has been developed. As compared with the pouch type, the emboss type can provide a more compact package. In any type of armor body, for example, moisture barrier properties as a battery, strength such as piercing resistance, and insulating properties are indispensable in the armor body for a battery.

The packaging material for a battery is a laminate comprising at least a substrate layer, a barrier layer, and a sealant layer. It has been confirmed that the interlaminar bonding strength among the above layers affects properties required of the armor body of the battery. For example, unsatisfactory bonding strength between the barrier layer and the sealant layer is causative of the entry of water from the exterior. The entry of water causes the corrosion of the aluminum face by hydrofluoric acid produced by a reaction of the electrolyte in the components constituting the battery with the above water and consequently causes delamination between the barrier layer and the sealant layer. Further, in the formation of the emboss-type armor body, at the time of press molding of the laminate to form a concave portion, delamination between the substrate layer and the barrier layer often occurs.

Further, when a resin having a high tensile modulus of elasticity is used in the sealant layer, at the time of emboss molding, the sealant layer often undergoes whitening or slight cracking in its surface. Further, the molding stability is poor, and pinholes, molding wrinkling, or cracks often occur.

Furthermore, hermetical sealing properties after filling of the contents and sealing may be mentioned as properties which are indispensable as the packaging material for a battery. For example, when the seal strength of the packaging material is low, a satisfactory time is necessary for sealing in a content filling/sealing line. This significantly hinders cycle shortening and often deteriorates the production efficiency.

SUMMARY OF THE INVENTION

A. First Aspect of the Invention

The present inventors have now found that a packaging material, for a battery, for forming an armor body adapted for use in such a manner that, in packaging of a battery, a battery body is inserted into the armor body using a polypropylene resin as a sealant layer and the peripheral edge of the armor body is heat sealed for hermetic sealing, can be provided which can prevent short-circuiting between a barrier layer in the armor body and a lead upon the application of heat and pressure necessary for the heat sealing and does not have any fear of causing root cutting in the sealant layer, that is, has excellent insulating properties and has stable hermetic sealing properties.

Thus, according to the first aspect of the present invention, there is provided a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, a dry laminate layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer.

B. Second Aspect of the Invention

The present inventors have now found that a packaging material, for a battery, for forming an armor body adapted for use in such a manner that, in packaging of a battery, a battery body is inserted into the armor body using a polypropylene resin as a sealant layer and the peripheral edge of the armor body is heat sealed for hermetic sealing, can be provided which can prevent short-circuiting between a barrier layer in the armor body and a lead upon the application of heat and pressure necessary for the heat sealing and does not have any fear of causing root cutting in the sealant layer, that is, has excellent insulating properties and has stable hermetic sealing properties.

Thus, according to the second aspect of the present invention, there is provided a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, an adhesive resin layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer.

C. Third Aspect of the Invention

The present inventors have now found that a packaging material, for a battery, for forming an armor body adapted for use in such a manner that, in packaging of a battery, a battery body is inserted into the armor body and the peripheral edge of the armor body is heat sealed for hermetic sealing, can be provided which can prevent short-circuiting between a barrier layer in the armor body and a lead upon the application of heat and pressure necessary for the heat sealing and does not have any fear of causing root cutting in the sealant layer, that is, has excellent insulating properties and has stable hermetic sealing properties.

Thus, according to the third aspect of the present invention, there is provided a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, aluminum, a conversion treated layer, an adhesive resin layer, and a polypropylene resin-based sealant layer, characterized in that the adhesive resin layer is formed of a resin having a melt index in the range of 5 to 20 g/10 min.

D. Fourth Aspect of the Invention

The present inventors have now found that a production process can be provided for a packaging material, for a battery, which has good battery body protecting properties and can realize highly productive emboss molding process, a content filling/sealing process and other processes.

Thus, according to the fourth aspect of the present invention, there is provided a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer 1, a barrier layer, an adhesive layer 2, and a sealant layer, characterized in that the sealant layer comprises one resin layer or a laminate of two or more resin layers comprising metallocene linear low-density polyethylene.

BRIEF DESCRIPTION OF THE DRAWINGS

Drawings

FIG. 1B is a cross-sectional view showing an example of the layer construction of a laminate for an armor body for a battery;

FIG. 2C is a perspective view illustrating a pouch-type armor body for a battery;

FIG. 2D is a perspective view illustrating an emboss-type armor body for a battery;

FIG. 2G is a cross-sectional view illustrating the state of short-circuiting between a barrier layer and a lead in the case where conventional packaging material for a battery and a film for a lead are used;

FIG. 3A is a diagram illustrating a packaging material for a battery according to the present invention, wherein (a) is a cross-sectional view showing an embodiment of the layer construction of the packaging material for a battery, and (b) a cross-sectional view showing another embodiment of the layer construction of the packaging material for a battery;

FIG. 3B is a diagram illustrating the packaging material for a battery according to the present invention, wherein (a) is a cross-sectional view showing the positional relationship between the packaging material for a battery (layer construction of the packaging material being shown) and a lead, (b) a cross-sectional view illustrating the state of contact of the lead with the armor body at the lead part before heat sealing, (c) a typical cross-sectional view of the lead part after heat sealing, (d) a cross-sectional view showing the positional relationship among the packaging material for a battery (layer construction of the packaging material being shown), a film for the lead, and the lead, (e) a cross-sectional view illustrating the state of contact among the lead, the film for the lead, and the armor body before heat sealing, and (f) a typical cross-sectional view of the lead part after heat sealing;

FIG. 3E is a diagram illustrating molding in the case of an emboss type, wherein (a) is a perspective view, (b) an emboss molded main body for an armor body, (c) a cross-sectional view taken on line X2—X2, and (d) an enlarged view of Y1 part;

FIG. 4A is an explanatory view of the packaging material for a battery according to the present invention, wherein (a) is a cross-sectional view showing Example D of a laminate and (b) a cross-sectional view showing Example D of another laminate;

FIG. 4B is a diagram illustrating the construction of a sealant layer, wherein (a) is a cross-sectional view of a sealant layer having a single-layer structure, (b) a cross-sectional view of a sealant layer having a two-layer structure, and (c) a cross-sectional view of a sealant layer having a three-layer structure;

FIG. 4D is a perspective view illustrating a pouch-type armor body for a battery;

DESCRIPTION OF REFERENCE CHARACTERS OF THE DRAWINGS

A. FIGS. 1A to 1H

Figure 1A:
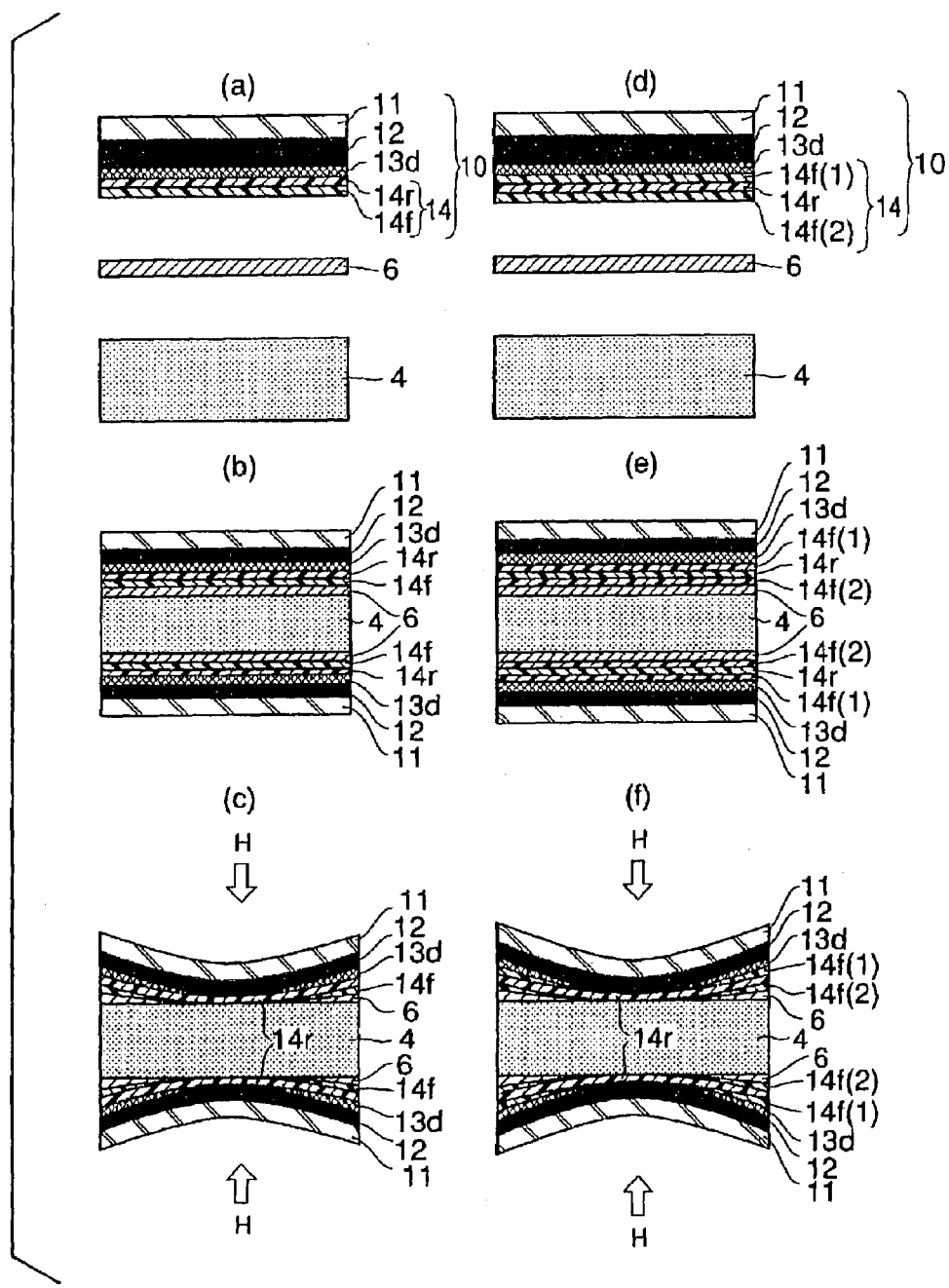
FIG. 1A is a diagram illustrating a packaging material for a battery according to the present invention, wherein (a) is a cross-sectional view showing the layer construction of a packaging material for a battery and the positional relationship among the packaging material, a film for a lead, and a lead, (b) a cross-sectional view illustrating the state of contact among the lead, the film for a lead, and an armor body before heat sealing at the lead part, (c) a typical cross-sectional view of the lead part after heat sealing, and (d), (e), and (f) the same explanatory views as (a), (b), and (c), except that the sealant construction of the packaging material for a battery is different from that of the packaging material shown in (a), (b), and (c)

S: short-circuit part between lead and barrier layer, H: heat sealing hot plate, C: root cutting part, t: resin pool, 1: battery, 2: battery body, 3: cell (accumulating part), 4: lead (electrode), 5: armor body, 6: film for lead, 7: concave portion, 8: side wall part, 9: sealed part, 10: laminate (packaging material for battery), 11: substrate layer, 12: aluminum (barrier layer), 13: dry laminate layer, 14: sealant layer, 14*f*: high-fluidity PP layer, 14*r*: low-fluidity PP layer, 15: protective layer, 16: substrate-side dry laminate layer, 20: press molding part, 21: male mold, 22: female mold, and 23: cavity.

B. FIGS. 2A to 2H

S: short-circuit part between lead and barrier layer, H: heat sealing hot plate, C: root cutting part, t: resin pool, 1: battery, 2: battery body, 3: cell (accumulating part), 4: lead (electrode), 5: armor body, 6: film for lead, 7: concave portion, 8: side wall part, 9: sealed part, 10: laminate (packaging material for battery), 11: substrate layer, 12: aluminum (barrier layer), 13: adhesive resin layer, 13*h*: baked layer of acid-modified polyolefin, 13*e*: extruded layer of acid-modified polyolefin, 14: sealant layer, 14*f*: high-fluidity PP layer, 14*r*: low-fluidity PP layer, 15: protective layer, 16: substrate-side dry laminate layer, 20: press molding part, 21: male mold, 22: female mold, and 23: cavity.

C. FIGS. 3A to 3H

H: heat sealing bar, C: root cutting, 1: battery, 2: battery body, 3: cell (accumulating part), 4: lead (electrode), 5: armor body, 6: film for lead, 7: concave portion, 8: side wall part, 9: sealed part, 10: laminate (packaging material for battery), 11: substrate layer, 12: aluminum (barrier layer), 13: adhesive resin layer, 14: sealant layer, Mx: heat fused layer, 15: conversion treated layer, 16: substrate-side dry laminate layer, 20: press molding part, 21: male mold, 22: female mold, and 23: cavity.

D. FIGS. 4A to 4F

H: heat sealing hot plate, 1: battery, 2: battery body, 3: cell (accumulating part), 4: lead (electrode), 5: armor body, 7: concave portion, 8: side wall part, 9: sealed part, 10: laminate (packaging material for battery), 11: substrate layer, 12: aluminum (barrier layer), 13: adhesive layer, 13*d*: dry laminate layer, 13*h*: baked layer of acid-modified polyolefin, 13*es*: extruded layer of acid-modified polyolefin in the case of sandwich lamination, 13*ec*: extruded layer of acid-modified polyolefin in the case of coextrusion lamination, 14: sealant layer, S1: outer layer in sealant layer, S2: intermediate layer in sealant layer, S3: inner layer in sealant layer, 15: conversion treated layer, 16: substrate-side dry laminate layer, 20: press molding part, 21: male mold, 22: female mold, and 23: cavity.

DETAILED DESCRIPTION OF THE INVENTION

A. First Aspect of the Invention

1. Specific Embodiments

Specific embodiments of the first aspect of the present invention are as follows. Specifically, the invention as defined in claim 1 provides a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, a dry laminate layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer. The invention as defined in claim 2 is characterized in that the barrier layer as defined in claim 1 comprises at least a conversion treated layer provided on its dry laminate layer side. The invention as defined in claim 3 is characterized in that the sealant layer as defined in claim 1 or 2 has a two-layer structure of the low-fluidity polypropylene layer and the high-fluidity polypropylene layer and the high-fluidity polypropylene layer is the innermost layer. The invention as defined in claim 4 is characterized in that the sealant layer as defined in claim 1 or 2 has a three-layer structure of the high-fluidity polypropylene layer, the low-fluidity polypropylene layer, and the high-fluidity polypropylene layer. The invention as defined in claim 5 is characterized in that a film for a lead is interposed between the packaging material for a battery as defined in any one of claims 1 to 4 and a lead part in the battery body.

2. Embodiments of the Invention

The present invention will be described in more detail with reference to the accompanying drawings and the like.

Figure 1C:
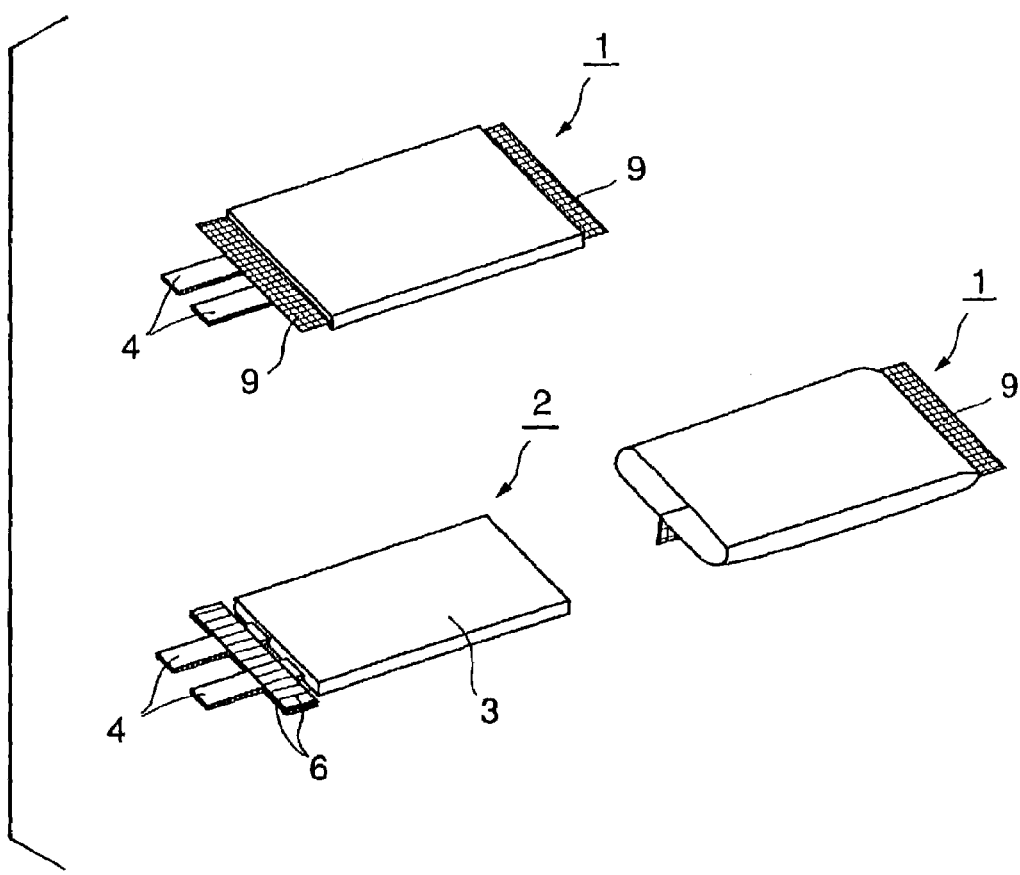
FIG. 1C is a perspective view illustrating a pouch-type armor body for a battery.
Figure 1D:
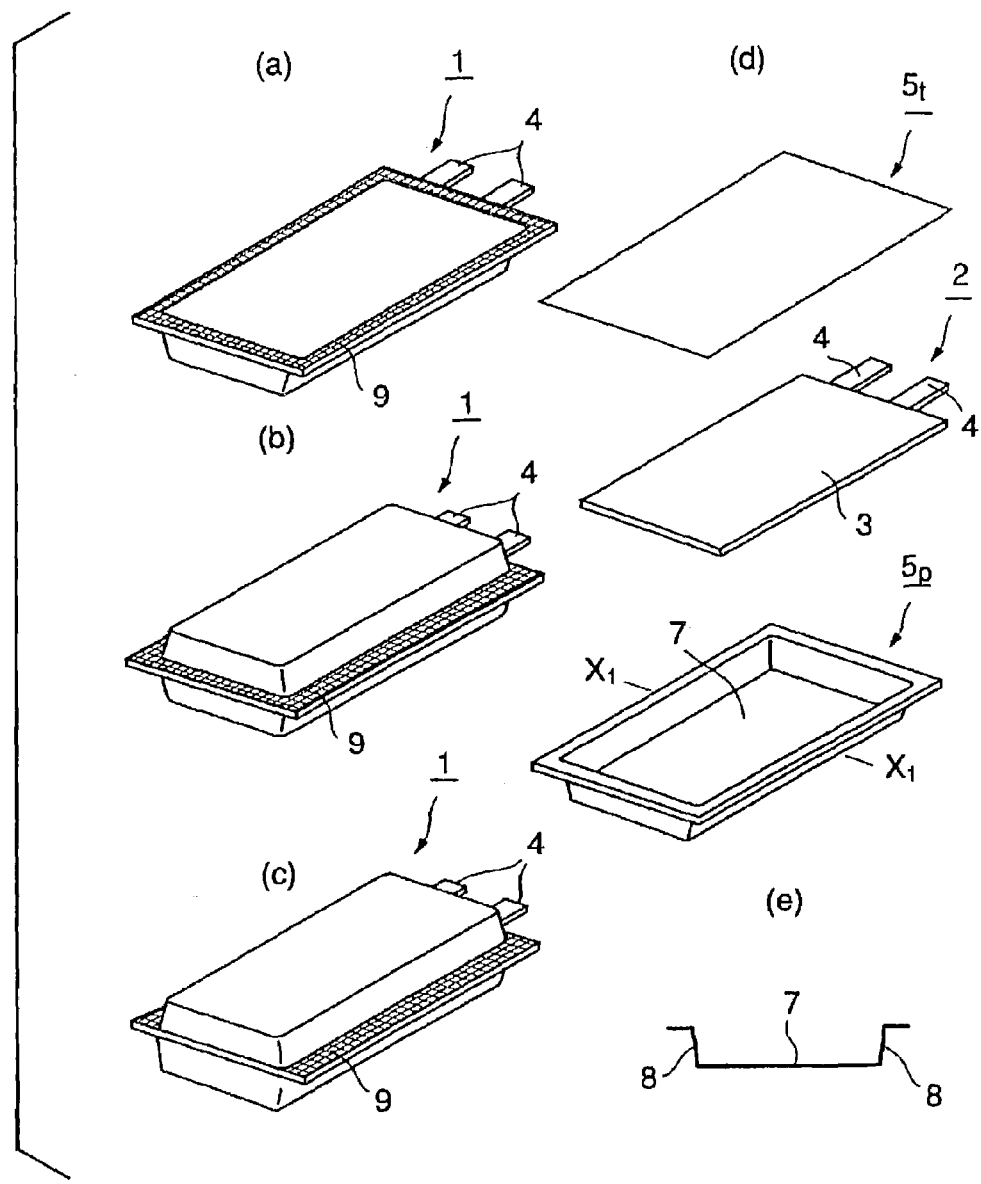
FIG. 1D is a perspective view illustrating an emboss-type armor body for a battery.
Figure 1E:
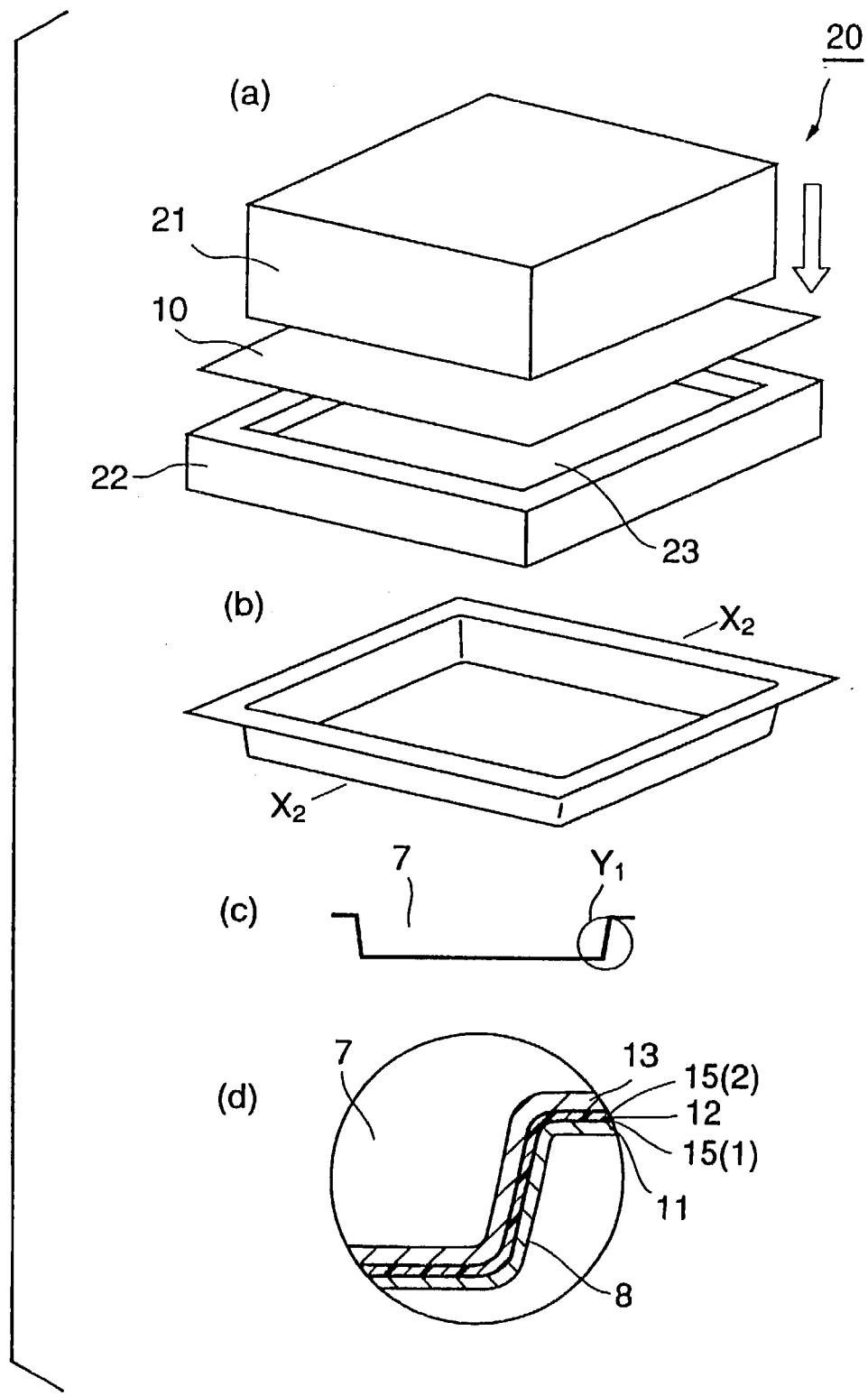
FIG. 1E is a diagram illustrating molding in the case of an emboss type, wherein (a) is a perspective view, (b) an emboss molded main body for an armor body, (c) a cross-sectional view taken on line X2—X2, and (d) an enlarged view of Y1 part.
Figure 1F:
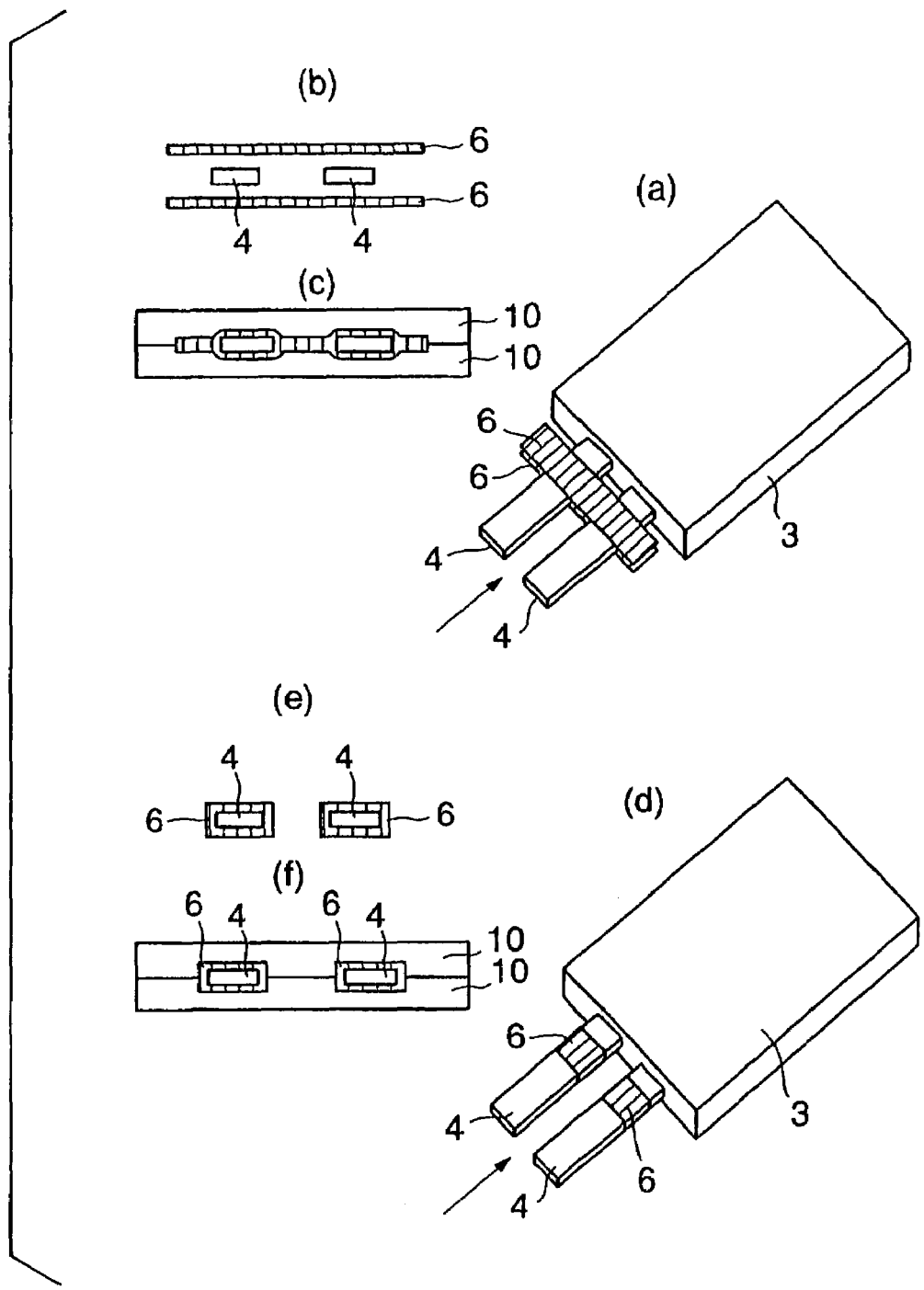
FIG. 1F is a diagram illustrating a method for mounting a film for a lead in bonding between the packaging material for a battery and the lead.
Figure 1G:
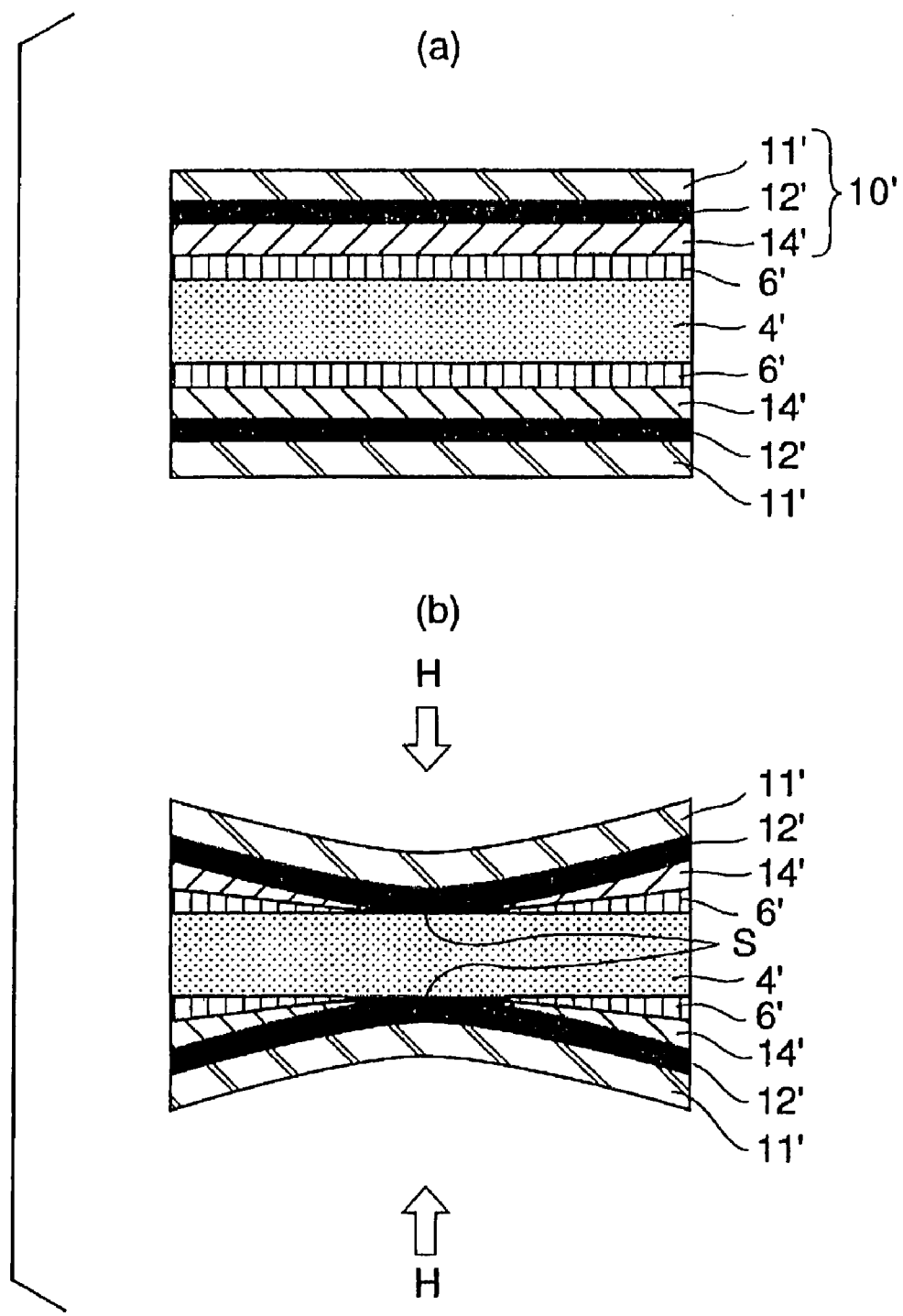
FIG. 1G is a cross-sectional view illustrating the state of short-circuiting between a barrier layer and a lead in the case where conventional packaging material for a battery and a film for a lead are used.

FIG. 1A is a diagram illustrating the packaging material for a battery according to the present invention, wherein (a) is a cross-sectional view showing the layer construction of a packaging material for a battery and the positional relationship between the packaging material and a lead, (b) a cross-sectional view illustrating the state of contact of the lead and an armor body before heat sealing at the lead part, (c) a typical cross-sectional view of the lead part after heat sealing, and (d), (e), and (f) the same explanatory views as (a), (b), and (c), except that the sealant construction of the packaging material for a battery is different from that of the packaging material shown in (a), (b), and (c). FIG. 1B is a cross-sectional view showing an example of the layer construction of a laminate for an armor body for a battery. FIG. 1C is a perspective view illustrating a pouch-type armor body for a battery. FIG. 1D is a perspective view illustrating an emboss-type armor body for a battery. FIG. 1E is a diagram illustrating molding in the case of an emboss type, wherein (a) is a perspective view, (b) an emboss molded main body for an armor body, (c) a cross-sectional view taken on line X2—X2, and (d) an enlarged view of Y1 part. FIG. 1F is a diagram illustrating a method for mounting a film for a lead in bonding between the packaging material for a battery and the lead.

The lead for a battery is formed of an elongated sheet or rod metal. The sheet lead has a thickness of 50 to 2,000 μm and a width of about 2.5 to 20 mm and is formed of aluminum (Al), copper (Cu) (copper plated with nickel (Ni)), nickel or the like.

A capability of maintaining the performance of the battery body for a long period of time is required of the armor body for a battery, and the armor body for a battery comprises a substrate layer, a barrier layer, a heat seal layer and the like stacked on top of one another by various lamination methods. In particular, when the heat seal layer in the laminate constituting the armor body for a battery (hereinafter referred to as "armor body") comprises a polyolefin resin or the like and, in this case, when an acid-modified polyolefin film is used in a portion where a lead exists, for example, as a film for a lead, in housing the battery body in the armor body and hermetically sealing the assembly by sealing the peripheral edge, both the sealant layer in the armor body and the film layer for a lead are melted by heat and pressure for heat sealing and, further, upon the application of pressure, the barrier layer in the armor body often comes into contact with the lead formed of a metal, resulting in short-circuiting S.

Figure 1H:
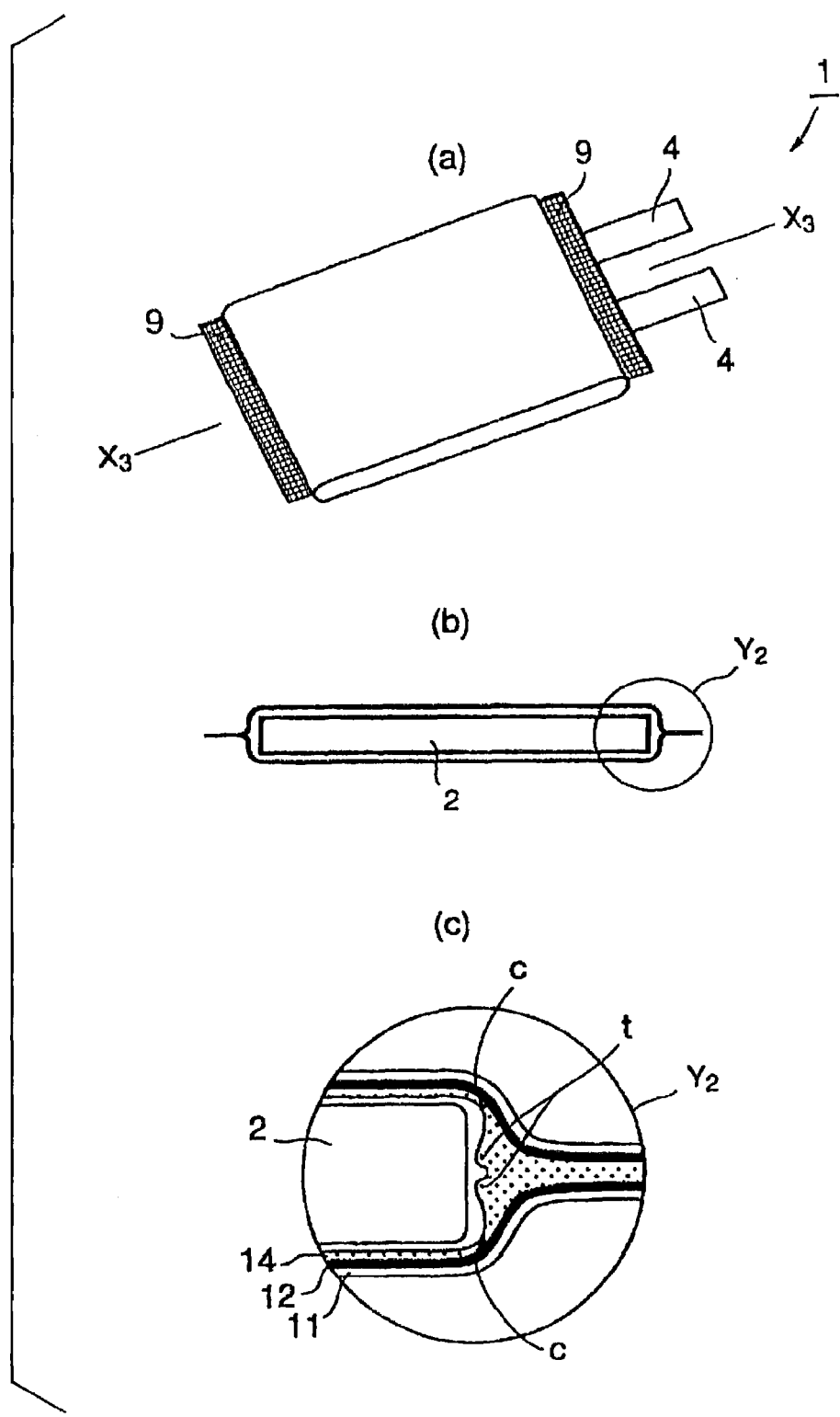
FIG. 1H is a diagram showing root cutting caused at the time of hermetic sealing of the peripheral edge of an armor body using a conventional packaging material for a battery, wherein (a) is a perspective view of a battery, (b) a cross-sectional view taken on line X—X, and (c) an enlarged view of Y1 part.

As shown in FIGS. 1H (a) to 1H (c), at the time of heat sealing of the peripheral edge of the armor body, microcracks often occur in the sealant layer around the inner edge of the sealed part (these microcracks being hereinafter referred to as "root cutting C"). When the root cutting occurs, the electrolysis solution comes into direct contact with the barrier layer. This breaks insulation among the battery body, the metal constituting the lead, and the barrier layer and consequently creates a potential difference. The potential difference results in the formation of throughholes due to the corrosion of the barrier layer and the formation of a reaction product of a metal ion as the electrolyte called "dendrite." These unfavorable phenomena shorten the service life of the battery.

The present inventors have made extensive and intensive studies on the prevention of the short-circuit S and, as a result, have found that the above problem can be solved by adopting such a construction that the packaging material for forming the armor body, for a battery, adapted for use in such a manner that a battery body is inserted into the armor body and the peripheral edge of the armor body is then heat sealed for hermetic sealing, is a laminate comprising at least a substrate layer, an adhesive layer, a barrier layer, a dry laminate layer, and a sealant layer, at least the sealant layer has a multilayer structure of a low-fluidity polypropylene layer having low susceptibility to collapse upon exposure to heat and pressure at the time of heat sealing (hereinafter referred to as "low-fluidity PP layer" or "low-fluidity PP") and a high-fluidity polypropylene layer having high susceptibility to collapse upon exposure to heat and pressure at the time of heat sealing (hereinafter referred to as "high-fluidity PP layer" or "high-fluidity PP"), and the innermost layer is the high-fluidity PP layer. This has led to the completion of the present invention.

The multilayered sealant in a packaging material for a battery according to the present invention exhibits low fluidity also in such a state that, in hermetically sealing the armor body by heat sealing, the low-fluidity PP layer has been brought to a melted resin upon the application of heat and pressure at the time of heat sealing under heat sealing conditions suitable for hermetic sealing of the packaging material for a battery. This allows an insulating film to exist between the barrier layer and the lead, and root cutting around the sealed part can be advantageously prevented. On the other hand, upon melting, the high-fluidity PP layer becomes a low-viscosity state which has the effect of hermetically sealing the portion different in level. Further, the seal is pressed and collapsed to reduce the thickness of the seal and to reduce the sectional area of the sealed part. This can advantageously reduce moisture permeation through the cross section.

The fluidity of the low-fluidity PP and the fluidity of the high-fluidity PP can be distinguished from each other by melt index values (hereinafter referred to as "MI") as measured according to JIS K 7210. In the present invention, the low-fluidity PP preferably has an MI value of 0.5 to 3.0 g/10 min, and the high-fluidity PP preferably has an MI value of 5.0 to 30 g/10 min.

As shown, for example, in FIG. 1B (a), the packaging material for a battery according to the present invention is a laminate comprising at least a substrate layer 11, an adhesive layer 16, aluminum 12, a protective layer 15, a dry laminate adhesive layer 13*d*, and a multilayered sealant layer 14, wherein the multilayered sealant has a two-layer structure of a low-fluidity PP layer 14*r* and a high-fluidity PP layer 14*f*.

Further, for example, as shown in FIG. 1B (a), the packaging material may be a laminate comprising at least a substrate layer 11, an adhesive layer 16, aluminum 12, a protective layer 15, a dry laminate adhesive layer 13*d*, and a multilayered sealant layer 14, wherein the multilayered sealant has a three-layer structure of a high-fluidity PP layer 14*f* (1), a low-fluidity PP layer 14*r*, and a high-fluidity PP layer 14*f* (2).

The layer thickness ratio between the high-fluidity polypropylene layer and low-fluidity polypropylene layer in the sealant layer in the packaging material for a battery according to the present invention is preferably such that the thickness of the low-fluidity PP is 1.5 times or more that of the high-fluidity PP. Specifically, low-fluidity PP:high-fluidity PP=95:5 to 60:40 is suitable.

When the sealant layer has a three-layer structure, in high-fluidity PP (1)/low-fluidity PP/high-fluidity PP (2), the thickness of the low-fluidity PP is preferably 1.5 times or more the total thickness of the high-fluidity PP (1) and the high-fluidity PP (2).

Specifically, when the thickness of the low-fluidity PP is less than 1.5 times the thickness of the high-fluidity PP (the total thickness of the outer layer and the inner layer in the case of the three-layer structure), the effect of rendering the low-fluidity PP less susceptible to collapse upon heat sealing is less likely to appear. Therefore, short-circuiting between the barrier layer and the lead is likely to occur, and, thus, root cutting cannot be prevented. The total thickness of the sealant layer is suitably 20 µm to 200 µm.

Polypropylene used in the sealant layer according to the present invention may be homo-type polypropylene, random-type polypropylene, or block-type polypropylene.

Since polypropylenes constituting the sealant layer in the packaging material for a battery according to the present invention do not have any adhesion to a metal, a film for a lead having heat sealing properties on both the sealant layer and the lead at the time of hermetic sealing should be interposed between the lead part in the battery and the armor body. For example, as shown in FIGS. 1F (a) and 1F (b), a film 6 for a lead is placed on the upper side and the lower side of the hermetic sealing part of the lead 4 in the battery body 2 (in fact, the film being fixed by temporary sealing on the upper side and the lower side of the hermetic sealing part), and the battery body 2 is inserted into the armor body 5, followed by heat sealing in such a state that the lead part is sandwiched, whereby the assembly is hermetically sealed. An example of a method for placing the film 6 for a lead on the lead 4 is to wind a film 6 for a lead around the lead 4 at its predetermined position, as shown in FIG. 1F (d) or FIG. 1F (e).

Specific examples of materials for films for a lead include acid-modified polypropylene (unsaturated carboxylic acid-grafted random propylene), metal-crosslinked polyethylene, a copolymer of ethylene with an acrylic acid or methacrylic acid derivative, and a copolymer of ethylene with vinyl acetate. These materials may be used solely, as a blend of two or more, or in other forms.

The layer thickness of the film 6 for a lead may be one-third or more of the thickness of the lead 4 used. For example, when the thickness of the lead 4 is 100 µm, the total thickness of the film 6 for a lead may be about 30 µm or more.

When an armor body is formed using the packaging material for a battery according to the present invention and a battery body is inserted into the armor body followed by heat sealing of the peripheral edge of the assembly for hermetic sealing, the seal state in the lead part is such that, as shown in FIG. 1A (c) or FIG. 1A (f), the low-fluidity PP layer 14*r* stays in a film form and consequently, short-circuiting between the barrier layer 12 and the lead 4 and root cutting, which are problems to be solved by the present invention, can be avoided.

The packaging material for a battery is used for the formation of an armor body for packaging a battery body, and types of the packaging material may be divided according to the type of the armor body into a pouch type as shown in FIG. 1C and an emboss type as shown in FIG. 1D (a), FIG. 1D (b), or FIG. 1D (c). The pouch type may be a bag type such as a three sided seal type, a four sided seal type, or a pillow type. FIG. 1C shows a pillow type as an example of the type of the armor body.

In the emboss type, as shown in FIG. 1D (a), a concave portion may be formed on one side of the armor body. Alternatively, a construction may be adopted wherein, as shown in FIG. 1D (b), a concave portion is formed on both sides of the armor body, a battery body is housed in the armor body, and the four peripheral sides of the armor body are heat sealed to hermetically seal the assembly. Further, a construction may also be adopted wherein, as shown in FIG. 1D (c), a concave portion is formed on both sides of the armor body with a folded portion sandwiched, a battery is housed in the armor body, and the three sides of the armor body are heat sealed. When the packaging material for a battery is of an emboss type, as shown in FIGS. 1E (a) to 1E (d), the stacked packaging material 10 is subjected to press molding to form a concave portion 7.

Next, each layer constituting the packaging material for a battery according to the present invention will be described. The substrate layer 11 in the armor body is formed of an oriented polyester or a nylon film. Polyester resins usable herein include polyethylene terephthalate, polybutylene terephthalate, polyethylene naphthalate, polybutylene naphthalate, interpolyester, and polycarbonate. Nylons usable herein include polyamide resins, that is, nylon 6, nylon 6, 6, a copolymer of nylon 6 with nylon 6, 6, nylon 6, 10, and poly-m-xylyleneadipamide (MXD 6).

When the substrate layer 11 is used as a battery, the substrate layer 11 is a site which comes into direct contact with the hardware. Therefore, basically, the substrate layer 11 is preferably a resin layer having insulating properties. When the presence of pinholes in the film per se, the occurrence of pinholes at the time of fabrication and the like are taken into consideration, the substrate layer should have a thickness of not less than 6 μm, preferably 12 to 30 μm.

In order to improve anti-pinhole properties and insulating properties of the armor body for a battery, the substrate layer 11 may be in the form of a laminate. When the substrate layer is in the form of a laminate, the substrate layer includes at least one unit of two or more resin layers and, in this case, the thickness of each layer is not less than 6 μm, preferably 12 to 30 μm. Examples of the substrate layer having a multilayer structure include the following layer constructions 1) to 8).

1) Oriented polyethylene terephthalate/oriented nylon

2) Oriented nylon/oriented polyethylene terephthalate. Further, from the viewpoint of machinability (stable carriage in a packaging machine or a processing machine), surface protective properties (heat resistance and electrolyte resistance), a reduction in frictional resistance between the mold and the substrate layer at the time of embossing to form an emboss-type armor body for a battery by fabrication, or protection of the substrate layer upon the deposition of an electrolysis solution, preferably, the substrate layer has a multilayer structure, and a fluororesin layer, an acrylic resin layer, a silicone resin layer, a polyester resin layer, a slip agent such as an oleic acid amide, an erucic acid amide, or a bisoleic acid amide, a resin layer formed of a blend of two or more of the above materials or the like is provided on the surface of the substrate layer. Examples of this type of substrate layer include, 3) fluororesin/oriented polyethylene terephthalate (the fluororesin layer is constituted by a fluororesin film or is formed by liquid coating and then drying), 4) silicone resin/oriented polyethylene terephthalate (the silicone resin layer is constituted by a silicone resin film or is formed by liquid coating and then drying), 5) fluororesin/oriented polyethylene terephthalate/oriented nylon, 6) silicone resin/oriented polyethylene terephthalate/oriented nylon, 7) acrylic resin/oriented nylon (the acrylic resin layer is constituted by an acrylic resin film or is formed by liquid coating and then drying for curing), and 8) acrylic resin+polysiloxane-grafted acrylic resin/oriented nylon (the acrylic resin layer is constituted by an acrylic resin film or is formed by liquid coating and then drying for curing).

The barrier layer 12 is a layer for preventing the entry of particularly water vapor in the battery from the exterior. From the viewpoints of pinholes in the barrier layer per se and stabilization of fabricability (pouching or emboss moldability) and of imparting anti-pinhole properties, not less than 15 μm-thick aluminum, nickel or other metal, or a film with an inorganic compound, for example, silicon oxide or alumina, vapor deposited thereon may be mentioned as the barrier layer. Preferably, however, the barrier layer comprises 20 to 80-μm thick aluminum as a base and a protective layer, which will be described later, provided on the aluminum.

When a further reduction in occurrence of pinholes and the formation of an emboss-type armor body for a battery are contemplated, studies conducted by the present inventors have revealed that, in order to prevent cracking and the like at the time of emboss molding, when the barrier layer is formed of aluminum having an iron content of 0.3 to 9.0% by weight, preferably 0.7 to 2.0% by weight, as compared with iron-free aluminum, the iron-containing aluminum has better ductility and the occurrence of pinholes of the laminate by folding can be reduced and, at the same time, the formation of the side wall at the time of molding of the emboss-type armor body is easier. When the iron content is less than 0.3% by weight, for example, the effect of preventing the occurrence of pinholes and the effect of improving emboss moldability cannot be attained. On the other hand, when the iron content of the aluminum exceeds 9.0% by weight, the flexibility as the aluminum is hindered and the suitability of the laminate for bag making is deteriorated.

For aluminum produced by cold rolling, the flexibility, the nerve, and the hardness vary depending upon conditions for annealing treatment. For aluminum used in the present invention, somewhat or fully annealed aluminum, which is relatively soft, is preferred rather than a hardening treated product not subjected to annealing. The flexibility, nerve, and hardness of aluminum, that is, conditions for annealing, may be properly selected according to suitability for fabrication (pouching or emboss molding). For example, in order to prevent the occurrence of wrinkles and pinholes at the time of emboss molding, the use of soft aluminum, which has been annealed depending upon the degree of molding, is preferred.

The present inventors have found that, for example, when conversion treatment is carried out to form a protective layer on the front and back sides of aluminum as the barrier layer 12 in the packaging material for a battery, a laminate, which is satisfactory as the packaging material, can be provided. Specifically, the conversion treatment refers to the formation of an acid-resistant film of a salt of phosphoric acid, a salt of chromic acid, a fluoride, a triazinethiol compound or the like. Phosphoric acid chromate treatment using a three-component system of a phenolic resin, a chromium(III) fluoride compound, and phosphoric acid among the above acid-resistant film forming materials can provide good results. Further, a conversion treating agent comprising a resin component containing at least a phenolic resin and, added thereto, a metal, such as molybdenum, titanium, or zirconium, or a metal salt can provide good results. The formation of the acid-resistant film can advantageously prevent delamination between the aluminum and the substrate layer at the time of emboss molding, can prevent dissolution and corrosion of the surface of aluminum, particularly dissolution and corrosion of aluminum oxide present on the surface of the aluminum, by hydrogen fluoride produced as a result of a reaction of an electrolyte in the battery with water, can improve the adhesion (wettability) of the surface of aluminum, can prevent delamination between the substrate layer 11 and the aluminum 12 at the time of emboss molding and heat sealing, and can prevent delamination on the inner side of the aluminum by hydrogen fluoride produced as a result of a reaction of the electrolyte with water.

The present inventors have carried out conversion treatment of the surface of the aluminum using various materials and have made studies on the effect of the conversion treatment. As a result, it was found that phosphoric acid chromate treatment using a three-component system of a phenolic resin, a chromium(III) fluoride compound, and phosphoric acid among the above acid-resistant film forming materials can provide good results.

Further, a conversion treating agent comprising a resin component containing at least a phenolic resin and, added thereto, a metal, such as molybdenum, titanium, or zirconium, or a metal salt can provide good results.

When the armor body is of a pouch type, the conversion treatment may be carried out on one side (only heat seal layer side) of the aluminum or both sides (substrate layer side and heat seal layer side). On the other hand, when the armor body of the battery is of an emboss type, conversion treatment of both sides of the aluminum can prevent delamination between the aluminum and the substrate layer at the time of emboss molding.

As described above, the sealant layer in the packaging material for a battery according to the present invention has a multilayer structure of a combination of low-fluidity PP with high-fluidity PP, and the innermost layer is the high-fluidity PP. The total thickness of the sealant layer is preferably 20 to 200 μm.

Bonding between the protective layer provided on the barrier layer and the sealant layer in the lamination of the packaging material for a battery according to the present invention is preferably carried out by dry lamination, for example, from the viewpoint of preventing delamination by hydrofluoric acid or the like evolved as a result of a reaction of the electrolysis solution in a lithium ion battery or the like with water.

In the packaging material for a battery according to the present invention, each of the layers constituting the laminate for armor body formation may be properly subjected to surface activation treatment, such as corona treatment, blast treatment, oxidation treatment, or ozone treatment, from the viewpoints of improving or stabilizing film forming properties, lamination, and suitability for fabrication of the final product (pouching or emboss molding).

B. Second Aspect of the Invention

1. Specific Embodiments

Specific embodiments of the second aspect of the present invention are as follows. Specifically, the invention as defined in claim 6 provides a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, an adhesive resin layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer.

The invention as defined in claim 7 is characterized in that the barrier layer as defined in claim 6 comprises at least a conversion treated layer provided on its adhesive resin layer side.

The invention as defined in claim 8 is characterized in that the sealant layer as defined in claim 6 or 7 has a two-layer structure of the low-fluidity polypropylene layer and the high-fluidity polypropylene layer and the high-fluidity polypropylene layer is the innermost layer. The invention as defined in claim 9 is characterized in that the sealant layer as defined in claim 6 or 7 has a three-layer structure of the high-fluidity polypropylene layer, the low-fluidity polypropylene layer, and the high-fluidity polypropylene layer. The invention as defined in claim 10 is characterized in that the adhesive resin layer as defined in any one of claims 6 to 9 is a baked layer of an emulsion of an acid-modified polyolefin, and the sealant layer has been adhered to the baked layer by heat lamination. The invention as defined in claim 11 is characterized in that the adhesive resin layer as defined in any one of claims 6 to 9 is formed of acid-modified polypropylene and the sealant layer has been previously formed and has been stacked onto the adhesive resin layer by sandwich lamination. The invention as defined in claim 12 is characterized in that the adhesive resin layer as defined in any one of claims 6 to 9 is formed of acid-modified polypropylene and the sealant layer has been stacked onto the adhesive resin layer by coextrusion lamination. The invention as defined in claim 13 is characterized in that an adhesive film is interposed between the packaging material for a battery as defined in any one of claims 6 to 12 and a lead part in the battery body.

2. Embodiments of the Invention

The packaging material for a battery according to the present invention comprises at least a substrate layer, an adhesive layer, a barrier layer, an adhesive resin layer, and a sealant layer. In this packaging material, a combination of a layer having high susceptibility to collapse upon exposure to heat and pressure at the time of heat sealing and a layer having low susceptibility to collapse upon exposure to heat and pressure at the time of heat sealing is adopted for constituting the sealant layer. This combination can prevent root cutting of the sealant layer and can realize a seal free from short-circuiting between the barrier layer and the lead. The present invention will be described in more detail with reference to the accompanying drawings and the like.

Figure 2A:
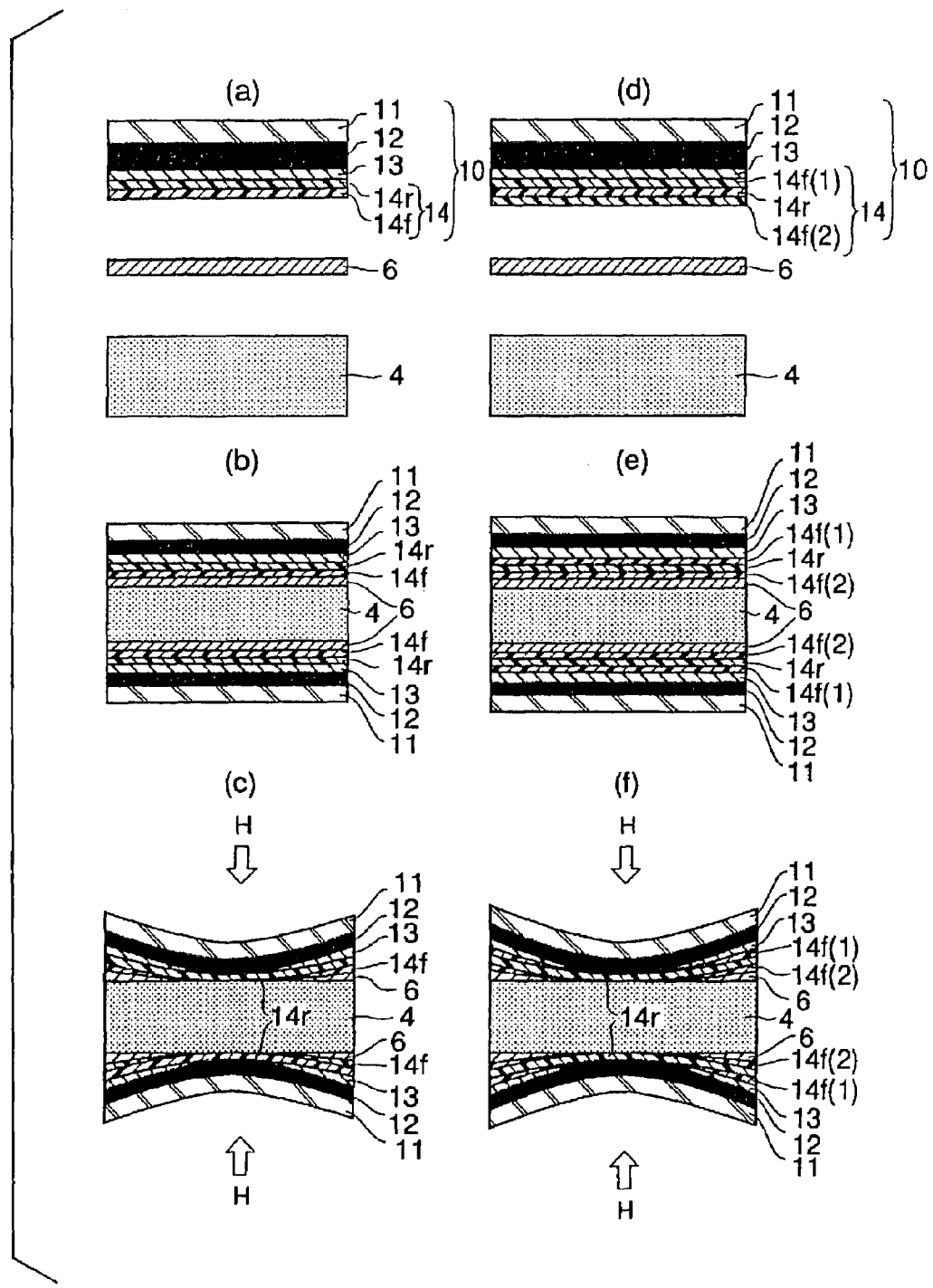
FIG. 2A is a diagram illustrating a packaging material for a battery according to the present invention, wherein (a) is a cross-sectional view showing the layer construction of a packaging material for a battery and the positional relationship among the packaging material, a film for a lead, and a lead, (b) a cross-sectional view illustrating the state of contact among the lead, the film for a lead, and an armor body before heat sealing at the lead part, (c) a typical cross-sectional view of the lead part after heat sealing, and (d), (e), and (f) the same explanatory views as (a), (b), and (c), except that the sealant construction of the packaging material for a battery is different from that of the packaging material shown in (a), (b), and (c)
Figure 2B:
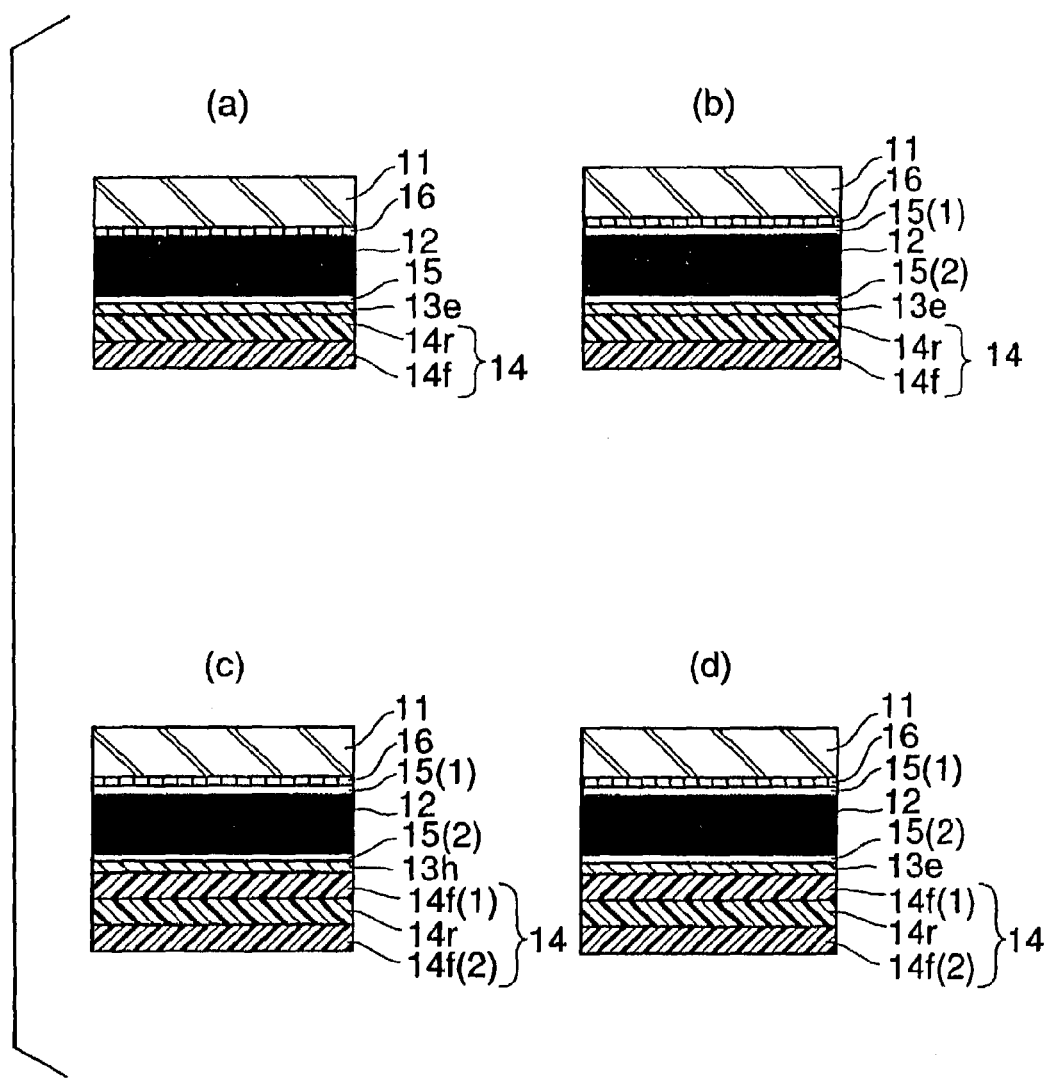
FIG. 2B is a cross-sectional view showing an example of the layer construction of a laminate for an armor body for a battery.
Figure 2E:
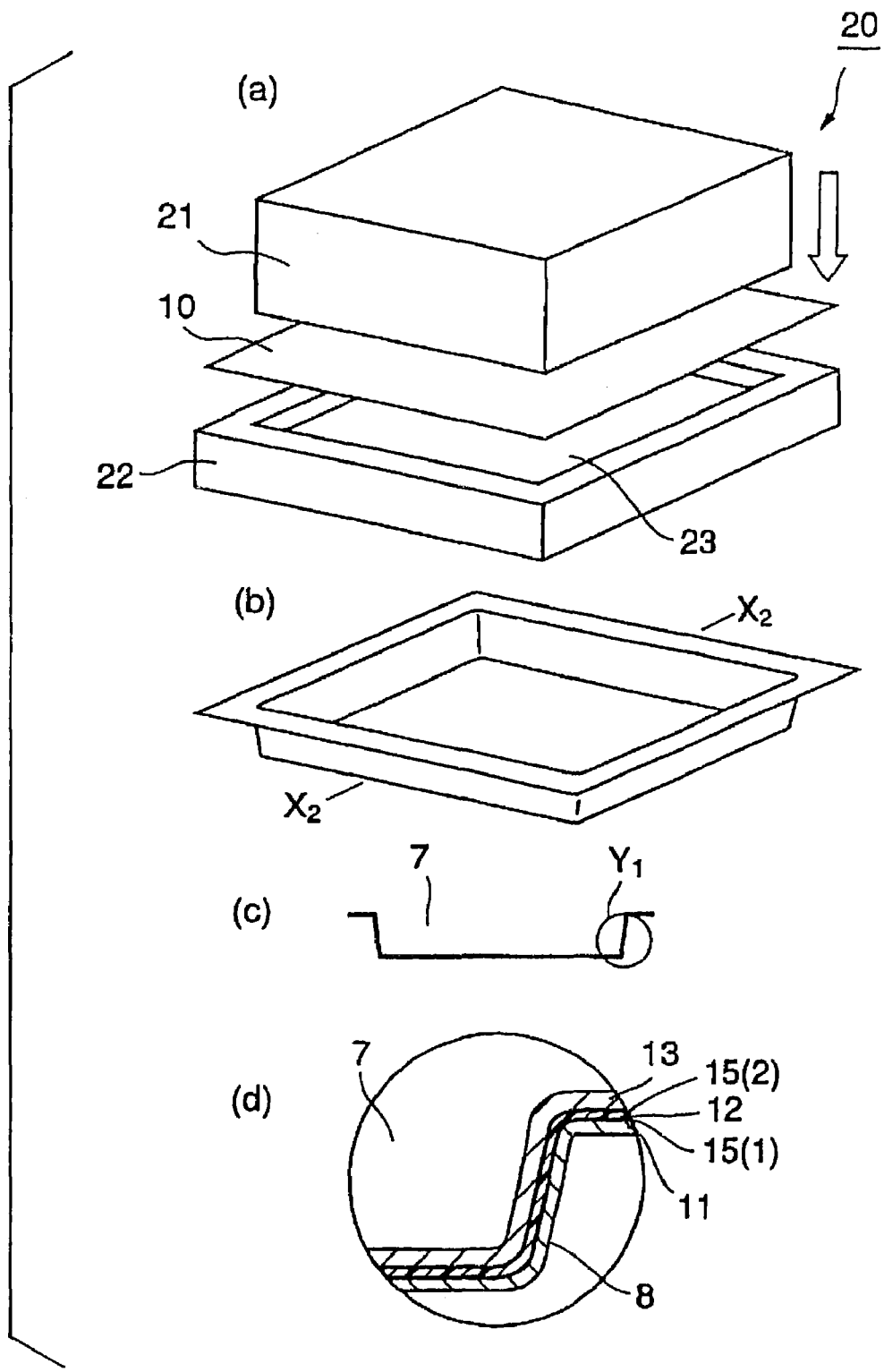
FIG. 2E is a diagram illustrating molding in the case of an emboss type, wherein (a) is a perspective view, (b) an emboss molded main body for an armor body, (c) a cross-sectional view taken on line X2—X2, and (d) an enlarged view of Y1 part.
Figure 2F:
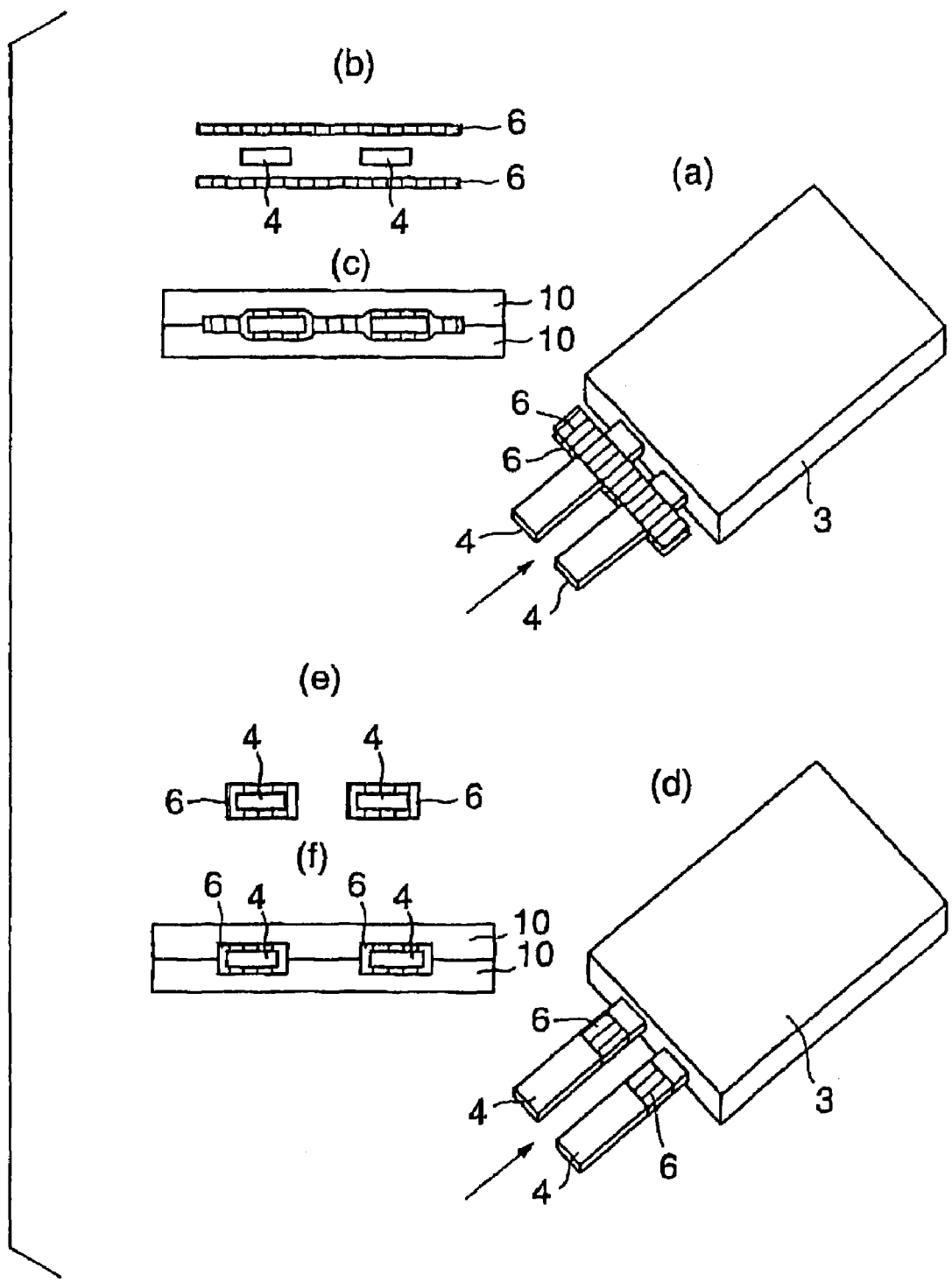
FIG. 2F is a diagram illustrating a method for mounting a film for a lead in bonding between the packaging material for a battery and the lead.

FIG. 2A is a diagram illustrating the packaging material for a battery according to the present invention, wherein (a) is a cross-sectional view showing the layer construction of a packaging material for a battery and the positional relationships of the packaging material and a lead, (b) a cross-sectional view illustrating the state of contact of the lead and an armor body before heat sealing at the lead part, (c) a typical cross-sectional view of the lead part after heat sealing, and (d), (e), and (f) are the same explanatory views as (a), (b), and (c), except that the sealant construction of the packaging material for a battery is different from that of the packaging material shown in (a), (b), and (c). FIG. 2B is a cross-sectional view showing an example of the layer construction of a laminate for an armor body for a battery. FIG. 2C is a perspective view illustrating a pouch-type armor body for a battery. FIG. 2D is a perspective view illustrating an emboss-type armor body for a battery. FIG. 2E is a diagram illustrating molding in the case of an emboss type, wherein (a) is a perspective view, (b) an emboss molded main body for an armor body, (c) a cross-sectional view taken on line X2—X2, and (d) an enlarged view of Y1 part. FIG. 2F is a diagram illustrating a method for mounting a film for a lead in bonding between the packaging material for a battery and the lead.

The lead for a battery is formed of an elongated sheet or rod metal. The sheet lead has a thickness of 50 to 2,000 μm and a width of about 2.5 to 20 mm and is formed of aluminum (Al), copper (Cu) (copper plated with nickel (Ni)), nickel or the like.

The capability of maintaining the performance of the battery body for a long period of time is required of the armor body for a battery, and the armor body for a battery comprises a substrate layer, a barrier layer, a heat seal layer and the like stacked on top of one another by various lamination methods. In particular, when the heat seal layer in the laminate constituting the armor body for a battery (hereinafter referred to as "armor body") comprises a polyolefin resin or the like and, in this case, when an acid-modified polyolefin is used in a portion where a lead exists, for example, as a film for a lead, in housing the battery body in the armor body and hermetically sealing the assembly by sealing the peripheral edge, both the heat seal layer in the armor body and the film layer for a lead are melted by heat and pressure for heat sealing and, further, upon the application of pressure, the barrier layer in the armor body often comes into contact with the lead formed of a metal, resulting in short-circuiting S.

Figure 2H:
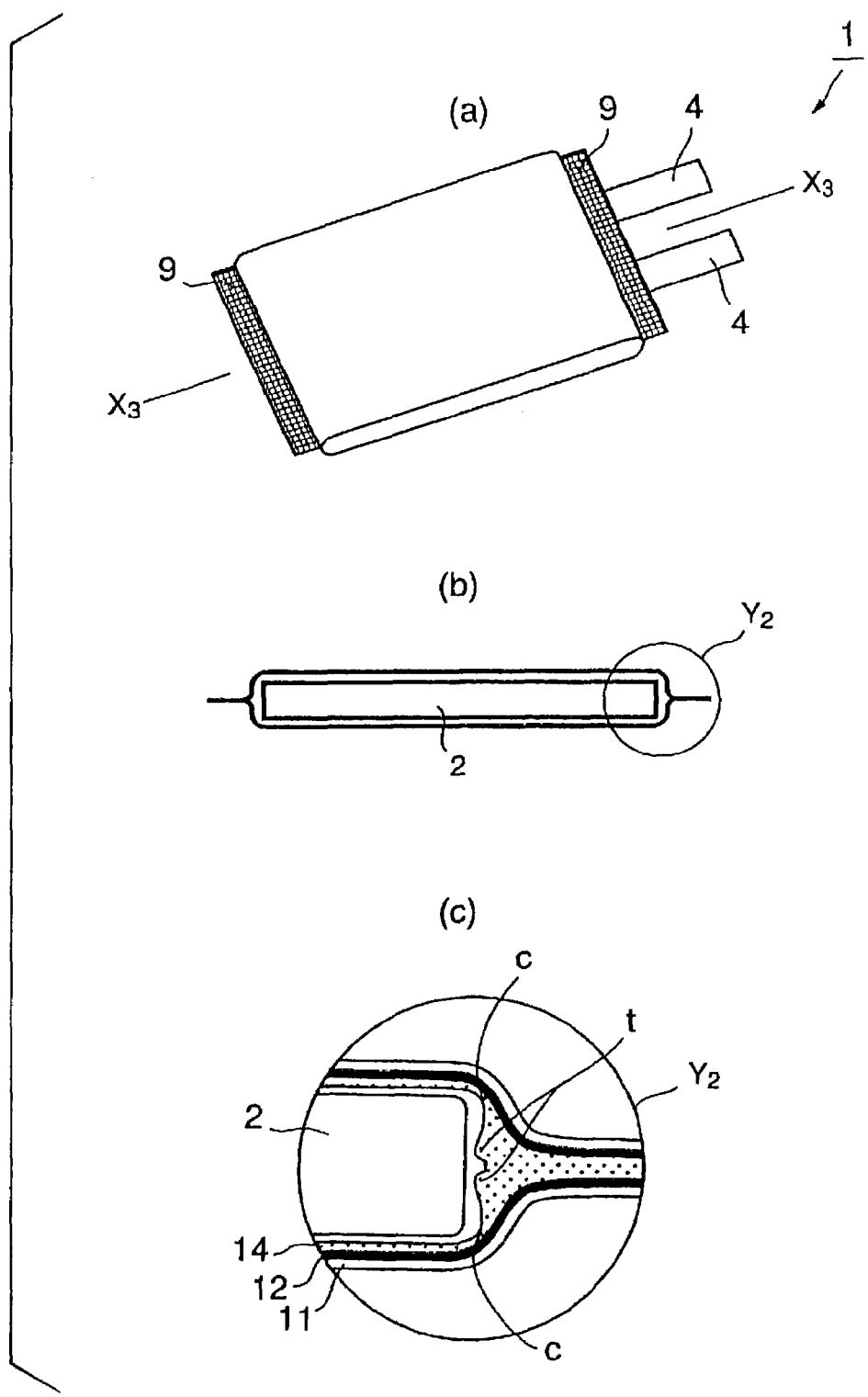
FIG. 2H is a diagram showing root cutting caused at the time of hermetic sealing of the peripheral edge of an armor body using a conventional packaging material for a battery, wherein (a) is a perspective view of a battery, (b) a cross-sectional view taken on line X3— X3, and (c) an enlarged view of Y2 part.

As shown in FIGS. 2H (a) to 2H (c), at the time of heat sealing of the peripheral edge of the armor body, microcracks often occur in the sealant layer around the inner edge of the sealed part (these microcracks being hereinafter referred to as "root cutting C"). When the root cutting occurs, the electrolysis solution comes into direct contact with the barrier layer. This breaks insulation among the battery body, the metal constituting the lead, and the barrier layer and consequently creates a potential difference. The potential difference results in the formation of throughholes due to the corrosion of the barrier layer and the formation of a reaction product of a metal ion as the electrolyte called "dendrite." These unfavorable phenomena shorten the service life of the battery.

The present inventors have made extensive and intensive studies on the prevention of the short-circuit S and, as a result, have found that the above problem can be solved by adopting such a construction that the packaging material for forming the armor body, for a battery, adapted for use in such a manner that a battery body is inserted into the armor body and the peripheral edge of the armor body is then heat sealed for hermetic sealing, is a laminate comprising at least a substrate layer, an adhesive layer, a barrier layer, an adhesive resin layer, and a sealant layer, at least the sealant layer has a multilayer structure of a low-fluidity polypropylene layer having low susceptibility to collapse upon exposure to heat and pressure at the time of heat sealing (hereinafter referred to as "low-fluidity PP layer" or "low-fluidity PP") and a high-fluidity polypropylene layer having high susceptibility to collapse upon exposure to heat and pressure at the time of heat sealing (hereinafter referred to as "high-fluidity PP layer" or "high-fluidity PP"), and the innermost layer is the high-fluidity PP layer. This has led to the completion of the present invention.

The multilayered sealant in a packaging material for a battery according to the present invention exhibits low fluidity also in such a state that, in hermetically sealing the armor body by heat sealing, the low-fluidity PP layer has been brought to a melted resin upon the application of heat and pressure at the time of heat sealing under heat sealing conditions suitable for hermetic sealing of the packaging material for a battery. This allows an insulating film to exist between the barrier layer and the lead, and root cutting around the sealed part can be advantageously prevented. On the other hand, upon melting, the high-fluidity PP layer becomes a low-viscosity state which has the effect of hermetically sealing the portion different in level. Further, upon heat sealing, the thickness of the layer is reduced due to pressing and collapsing to reduce the sectional area of the sealed part. This can advantageously reduce moisture permeation through the cross section.

The fluidity of the low-fluidity PP and the fluidity of the high-fluidity PP can be distinguished from each other by melt index values (hereinafter referred to as "MI") as measured according to JIS K 7210.

In the present invention, the low-fluidity PP preferably has an MI value of 0.5 to 3.0 g/10 min, and the high-fluidity PP preferably has an MI value of 5.0 to 30 g/10 min.

As shown, for example, in FIG. 2B (a) or FIG. 2B (b), the packaging material for a battery according to the present invention is a laminate comprising at least a substrate layer 11, an adhesive layer 16, aluminum 12, a protective layer 15, an adhesive resin layer 13d, and a multilayered sealant layer 14, wherein the multilayered sealant has a two-layer structure of a low-fluidity PP layer 14r and a high-fluidity PP layer 14f. Further, for example, as shown in FIG. 2B (c) or FIG. 2B (d), the packaging material may be a laminate comprising at least a substrate layer 11, an adhesive layer 16, aluminum 12, a protective layer 15, an adhesive resin layer 13d, and a multilayered sealant layer 14, wherein the multilayered sealant has a three-layer structure of a high-fluidity PP layer 14f (1), a low-fluidity PP layer 14r, and a high-fluidity PP layer 14f (2).

The layer thickness ratio between the high-fluidity polypropylene layer and low-fluidity polypropylene layer in the sealant layer in the packaging material for a battery according to the present invention is preferably such that the thickness of the low-fluidity PP is 1.5 times or more that of the high-fluidity PP. Specifically, low-fluidity PP high-fluidity PP=95:5 to 60:40 is suitable.

When the sealant layer has a three-layer structure, in high-fluidity PP (1)/low-fluidity PP/high-fluidity PP (2), the thickness of the low-fluidity PP is preferably 1.5 times or more the total thickness of the high-fluidity PP (1) and the high-fluidity PP (2).

Specifically, when the thickness of the low-fluidity PP is less than 1.5 times the thickness of the high-fluidity PP (the total thickness of the outer layer and the inner layer in the case of the three-layer structure), the effect of rendering the low-fluidity PP less susceptible to collapse upon heat sealing is less likely to appear. Therefore, short-circuiting between the barrier layer and the lead is likely to occur, and, thus, root cutting cannot be prevented.

The total thickness of the sealant layer is suitably 20 μm to 200 μm.

Polypropylene used in the sealant layer according to the present invention may be homo-type polypropylene, random-type polypropylene, or block-type polypropylene.

Since polypropylenes constituting the sealant layer in the packaging material for a battery according to the present invention do not have any adhesion to a metal, a film for a lead having heat sealing properties on both the sealant layer and the lead at the time of hermetic sealing should be interposed between the lead part in the battery and the armor body. For example, as shown in FIGS. 2F (a) and 2F (b), a film 6 for a lead is placed on the upper side and the lower side of the hermetic sealing part of the lead 4 in the battery body 2 (in fact, the film being fixed by temporary sealing on the upper side and the lower side of the hermetic sealing part), and the battery body 2 is inserted into the armor body 5, followed by heat sealing in such a state that the lead 4 is sandwiched, whereby the assembly is hermetically sealed. An example of a method for placing the film 6 for a lead on the lead 4 is to wind a film 6 for a lead around the lead 4 at its predetermined position, as shown in FIG. 2F (d) or FIG. 2F (e).

Specific examples of materials for the film 6 for a lead include acid-modified polypropylene (unsaturated carboxylic acid-grafted random propylene), metal-crosslinked polyethylene, a copolymer of ethylene with an acrylic acid or methacrylic acid derivative, and a copolymer of ethylene with vinyl acetate. These materials may be used solely, as a blend of two or more, or in other forms.

The layer thickness of the film 6 for a lead may be one-third or more of the thickness of the lead 4 used. For example, when the thickness of the lead is 100 µm, the total thickness of the film 6 for a lead may be about 30 µm or more.

When an armor body is formed using the packaging material for a battery according to the present invention and a battery body is inserted into the armor body followed by heat sealing of the peripheral edge of the assembly for hermetic sealing, the seal state in the lead part is such that, as shown in FIG. 2B-A (c) or FIG. 2B-A (f), the low-fluidity PP layer 14r stays in a film form between the barrier layer and the lead and consequently can avoid short-circuiting and root cutting which are problems to be solved by the present invention.

The packaging material for a battery is used for the formation of an armor body for packaging a battery body. The armor body may be of a pouch type as shown in FIG. 2C or an emboss type as shown in FIG. 2D (a), FIG. 2D (b), or FIG. 2D (c). The pouch type may be a bag type such as a three sided seal type, a four sided seal type, or a pillow type. FIG. 2C shows a pillow type as an example of the type of the armor body.

In the emboss type, as shown in FIG. 2D (a), a concave portion may be formed on one side of the armor body. Alternatively, a construction may be adopted wherein, as shown in FIG. 2D (b), a concave portion is formed on both sides of the armor body, a battery body is housed in the armor body, and the four peripheral sides of the armor body are heat sealed to hermetically seal the assembly. Further, a construction may also be adopted wherein, as shown in FIG. 2D (c), a concave portion is formed on both sides of the armor body with a folded portion sandwiched, a battery is housed in the armor body, and the three sides of the armor body are heat sealed.

When the packaging material for a battery is of an emboss type, as shown in FIGS. 2E (a) to 2E (d), the stacked packaging material 10 is subjected to press molding to form a concave portion 7.

Next, each layer constituting the packaging material for a battery according to the present invention will be described.

The substrate layer 11 in the armor body is formed of an oriented polyester or a nylon film. Polyester resins usable herein include polyethylene terephthalate, polybutylene terephthalate, polyethylene naphthalate, polybutylene naphthalate, interpolyester, and polycarbonate. Nylons usable herein include polyamide resins, that is, nylon 6, nylon 6, 6, a copolymer of nylon 6 with nylon 6, 6, nylon 6, 10, and poly-m-xylyleneadipamide (MXD 6).

When the substrate layer 11 is used as a battery, the substrate layer 11 is a site which comes into direct contact with the hardware. Therefore, basically, the substrate layer 11 is preferably a resin layer having insulating properties. When the presence of pinholes in the film per se, the occurrence of pinholes at the time of fabrication and the like are taken into consideration, the substrate layer should have a thickness of not less than 6 µm, preferably 12 to 30 µm.

In order to improve anti-pinhole properties and insulating properties of the armor body for a battery, the substrate layer 11 may be in the form of a laminate.

When the substrate layer is in the form of a laminate, the substrate layer includes at least one unit of two or more resin layers and, in this case, the thickness of each layer is not less than 6 µm, preferably 12 to 30 µm. Examples of the substrate layer having a multilayer structure include the following layer constructions 1) to 8).

1) Oriented polyethylene terephthalate/oriented nylon, and

2) Oriented nylon/oriented polyethylene terephthalate.

Further, from the viewpoint of machinability (stable carriage in a packaging machine or a processing machine) of the packaging material, surface protective properties (heat resistance and electrolyte resistance), a reduction in frictional resistance between the mold and the substrate layer at the time of embossing to form an emboss-type armor body for a battery by fabrication, or protection of the substrate layer upon the deposition of an electrolysis solution, preferably, the substrate layer has a multilayer structure, and a fluororesin layer, an acrylic resin layer, a silicone resin layer, a polyester resin layer, a slip agent such as an oleic acid amide, an erucic acid amide, or a bisoleic acid amide, a resin layer formed of a blend of two or more of the above materials or the like is provided on the surface of the substrate layer. Examples of this type of substrate layer include 3) fluororesin/oriented polyethylene terephthalate (the fluororesin layer is constituted by a fluororesin film or is formed by liquid coating and then drying), 4) silicone resin/oriented polyethylene terephthalate (the silicone resin layer is constituted by a silicone resin film or is formed by liquid coating and then drying), 5) fluororesin/oriented polyethylene terephthalate/oriented nylon, 6) silicone resin/oriented polyethylene terephthalate/oriented nylon, 7) acrylic resin/oriented nylon (the acrylic resin layer is constituted by an acrylic resin film or is formed by liquid coating and then drying for curing), and 8) acrylic resin+polysiloxane-grafted acrylic resin/oriented nylon (the acrylic resin layer is constituted by an acrylic resin film or is formed by liquid coating and then drying for curing).

The barrier layer 12 is a layer for preventing the entry of particularly water vapor in the battery from the exterior. From the viewpoints of pinholes in the barrier layer per se and stabilization of fabrication or molding (pouching or emboss molding) and of imparting anti-pinhole properties, not less than 15 µm-thick aluminum, nickel or other metal, or a film with an inorganic compound, for example, silicon oxide or alumina, vapor deposited thereon may be mentioned as the barrier layer. Preferably, however, the barrier layer is 20 to 80-µm thick aluminum.

When a further reduction in occurrence of pinholes and the formation of an emboss-type armor body for a battery are contemplated, studies conducted by the present inventors have revealed that, in order to prevent cracking and the like at the time of emboss molding, when the barrier layer is formed of aluminum having an iron content of 0.3 to 9.0% by weight, preferably 0.7 to 2.0% by weight, as compared with iron-free aluminum, the iron-containing aluminum has better ductility and the occurrence of pinholes of the laminate by folding can be reduced and, at the same time, the formation of the side wall at the time of molding of the emboss-type armor body is easier. When the iron content is less than 0.3% by weight, for example, the effect of preventing the occurrence of pinholes and the effect of improving emboss moldability cannot be attained. On the other hand, when the iron content of the aluminum exceeds 9.0% by weight, the flexibility as the aluminum is hindered and the suitability of the laminate for bag making is deteriorated.

For aluminum produced by cold rolling, the flexibility, the nerve, and the hardness vary depending upon conditions for annealing treatment. For aluminum used in the present invention, somewhat or fully annealed aluminum, which is relatively soft, is preferred rather than a hardening treated product not subjected to annealing.

The flexibility, nerve, and hardness of aluminum, that is, conditions for annealing, may be properly selected according to suitability for fabrication or molding (pouching or emboss molding). For example, in order to prevent the occurrence of wrinkles and pinholes at the time of emboss molding, the use of soft aluminum, which has been annealed depending upon the degree of molding, is preferred.

The present inventors have found that, for example, when conversion treatment is carried out to form a protective layer on the front and back sides of aluminum as the barrier layer 12 in the packaging material for a battery, a laminate, which is satisfactory as the packaging material, can be provided. Specifically, the conversion treatment refers to the formation of an acid-resistant film of a salt of phosphoric acid, a salt of chromic acid, a fluoride, a triazinethiol compound or the like. Phosphoric acid chromate treatment using a three-component system of a phenolic resin, a chromium(III) fluoride compound, and phosphoric acid among the above acid-resistant film forming materials can provide good results. Further, a conversion treating agent comprising a resin component containing at least a phenolic resin and, added thereto, a metal, such as molybdenum, titanium, or zirconium, or a metal salt can provide good results. The formation of the acid-resistant film can prevent delamination between the aluminum and the substrate layer at the time of emboss molding, can prevent dissolution and corrosion of the surface of aluminum, particularly dissolution and corrosion of aluminum oxide present on the surface of the aluminum, by hydrogen fluoride produced as a result of a reaction of an electrolyte in the battery with water, can improve the adhesion (wettability) of the surface of aluminum, can prevent delamination between the substrate layer 11 and the aluminum 12 at the time of emboss molding and heat sealing, and can prevent delamination on the inner side of the aluminum by hydrogen fluoride produced as a result of a reaction of the electrolyte with water.

The present inventors have carried out conversion treatment of the surface of the aluminum using various materials and have made studies on the effect of the conversion treatment. As a result, it was found that phosphoric acid chromate treatment using a three-component system of a phenolic resin, a chromium(III) fluoride compound, and phosphoric acid among the above acid-resistant film forming materials can provide good results.

Further, a conversion treating agent comprising a resin component containing at least a phenolic resin and, added thereto, a metal, such as molybdenum, titanium, or zirconium, or a metal salt can provide good results.

When the armor body is of a pouch type, the conversion treatment may be carried out on one side (only heat seal layer side) of the aluminum or both sides (substrate layer side and heat seal layer side). On the other hand, when the armor body of the battery is of an emboss type, conversion treatment of both sides of the aluminum can prevent delamination between the aluminum and the substrate layer at the time of emboss molding.

As described above, the sealant layer in the packaging material for a battery according to the present invention has a multilayer structure of a combination of low-fluidity PP with high-fluidity PP, and the innermost layer is the high-fluidity PP. The total thickness of the sealant layer is preferably 20 to 200 µm.

Regarding bonding between the conversion treated layer provided on the barrier layer and the sealant layer in the lamination of the packaging material for a battery according to the present invention, the following lamination and bonding stabilization treatment are preferably carried out, for example, from the viewpoint of preventing delamination by hydrofluoric acid or the like evolved as a result of a reaction of the electrolysis solution in a lithium ion battery or the like with water.

The present inventors have made extensive and intensive studies on lamination methods which can provide stable bonding strength. As a result, they have confirmed that a predetermined bonding strength can also be provided by a layer construction as shown in FIG. 2B (c), that is, by coating an emulsion of an acid-modified polyolefin onto the conversion treated layer, drying and baking the coating (13h), and then stacking a film as a sealant layer by hot lamination.

Further, the present inventors have confirmed that stable bonding strength can be provided by the following lamination method.

A laminate having predetermined bonding strength can be prepared, for example, by stacking a substrate layer 11 on one side of a barrier layer 12 by dry lamination, and, as shown in FIG. 2B (a), FIG. 2B (b), and FIG. 2B (e), extruding an acid-modified polyolefin 13e onto the other side (conversion treated layer) of the barrier layer 12 to stack a sealant layer 14 by sandwich lamination to prepare a laminate, or alternatively coextruding an acid-modified polyolefin resin 13 and a sealant layer to prepare a laminate, and then heating the laminate at a temperature at or above the softening point of the acid-modified polyolefin resin 13e.

Specific examples of heating methods include a hot roll contact method, a hot air method, and a near-infrared or far-infrared method. In the present invention, any heating method may be used so far as, as described above, the adhesive resin can be heated at a temperature at or above the softening point thereof.

A laminate having stable bonding strength can also be prepared by a further method wherein, at the time of the above sandwich lamination or coextrusion lamination, heating is carried out so that the temperature of the surface of the aluminum 12 on its sealant layer side reaches the softening point of the acid-modified polyolefin resin.

In the packaging material for a battery according to the present invention, each of the layers constituting the laminate for armor body formation may be properly subjected to surface activation treatment, such as corona treatment, blast treatment, oxidation treatment, or ozone treatment, from the viewpoints of improving or stabilizing film forming properties, lamination, and suitability for fabrication of the final product (pouching or emboss molding).

C. Third Aspect of the Invention

1. Specific Embodiments

Specific embodiments of the third aspect of the present invention are as follows. Specifically, the invention as defined in claim 14 provides a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, aluminum, a conversion treated layer, an adhesive resin layer, and a polypropylene resin-based sealant layer, characterized in that the adhesive resin layer is formed of a resin having a melt index in the range of 5 to 20 g/10 min. The invention as defined in claim 15 is characterized in that the adhesive resin layer as defined in claim 14 comprises a polypropylene resin. The invention as defined in claim 16 is characterized in that the adhesive resin layer as defined in claim 14 or 15 comprises acid-modified polypropylene. The invention as defined in claim 17 is characterized in that the adhesive resin layer as defined in claim 14 comprises an acid-modified polyethylene resin and, added to the acid-modified polyethylene resin, at least one component selected from a low-density polypropylene resin, a low crystalline ethylene-butene-propylene copolymer with a density of 900 kg/m$^3$, a noncrystalline ethylene-propylene copolymer, a propylene-α-olefin copolymer, and a rubber component. The invention as defined in claim 18 is characterized in that the adhesive resin layer as defined in claim 14 is formed of a blend of at least two polypropylene resins with different melt indexes. The invention as defined in claim 19 is characterized in that at least one of the at least two polypropylene resins constituting the adhesive resin layer as defined in claim 18 is an acid-modified polypropylene resin. The invention as defined in claim 20 provides a packaging material for a battery wherein the laminate comprises the packaging material for a battery as defined in any one of claims 14 to 19 characterized by comprising at least the substrate layer, the adhesive layer, a conversion treated layer (1), aluminum, a conversion treated layer (2), the adhesive resin layer, and the polypropylene resin-based sealant layer. The invention as defined in claim 21 provides a battery wherein the battery body is housed and hermetically sealed into an armor body formed of the packaging material for a battery as defined in any one of claims 14 to 20.

2. Embodiments of the Invention

The packaging material for a battery according to the present invention is a packaging material for an armor body for a battery, comprising at least a substrate layer, an adhesive layer, aluminum, a conversion treated layer, an adhesive resin layer, and a polypropylene resin-based sealant layer comprising an acid-modified polyolefin layer, wherein at least the resin constituting the adhesive resin layer has a melt index in the range of 5 to 20 g/10 min. By virtue of the adoption of this melt index, the insulation between the lead and the barrier layer can be ensured, and root cutting can be advantageously prevented. The present invention will be described in more detail with reference to the accompanying drawings and the like.

Figure 3C:
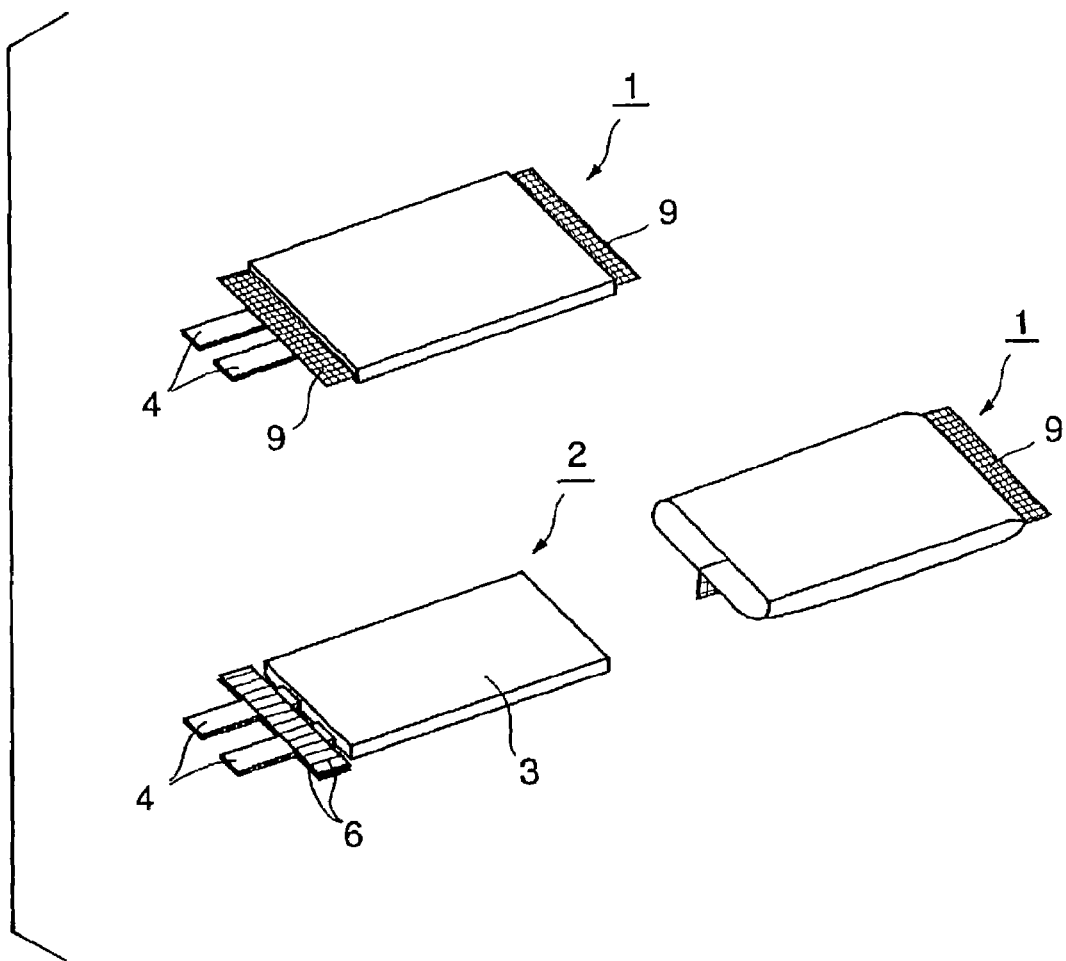
FIG. 3C is a perspective view illustrating a pouch-type armor body for a battery.
Figure 3D:
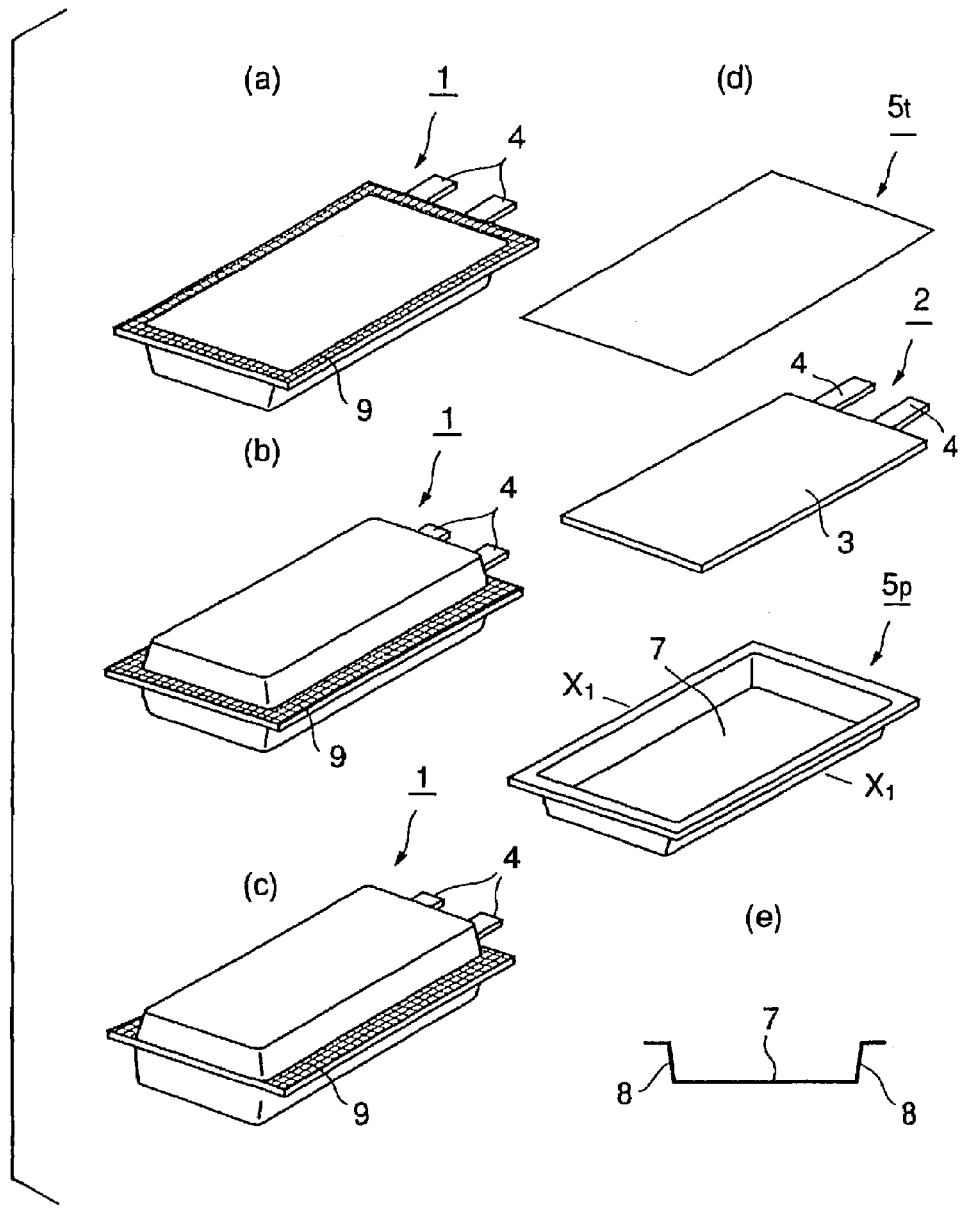
FIG. 3D is a perspective view illustrating an emboss-type armor body for a battery.
Figure 3F:
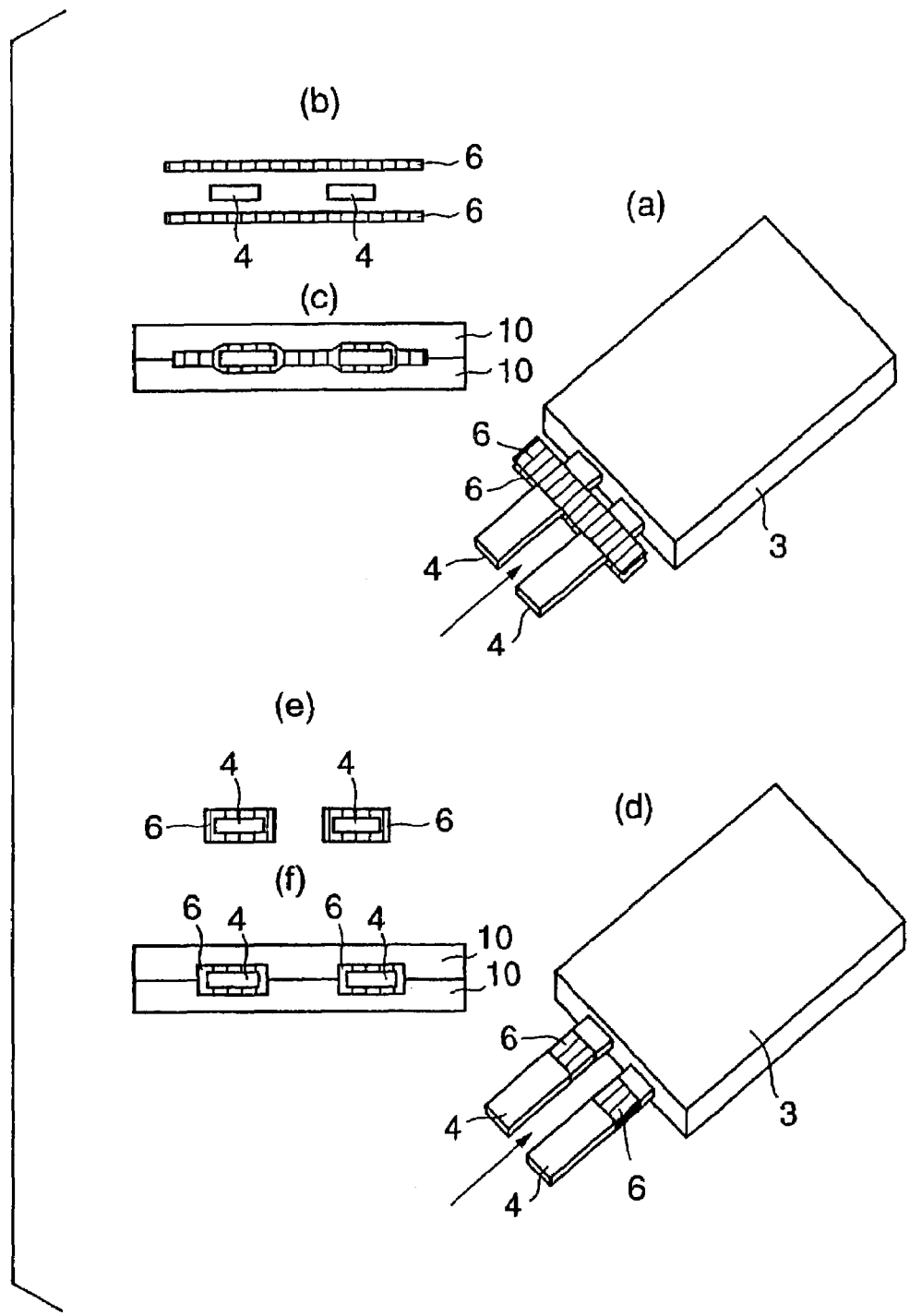
FIG. 3F is a diagram illustrating a method for mounting a film for a lead in bonding between the packaging material for a battery and the lead.

FIG. 3A is a diagram illustrating the packaging material for a battery according to the present invention, wherein (a) is a cross-sectional view showing an embodiment of the layer construction of the packaging material for a battery, and (b) a cross-sectional view showing another embodiment of the layer construction of the packaging material for a battery. FIG. 3B is a diagram illustrating the packaging material for a battery according to the present invention, wherein (a) is a cross-sectional view showing the positional relationship between the packaging material for a battery (the layer construction thereof being shown) and a lead, (b) a cross-sectional view illustrating the state of contact of the lead with the armor body at the lead part before heat sealing, (c) a typical cross-sectional view of the lead part after heat sealing, (d) a cross-sectional view showing the positional relationship among the packaging material for a battery (the layer construction of the packaging material being shown), a film for the lead, and the lead, (e) a cross-sectional view illustrating the state of contact among the lead, the film for the lead, and the armor body before heat sealing, and (f) a typical cross-sectional view of the lead part after heat sealing. FIG. 3C is a perspective view illustrating a pouch-type armor body for a battery. FIG. 3D is a perspective view illustrating an emboss-type armor body for a battery. FIG. 3E illustrates molding at the time of the formation of an emboss-type armor body, wherein (a) is a perspective view, (b) shows an emboss-molded main body of an armor body, (c) is a cross-sectional view taken on line X1—X1, and (d) is an enlarged view of Y1 part. FIG. 3F is a diagram illustrating a method for mounting a film for a lead in bonding between the packaging material for a battery and the lead.

Figure 3G:
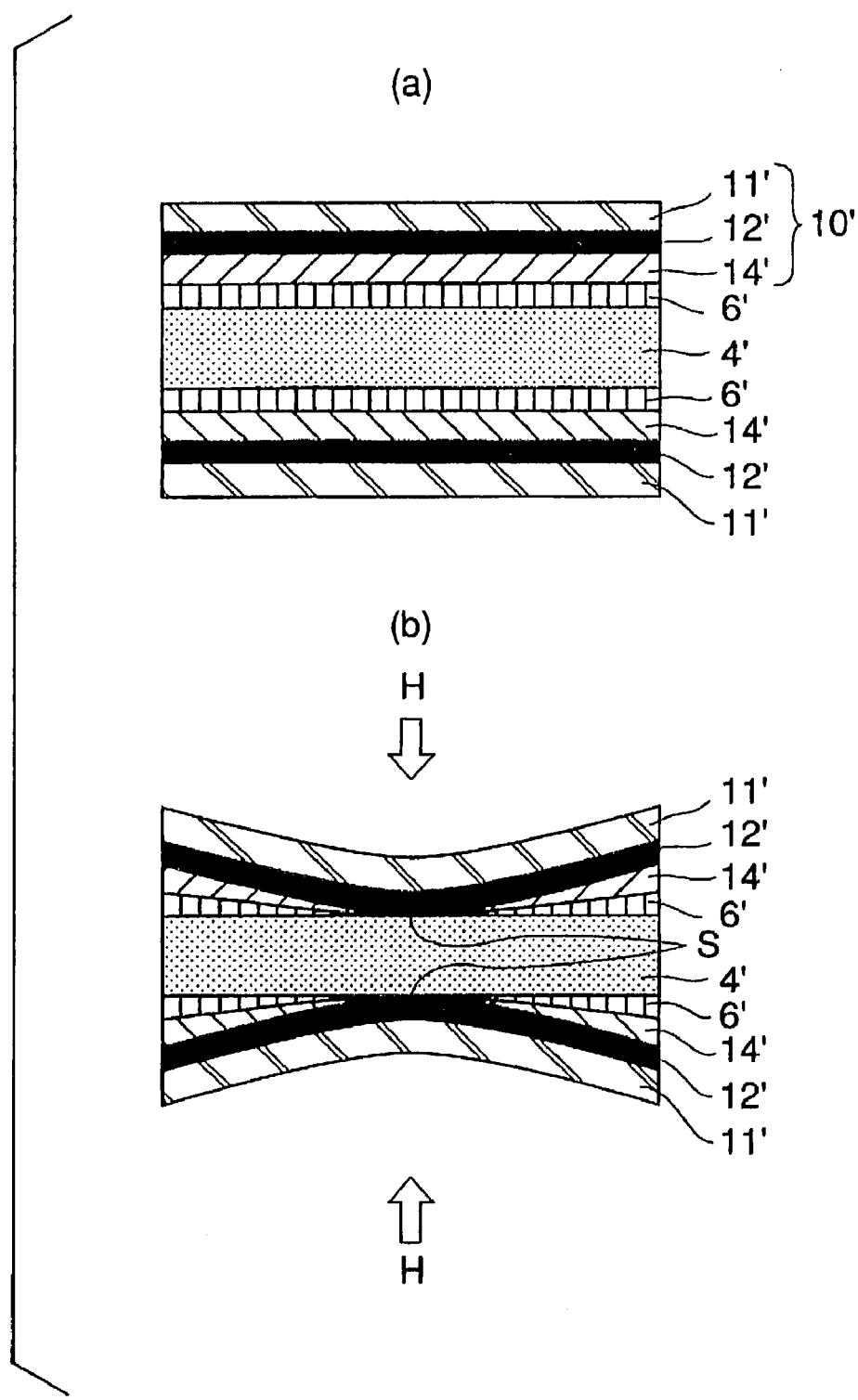
FIG. 3G is a diagram illustrating root cutting in an adhesive resin layer having a conventional composition, wherein (a) is a cross-sectional view of a packaging material for a battery and (b) an enlarged view of Y2 part.

The capability of maintaining the performance of the battery body for a long period of time is required of the armor body for a battery. For example, as shown in FIG. 3G (a), a packaging material 10' for armor body formation comprises a substrate layer 11', a barrier layer 12', a sealant layer 14' and the like stacked on top of one another by various lamination methods. In particular, when the sealant layer in the laminate constituting the armor body for a battery (hereinafter referred to as "armor body") comprises a polyolefin resin or the like, and, in this case, when an acid-modified polyolefin film is used in a portion where a lead 4' exists, for example, as a film 6' for a lead, in housing the battery body in the armor body and hermetically sealing the assembly by sealing the peripheral edge, as shown in FIG. 3G (b), both the sealant layer 14' in the armor body and the film 6' for a lead are melted by heat and pressure for heat sealing and, further, upon the application of pressure, the barrier layer 12' in the armor body 10' often comes into contact with the lead 4 formed of a metal, resulting in short-circuiting S.

Figure 3H:
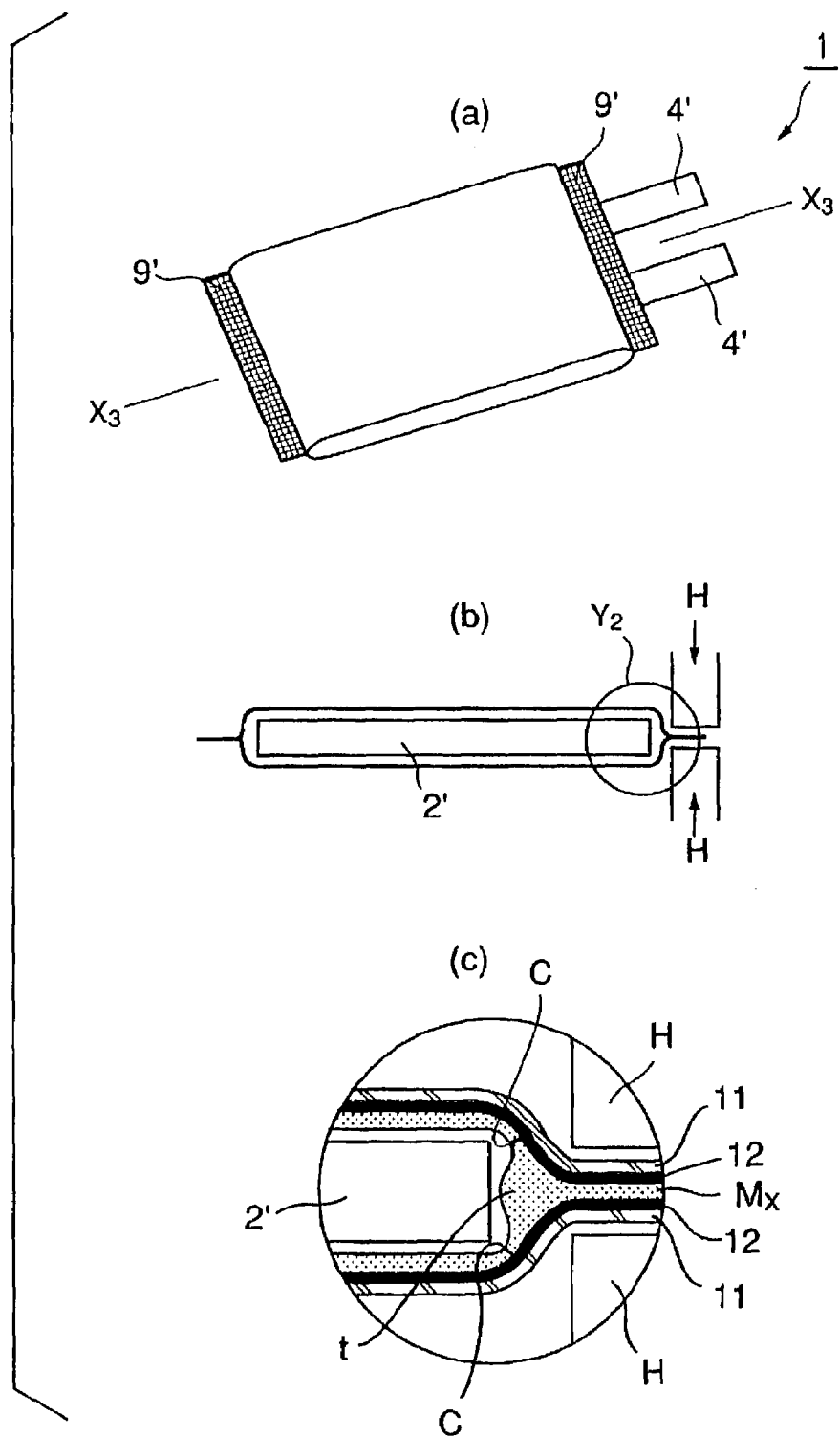
FIG. 3H is a diagram showing root cutting caused at the time of hermetic sealing of the peripheral edge of an armor body using a conventional packaging material for a battery, wherein (a) is a perspective view of a battery, (b) a cross-sectional view taken on line X3—X3, and (c) an enlarged view of Y2 part.

As shown in FIGS. 3H (a) to 3H (c), at the time of heat sealing of the peripheral edge of the armor body, very small root cutting C often occurs in the sealant layer 14' around the inner edge of the sealed part. When the root cutting C occurs, the electrolysis solution comes into direct contact with the barrier layer. This breaks insulation among the battery body 2', the lead 4', and the barrier layer 12' and consequently creates a potential difference. The potential difference results in the formation of throughholes in the barrier layer 12' due to the corrosion of the barrier layer 12' and the formation of a reaction product of a metal ion as the electrolyte called "dendrite." These unfavorable phenomena shorten the service life of the battery.

The present inventors have made extensive and intensive studies on the prevention of the short-circuiting and root cutting caused around the sealed part and, as a result, have found that the above problem can be solved by adopting such a construction that the packaging material for forming the armor body, for a battery, adapted for use in such a manner that a battery body is inserted into the armor body and the peripheral edge of the armor body is then heat sealed for hermetic sealing, is a laminate, as shown in FIG. 3A (a), comprising at least a substrate layer 11, an adhesive layer 16, a barrier layer 12, a conversion treated layer 15, an adhesive resin layer 13, and a sealant layer 14, or alternatively a laminate, as shown in FIG. 3B (b), comprising at least a substrate layer 11, an adhesive layer 16, a conversion treated layer 15 (1), aluminum 12, a conversion treated layer (2), an adhesive resin layer 13, and a sealant layer 14, wherein the adhesive resin layer is formed of a resin having a melt index in the range of 5 to 20 g/10 min. This has led to the completion of the present invention.

The resin for the formation of the adhesive resin layer in the packaging material for a battery according to the present invention (hereinafter referred to as "adhesive resin") is a resin which is used for laminating the barrier layer and the sealant layer onto top of each other, the service life of the battery. The occurrence of the root cutting C is considered attributable to the fact that, in the above heat sealing, the adhesive resin layer 13 and the sealant layer 14 in the sealed portion (these layers being collectively referred to as "heat fused layer Mx") are likely to be crystallized, while the nonsealed portion remains in the noncrystalline state, whereby the resin at the boundary therebetween is unstable and is likely to cause root cutting C.

The adhesive resin layer in the packaging material for a battery according to the present invention has a melt index of 5 to 20 g/10 min. The adhesive resin layer may not be formed of a single resin. For example, LDPE, a low crystalline ethylene-butene-propylene copolymer with a density of not more than 900 kg/M$^3$, a noncrystalline ethylene-propylene copolymer, a propylene-α-olefin copolymer, and a rubber component, such as butadiene, may be added to an acid-modified polypropylene having good film forming properties and having a large MI value to bring the apparent melt index, which will be described later, to 5 to 20 g/10 min.

Further, the adhesive resin layer in the packaging material for a battery according to the present invention may have such a composition that two or more resins of the same type, for example, polypropylene resins, different from each other in MI have been blended together. In this case, acid-modified polypropylene is used as at least any one of the polypropylene resins to ensure strength of bonding to the polypropylene sealant. Here polypropylene in the polypropylene resin may be homo-type polypropylene, random-type polypropylene, block-type polypropylene, or a terpolymer resin which is a propylene-ethylene-butene copolymer. "Acid-modified" means that an unsaturated carboxylic acid has been graft polymerized.

In the present invention, when two or more resins are blended together, the apparent MI of the resin blend is preferably in the range of 5 to 20 g/10 min. MI may be measured by the method specified in JIS K 7210.

As described above, when the resin for adhesive resin layer formation has a melt index in the range of 5 to 20 g/10 min, for example, as compared with the case where a resin having a melt index of 22 to 30 is used as the adhesive resin, the flow of the heat seal resin can be reduced to maintain the layer thickness of the sealant layer and, in has a laminate strength high enough to ensure bonding to each of the above layers, and has a melt index in the range of 5 to 20 g/10 min.

The melt index (hereinafter referred to as "MI") is a value as measured according to JIS K 7210.

In the present invention, when the adhesive resin layer is a single resin layer, the resin used is preferably an acid-modified polyolefin, such as acid-modified polyethylene or acid-modified polypropylene, metal-crosslinked polyethylene, a copolymer of ethylene with an acrylic acid or methacrylic acid derivative, a copolymer of ethylene with vinyl acetate, or the like, wherein all of these polymers have an MI value in the range of 5 to 20 g/10 min.

When the packaging material for a battery is formed using an adhesive resin layer formed of a resin having a melt index (hereinafter referred to as "MI") of more than 20 g/10 min, short-circuiting occurs in the lead part at the time of heat sealing in the packaging of a battery and, in addition, root cutting often occurs near the sealed part. On the other hand, when the adhesive resin layer is formed of a polypropylene resin having a small melt index (hereinafter referred to as "MI") of 0.3 to 3 g/10 min, the film forming speed at the time of sandwich lamination and coextrusion lamination is disadvantageously lowered, or otherwise the layer thickness becomes uneven and, consequently, a problem of uneven layer thickness occurs.

In the prior art, in sandwich lamination or coextrusion lamination, acid-modified polypropylene having a large melt index has been used as an adhesive resin from the viewpoint of maintaining the productivity. When a battery body is housed in an armor body formed of a laminate formed using this adhesive resin followed by heat sealing for hermetic sealing under conventional conditions of 190° C., 1.0 MPa, and 3 sec, as shown in FIG. 3H (c), root cutting C occurs in a portion near a resin pool t formed in the joint part in the sealed part. As a result, an electrolysis solution permeates through the root cutting C and comes into direct contact with the barrier layer 12. This breaks insulation between the metal of the lead 4 and the barrier layer and consequently creates a potential difference at that portion. The potential difference often results in the formation of throughholes due to the corrosion of the barrier layer 12 and the formation of a reaction product of a metal ion as the electrolyte called "dendrite." These unfavorable phenomena shorten addition, the adhesive resin layer after heat sealing. For example, as shown in FIG. 3B (a), FIG. 3B (b), and FIG. 3B (c), after heat sealing, the adhesive resin layer 13 and the sealant layer 14 stay in a film form between the barrier layer 12 and the lead 4 to maintain insulating properties. Further, as shown in FIG. 3B (d), FIG. 3B (e), and FIG. 3B (f), also in the case of interposition of a film 6 for a lead between the laminate 10 in the armor body and the lead 4, after heat sealing, even when the film 6 for a lead has been melted, the adhesive resin layer 13 and the sealant layer 14 advantageously stay in a film form between the barrier layer 12 and the lead 4 to maintain the insulating properties. As a result, short-circuiting S between the barrier layer 12 and the lead 4 can be prevented.

Further, the formation of a resin pool t formed near the inner edge of the sealed part and root cutting C caused at the end of the resin pool t can be prevented. In the present invention, since the adhesive resin layer has a small melt index of 5 to 20 g/10 min, when heat sealing for hermetic sealing is carried out under the same conditions as described above, the thickness of adhesive resin layer 13 in the heat fused layer Mx is not reduced and, consequently, the occurrence of the root cutting C can be advantageously prevented.

The packaging material for a battery is used for the formation of an armor body for packaging a battery body, and types of the packaging material may be divided according to the type of the armor body into a pouch type as shown in FIG. 3 and an emboss type as shown in FIG. 3D (a), FIG. 3D (b), or FIG. 3D (c). The pouch type may be a bag type such as a three sided seal type, a four sided seal type, or a pillow type. FIG. 3 shows a pillow type as an example of the type of the armor body.

In the emboss type, as shown in FIG. 3D (a), a concave portion may be formed on one side of the armor body. Alternatively, a construction may be adopted wherein, as shown in FIG. 3D (b), a concave portion is formed on both sides of the armor body, a battery body is housed in the armor body, and the four peripheral sides of the armor body are heat sealed to hermetically seal the assembly. Further, a construction may also be adopted wherein, as shown in FIG. 3D (c), a concave portion is formed on both sides of the armor body with a folded portion sandwiched, a battery is housed in the armor body, and the three sides of the armor body are heat sealed. When the packaging material for a battery is of an emboss type, as shown in FIGS. 3E (a) to 3E (d), the stacked packaging material 10 is subjected to press molding to form a concave portion 7.

As shown in FIG. 3A (a), the packaging material for a battery according to the present invention is a laminate comprising at least a substrate layer 11, an adhesive layer 16, aluminum 12, a conversion treated layer 15, an adhesive layer 13d, and a multilayered sealant layer 14. When an armor body, which will be described later, is of an emboss type, as shown in FIG. 3A (b), the laminate preferably comprises a substrate layer 11, an adhesive layer 16, a conversion treated layer 15 (1), aluminum 12, a conversion treated layer 15 (2), an adhesive layer 13d, and a multilayered sealant layer 14.

In the present invention, bonding between the conversion treated layer in the barrier layer and the sealant layer in the lamination of the packaging material for a battery is carried out by a sandwich lamination method using an adhesive resin layer or a coextrusion lamination method. In this case, the following bonding stabilization treatment is preferably carried out from the viewpoint of preventing delamination by hydrofluoric acid or the like evolved as a result of a reaction of the electrolysis solution in a lithium ion battery or the like with water.

A laminate having predetermined bonding strength, as shown in FIG. 3A (a), can be prepared, for example, by stacking a substrate layer 11 on one side of a barrier layer 12 by dry lamination 16, and extruding an acid-modified polyolefin 13 onto the other side (conversion treated layer 15) of the barrier layer 12 to stack a sealant layer 14 by sandwich lamination to prepare a laminate, or alternatively coextruding an acid-modified polyolefin resin 13 and a sealant layer 14 to prepare a laminate, and then heating the laminate at a temperature at or above the softening point of the acid-modified polypropylene resin 13.

As shown in FIG. 3A (b), the conversion treated layer 15 may be provided on both sides of the barrier layer 12. Specific examples of heating methods include a hot roll contact method, a hot air method, and a near-infrared or far-infrared method. In the present invention, any heating method may be used so far as, as described above, the adhesive resin can be heated at a temperature at or above the softening temperature thereof. A laminate having stable bonding strength can also be prepared by a further method wherein, at the time of the above sandwich lamination or coextrusion lamination, heating is carried out so that the temperature of the surface of the aluminum 12 on its sealant layer side reaches the softening point of the acid-modified polypropylene resin.

The lead for a battery is formed of an elongated sheet or rod metal. The sheet lead has a thickness of 50 to 2,000 μm and a width of about 2.5 to 20 mm and is formed of ALM, copper (Cu) (copper plated with nickel (Ni)), nickel or the like.

When the sealant layer in the packaging material for a battery according to the present invention does not have heat adhesion to the metal, as shown in FIG. 3B (d) or FIG. 3F, a film 6 for a lead having heat sealing properties on both the sealant layer 14 and the lead 4 at the time of hermetic sealing should be interposed between the lead 4 in the battery and the laminate 10. An example of a method for interposing the film for a lead is as follows. As shown in FIGS. 3F (a) and 3F (b), the film 6 for a lead is placed on the upper side and the lower side of the hermetic sealing part of the lead 4 in the battery body 2 (in fact, the film being fixed by temporary sealing on the upper side and the lower side of the hermetic sealing part), and the battery body 2 is inserted into the armor body 5, followed by heat sealing in such a state that the lead part is sandwiched, whereby the assembly is hermetically sealed. Another example of a method for placing the film 6 for a lead on the lead 4 is to wind a film 6 for a lead around the lead 4 at its predetermined position, as shown in FIG. 3F (d) or FIG. 3F (e).

Specific examples of materials for the film 6 for a lead include acid-modified polypropylene (unsaturated carboxylic acid-grafted random propylene), metal-crosslinked polyethylene, a copolymer of ethylene with an acrylic acid or methacrylic acid derivative, and a copolymer of ethylene with vinyl acetate. These materials may be used solely, as a blend of two or more, or in other forms.

The layer thickness of the film 6 for a lead may be one-third or more of the thickness of the lead 4 used. For example, when the thickness of the lead 4 is 100 μm, the total thickness of the film 6 for a lead may be about 30 μm or more.

The packaging material for a battery is used for the formation of an armor body for packaging a battery body, and types of the packaging material may be divided according to the type of the armor body into a pouch type as shown in FIG. 3C and an emboss type as shown in FIG. 3D (a), FIG. 3D (b), or FIG. 3D (c). The pouch type may be a bag type such as a three sided seal type, a four sided seal type, or a pillow type. FIG. 3C shows a pillow type as an example of the type of the armor body.

In the emboss type, as shown in FIG. 3D (a), a concave portion may be formed on one side of the armor body. Alternatively, a construction may be adopted wherein, as shown in FIG. 3D (b), a concave portion is formed on both sides of the armor body, a battery body is housed in the armor body, and the four peripheral sides of the armor body are heat sealed to hermetically seal the assembly. Further, a construction may also be adopted wherein, as shown in FIG. 3D (c), a concave portion is formed on both sides of the armor body with a folded portion sandwiched, a battery is housed in the armor body, and the three sides of the armor body are heat sealed. When the packaging material for a battery is of an emboss type, as shown in FIGS. 3E (a) to 3E (d), the stacked packaging material 10 is subjected to press molding to form a concave portion 7.

Next, each layer constituting the packaging material for a battery according to the present invention will be described. The substrate layer 11 in the armor body is formed of an oriented polyester or a nylon film. Polyester resins usable herein include polyethylene terephthalate, polybutylene terephthalate, polyethylene naphthalate, polybutylene naphthalate, interpolyester, and polycarbonate. Nylons usable herein include polyamide resins, that is, nylon 6, nylon 6, 6, a copolymer of nylon 6 with nylon 6, 6, nylon 6, 10, and poly-m-xylyleneadipamide (MXD 6).

When the substrate layer 11 is used as a battery, the substrate layer 11 is a site which comes into direct contact with the hardware. Therefore, basically, the substrate layer 11 is preferably a resin layer having insulating properties. When the presence of pinholes in the film per se, the occurrence of pinholes at the time of fabrication and the like are taken into consideration, the substrate layer should have a thickness of not less than 6 µm, preferably 12 to 30 µm.

In order to improve anti-pinhole properties and insulating properties of the armor body for a battery, the substrate layer 11 may be in the form of a laminate.

When the substrate layer is in the form of a laminate, the substrate layer includes at least one unit of two or more resin layers and, in this case, the thickness of each layer is not less than 6 µm, preferably 12 to 30 µm. Examples of the substrate layer having a multilayer structure include the following layer constructions 1) to 8).

1) Oriented polyethylene terephthalate/oriented nylon, and

2) Oriented nylon/oriented polyethylene terephthalate.

Further, from the viewpoint of machinability (stable carriage in a packaging machine or a processing machine) of the packaging material, surface protective properties (heat resistance and electrolyte resistance), a reduction in frictional resistance between the mold and the substrate layer at the time of embossing to form an emboss-type armor body for a battery by fabrication, or protection of the substrate layer upon the deposition of an electrolysis solution, preferably, the substrate layer has a multilayer structure, and a fluororesin layer, an acrylic resin layer, a silicone resin layer, a polyester resin layer, a resin layer formed of a blend of two or more of the above materials or the like is provided on the surface of the substrate layer. Examples of this type of substrate layer include 3) fluororesin/oriented polyethylene terephthalate (the fluororesin layer is constituted by a fluororesin film or is formed by liquid coating and then drying), 4) silicone resin/oriented polyethylene terephthalate (the silicone resin layer is constituted by a silicone resin film or is formed by liquid coating and then drying), 5) fluororesin/oriented polyethylene terephthalate/oriented nylon, 6) silicone resin/oriented polyethylene terephthalate/oriented nylon, 7) acrylic resin/oriented nylon (the acrylic resin layer is constituted by an acrylic resin film or is formed by liquid coating and then drying for curing), and 8) acrylic resin+polysiloxane-grafted acrylic resin/oriented nylon (the acrylic resin layer is constituted by an acrylic resin film or is formed by liquid coating and then drying for curing).

The barrier layer 12 is a layer for preventing the entry of particularly water vapor in the battery from the exterior. From the viewpoints of pinholes in the barrier layer per se and stabilization of fabricability (pouching or emboss moldability) and of imparting anti-pinhole properties, not less than 15 µm-thick aluminum, nickel or other metal, or a film with an inorganic compound, for example, silicon oxide or alumina, vapor deposited thereon may be mentioned as the barrier layer. Preferably, however, the barrier layer is 20 to 80-µm thick aluminum.

When a further reduction in occurrence of pinholes and the formation of an emboss-type armor body for a battery are contemplated, studies conducted by the present inventors have revealed that, in order to prevent cracking and the like at the time of emboss molding, when the barrier layer is formed of aluminum having an iron content of 0.3 to 9.0% by weight, preferably 0.7 to 2.0% by weight, as compared with iron-free aluminum, the iron-containing aluminum has better ductility and the occurrence of pinholes of the laminate by folding can be reduced and, at the same time, the formation of the side wall at the time of molding of the emboss-type armor body is easier. When the iron content is less than 0.3% by weight, for example, the effect of preventing the occurrence of pinholes and the effect of improving emboss moldability cannot be attained. On the other hand, when the iron content of the aluminum exceeds 9.0% by weight, the flexibility as the aluminum is hindered and the suitability of the laminate for bag making is deteriorated.

For aluminum produced by cold rolling, the flexibility, the nerve, and the hardness vary depending upon conditions for annealing treatment. For aluminum used in the present invention, somewhat or fully annealed aluminum, which is relatively soft, is preferred rather than a hardening treated product not subjected to annealing.

The flexibility, nerve, and hardness of aluminum, that is, conditions for annealing, may be properly selected according to suitability for fabrication (pouching or emboss molding). For example, in order to prevent the occurrence of wrinkles and pinholes at the time of emboss molding, the use of soft aluminum, which has been annealed depending upon the degree of molding, is preferred.

The present inventors have found that, when conversion treatment is carried out on the front and back sides of aluminum as the barrier layer 12 in the packaging material for a battery, a laminate, which is satisfactory as the packaging material, can be provided. Specifically, the conversion treatment refers to the formation of an acid-resistant film of a salt of phosphoric acid, a salt of chromic acid, a fluoride, a triazinethiol compound or the like. Phosphoric acid chromate treatment using a three-component system of a phenolic resin, a chromium(III) fluoride compound, and phosphoric acid among the above acid-resistant film forming materials can provide good results. Further, a conversion treating agent comprising a resin component containing at least a phenolic resin and, added thereto, a metal, such as molybdenum, titanium, or zirconium, or a metal salt can provide good results. Advantageously, the formation of the acid-resistant film can prevent delamination between the aluminum and the substrate layer at the time of emboss molding, can prevent dissolution and corrosion of the surface of aluminum, particularly dissolution and corrosion of aluminum oxide present on the surface of the aluminum, by hydrogen fluoride produced as a result of a reaction of an electrolyte in the battery with water, can improve the adhesion (wettability) of the surface of aluminum, can prevent delamination between the substrate layer 11 and the aluminum 12 at the time of emboss molding and heat sealing, and can prevent delamination on the inner side of the aluminum by hydrogen fluoride produced as a result of a reaction of the electrolyte with water.

The present inventors have carried out conversion treatment of the surface of the aluminum using various materials and have made studies on the effect of the conversion treatment. As a result, it was found that phosphoric acid chromate treatment using a three-component system of a phenolic resin, a chromium(III) fluoride compound, and phosphoric acid among the above acid-resistant film forming materials can provide good results.

Further, a conversion treating agent comprising a resin component containing at least a phenolic resin and, added thereto, a metal, such as molybdenum, titanium, or zirconium, or a metal salt can provide good results.

When the armor body is of a pouch type, the conversion treatment of aluminum may be carried out on one side (only sealant layer side) of the aluminum or both sides (substrate layer side and sealant layer side) of the aluminum. On the other hand, when the armor body of the battery is of an emboss type, conversion treatment of both sides of the aluminum can prevent delamination between the aluminum and the substrate layer at the time of emboss molding.

As described above, the adhesive resin layer 13 is a resin which is melt extruded at the time of the lamination of the barrier layer 12 and the sealant layer 14 by sandwich lamination or coextrusion lamination and has an MI value in the range of 5 to 20.

The sealant layer in the packaging material for a battery according to the present invention may be formed of a polyethylene resin, a polypropylene resin or the like. Polypropylene resins usable herein include, for example, homo-type polypropylene, random-type polypropylene, and block-type polypropylene. If necessary, the sealant layer may have a multilayer structure of two or more layers. The total thickness of the sealant layer is suitably 20 to 200 µm.

D. Fourth Aspect of the Invention

1. Specific Embodiments

Specific embodiments of the fourth aspect of the present invention are as follows. The invention as defined in claim 22 provides a packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer 1, a barrier layer, an adhesive layer 2, and a sealant layer, characterized in that the sealant layer comprises one resin layer or a laminate of two or more resin layers comprising metallocene linear low-density polyethylene. The invention as defined in claim 23 is characterized in that the sealant layer as defined in claim 22 is formed of a metallocene linear low-density polyethylene resin. The invention as defined in claim 24 is characterized in that the sealant layer as defined in claim 21 is formed of a polyethylene resin containing not less than 10% of a metallocene linear low-density polyethylene resin. The invention as defined in claim 25 is characterized in that the sealant layer as defined in claim 22 has a multilayer structure comprising at least a layer formed of a metallocene linear low-density polyethylene resin. The invention as defined in claim 26 is characterized in that the sealant layer as defined in claim 21 has a multilayer structure comprising a polyethylene resin layer containing not less than 10% of a metallocene linear low-density polyethylene resin. The invention as defined in claim 27 is characterized in that the adhesive layer 2 as defined in claim 22 has been formed by dry lamination. The invention as defined in claim 28 is characterized in that the adhesive layer 2 as defined in claim 22 is an acid-modified polyolefin coating-baked layer. The invention as defined in claim 29 is characterized in that the adhesive layer 2 as defined in claim 22 is an extruded layer of an acid-modified polyolefin.

2. Embodiments of the Invention

The packaging material for a battery according to the present invention is a packaging material for forming an armor body for a battery. The packaging material comprises at least a substrate layer, an adhesive layer, a conversion treated layer 1, aluminum, a conversion treated layer 2, an adhesive layer, and a sealant layer, wherein the sealant layer comprises at least a metallocene linear low-density polyethylene (hereinafter referred to as "metallocene LLDPE") resin. According to this construction, stable emboss moldability and suitability for sealing can be realized.

Further, a packaging material free from delamination is provided by the adoption of a specific method for laminating aluminum and a sealant layer onto top of each other. The present invention will be described in more detail with reference to the accompanying drawings and the like.

Figure 4C:
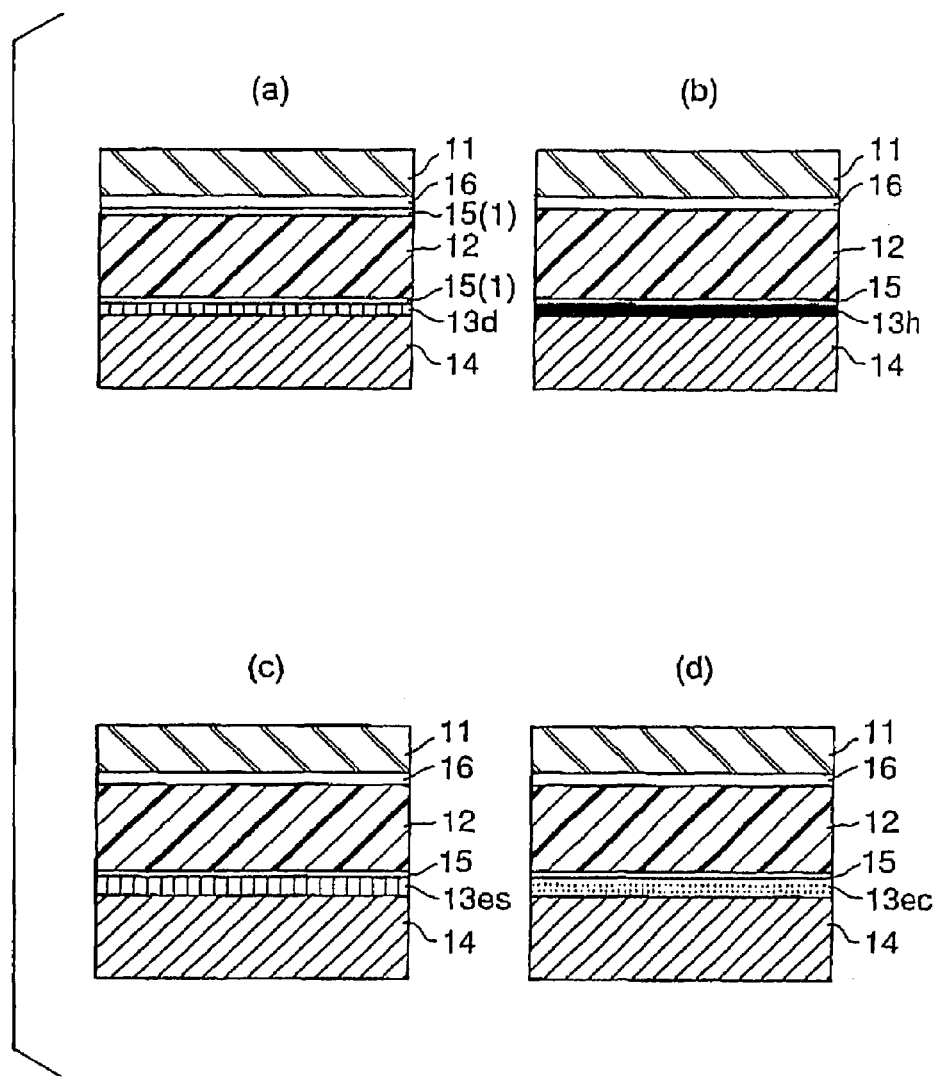
FIG. 4C is a cross-sectional view of packaging materials for a battery according to the present invention which are different from one another in lamination method used for the formation thereof, wherein (a) is a diagram showing a packaging material formed by dry lamination, (b) a diagram showing a packaging material formed by hot lamination, (c) a diagram showing a packaging material formed by sandwich lamination, and (d) a diagram showing a packaging material formed by coextrusion lamination.
Figure 4E:
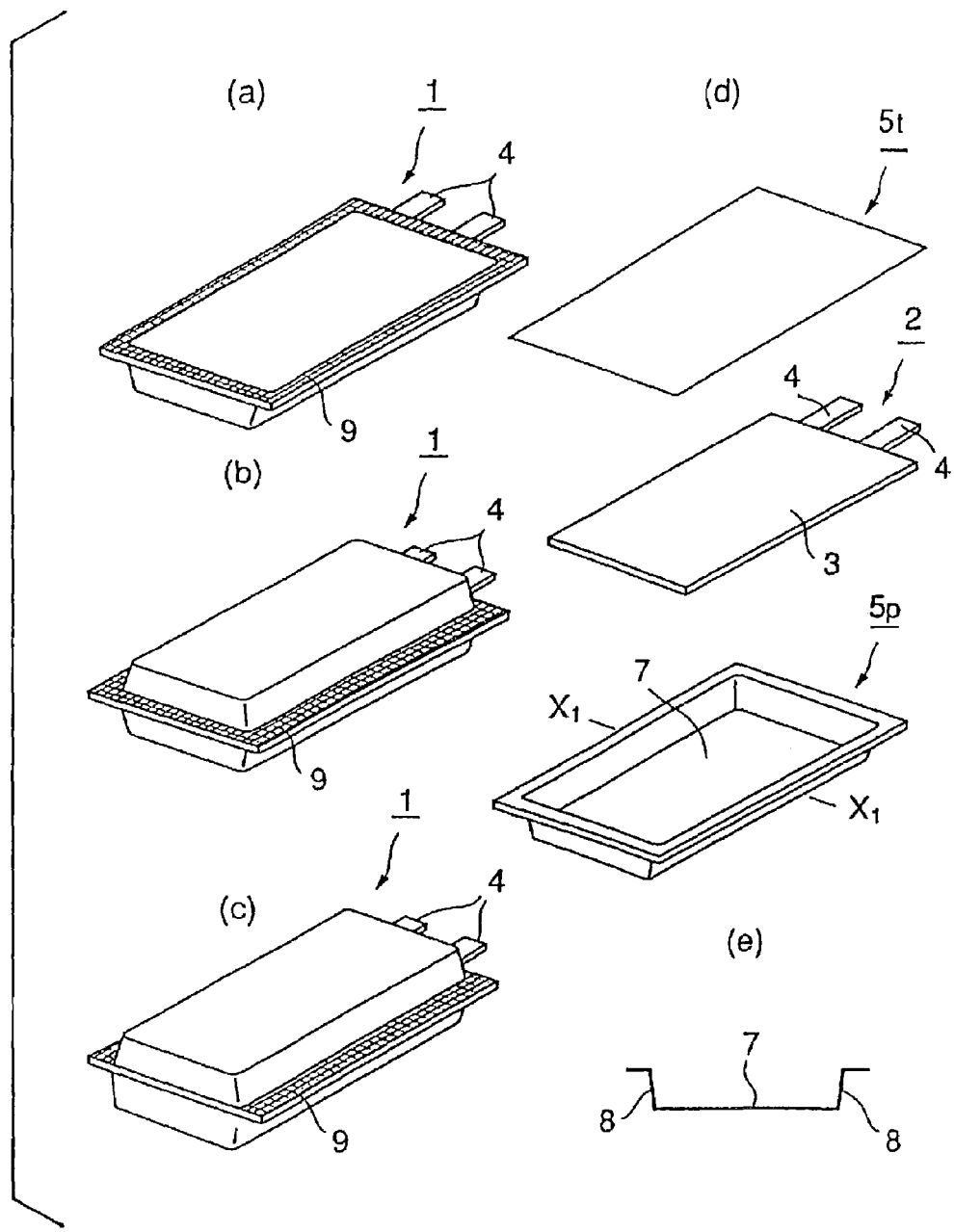
FIG. 4E is a perspective view illustrating an emboss-type armor body for a battery.
Figure 4F:
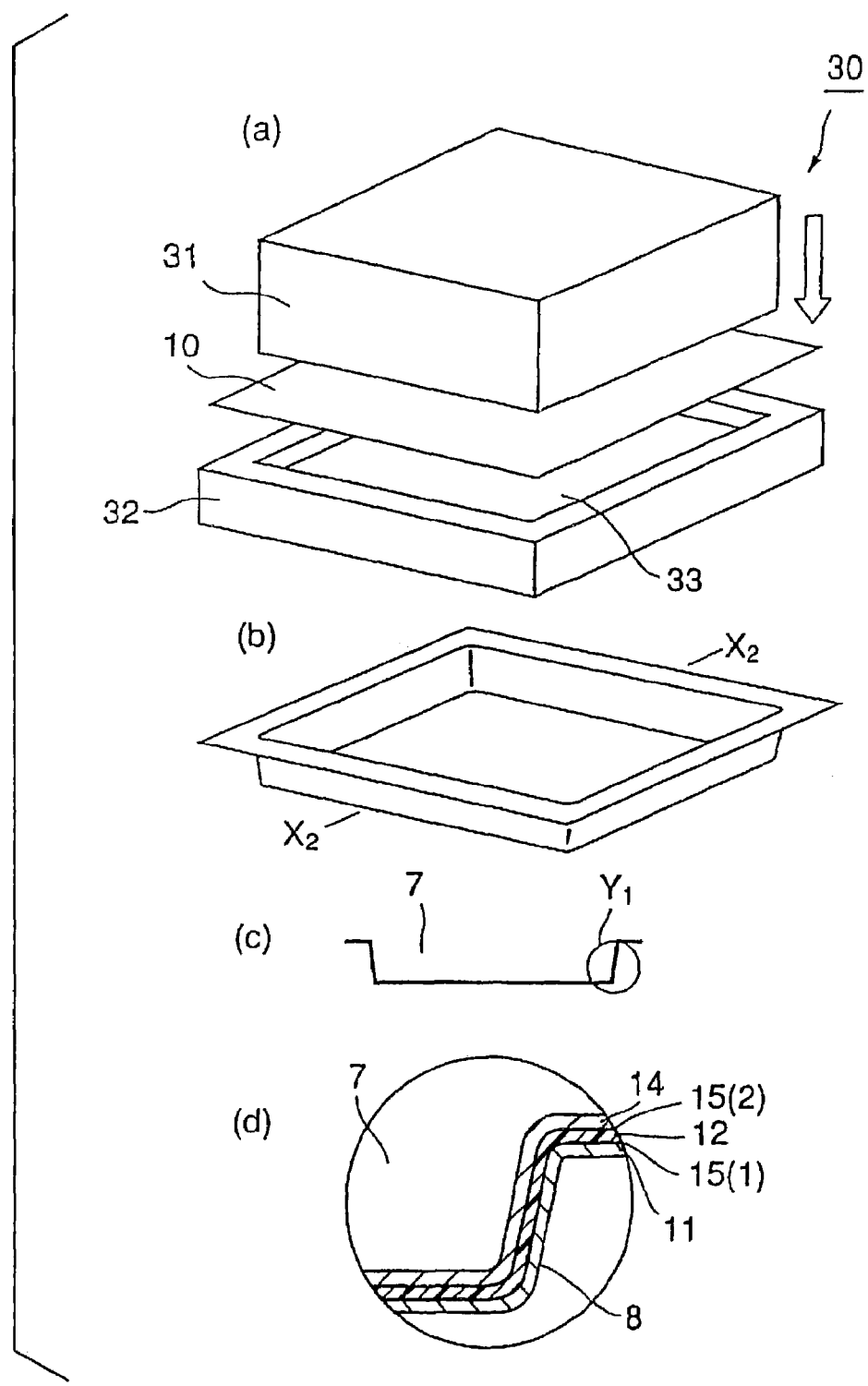
FIG. 4F illustrates molding at the time of the formation of an emboss-type armor body, wherein (a) is a perspective view, (b) a diagram showing an emboss molded main body of an armor body, (c) a cross-sectional view taken on line X2—X2, and (d) an enlarged view of Y1 part.

FIG. 4A is an explanatory view of the packaging material for a battery according to the present invention, wherein (a) is a cross-sectional view showing an embodiment of a laminate and (b) a cross-sectional view showing another embodiment of the laminate. FIG. 4B is a diagram illustrating the construction of a sealant layer, wherein (a) is a cross-sectional view of a sealant layer having a single-layer structure, (b) a cross-sectional view of a sealant layer having a two-layer structure, and (c) a cross-sectional view of a sealant layer having a three-layer structure. FIG. 4C is a cross-sectional view of packaging materials for a battery according to the present invention which are different from one another in lamination method used for the formation thereof, wherein (a) is a diagram showing a packaging material formed by dry lamination, (b) a diagram showing a packaging material formed by hot lamination, (c) a diagram showing a packaging material formed by sandwich lamination, and (d) a diagram showing a packaging material formed by coextrusion lamination. FIG. 4D is a perspective view illustrating a pouch-type armor body for a battery. FIG. 4E is a perspective view illustrating an emboss-type armor body for a battery. FIG. 4F illustrates molding at the time of the formation of an emboss-type armor body, wherein (a) is a perspective view, (b) a diagram showing an emboss-molded main body of an armor body, (c) a cross-sectional view taken on line X2—X2, and (d) an enlarged view of Y1 part.

The packaging material for a battery comprises a laminate comprising at least a substrate layer, a barrier layer, and a sealant layer. It has been confirmed that the interlaminar bonding strength among the above layers affects properties required of the armor body of the battery. For example, unsatisfactory bonding strength between the barrier layer and the sealant layer is causative of the entry of water from the exterior. The entry of water causes the corrosion of the aluminum face by hydrofluoric acid produced by a reaction of the electrolyte in the components constituting the battery with the above water and consequently causes delamination between the barrier layer and the sealant layer. Further, in the formation of the emboss-type armor body, at the time of press molding of the laminate to form a concave portion, delamination between the substrate layer and the barrier layer often occurs.

As shown in FIG. 4A (a), the packaging material for a battery is a laminate comprising at least a substrate layer 11, an adhesive layer 16, aluminum 12, a conversion treated layer 15, an adhesive layer 13, and a sealant layer 14. In the case of the emboss-type armor body, as shown in FIG. 4A (b), the laminate preferably comprises a substrate layer 11, an adhesive layer 16, a conversion treated layer 15 (1), aluminum 12, a conversion treated layer 15 (2), an adhesive layer 13, and a sealant layer 14.

In the case of the emboss-type armor body, when a resin having a high tensile modulus of elasticity is used in the sealant layer, at the time of emboss molding, the sealant layer often undergoes whitening or slight cracking in its surface. Further, the molding stability is poor, and pinholes, molding wrinkling, or cracks often occur.

Further, hermetical sealing properties after filling of the contents and sealing may be mentioned as properties which are indispensable as the packaging material for a battery. For example, when the seal strength of the packaging material is low, a satisfactory time is necessary for sealing in a content filling/sealing line. This significantly hinders cycle shortening and often deteriorates the production efficiency.

The present inventors have made extensive and intensive studies and, as a result, have found that the above problems can be solved when the packaging material for forming an armor body, for a battery, adapted for use in such a manner that a battery body is inserted into the armor body and the peripheral edge of the armor body is heat sealed for hermetic sealing, is a laminate, as shown in FIG. 4A (a), comprising, for example, a substrate layer 11, an adhesive layer 16, a barrier layer 12, a conversion treated layer 15, an adhesive resin layer 13, and a sealant layer 14, wherein the sealant layer 14 comprises one resin layer or a laminate of two or more resin layers comprising metallocene linear low-density polyethylene. This has led to the completion of the present invention.

The metallocene linear low-density polyethylene refers to polyethylene which has been polymerized in the presence of a metallocene catalyst (a single-site catalyst) and, as compared with the conventional linear low-density polyethylene, is smaller in the number of branches in the side chain and is more uniform in distribution of molecular weight and comonomers. Therefore, the metallocene linear low-density polyethylene has excellent properties such as high transparency, low melting point, and high impact resistance.

The sealant layer in the packaging material for a battery according to the present invention will be described. In the sealant layer, as shown in FIG. 4B (a), a resin layer containing the metallocene linear low-density polyethylene may be a single layer S formed of a metallocene linear low-density polyethylene resin (hereinafter referred to as "MLL") or may be a single layer S formed of a polyethylene resin blended with not less than 10% by weight of MLL. In the case of the MLL-blended polyethylene resin, when the MLL blending ratio is less than 10% by weight, the effect of improving moldability, which is to be attained by the present invention, cannot be developed.

The sealant layer in the packaging material for a battery according to the present invention may have a two-layer structure of the above resin layer S3 formed of MLL and another resin layer S2 formed of MLL as shown in FIG. 4B (b), or alternatively may have a three-layer structure of the above resin layers S3 and S2 and a further layer Si formed of MLL as shown in FIG. 4B (c). The resin layers S1 to S3 each formed of MLL may be MLL-blended polyethylene resin layers. In this case, however, the resin layer S3 as the innermost layer is preferably formed of MLL.

In the present invention, as shown in FIG. 4B (b) or FIG. 4B (c), when the sealant layer 14 has a multilayer structure of an MLL layer S3 or a blend resin layer S3 containing not less than 10% by weight of the MLL resin and the other layers S1 and S2, the resin constituting the other layers S1 and S2 may be, for example, a low-density polyethylene resin, a medium-density polyethylene resin, a high-density polyethylene resin, a polypropylene resin, or an acid-modified polyolefin that is any one of the above resins onto which an unsaturated carboxylic acid has been grafted.

In the present invention, when the sealant layer 14 has a multilayer structure of an MLL layer or a blend resin layer (hereinafter referred to as "MLL-blended layer") containing not less than 10% by weight of the MLL resin and other layer(s), the thickness of the MLL layer or the MLL-blended layer is preferably not less than 15% of the total thickness of the sealant layer. When the thickness of the MLL layer or the MLL-blended layer is less than 15% of the total thickness of the sealant layer, the effect of improving the moldability is not developed.

In the formation of the laminate for the packaging material for a battery according to the present invention, the barrier layer and the sealant layer may be laminated onto top of each other, for example, by dry lamination, sandwich lamination, coextrusion lamination, or hot lamination.

The present inventors have made extensive and intensive studies on lamination methods which can provide stable bonding strength. As a result, they have confirmed that predetermined bonding strength can also be provided by the following methods. Specifically, a barrier layer 12, in which at least a surface to be laminated with a sealant layer has been conversion treated, and a substrate layer 11 are laminated onto top of each other by dry lamination. The sealant layer is then laminated onto the conversion treated layer provided on the barrier layer by a bonding method, as shown in FIG. 4C (a), wherein they are laminated (13d) by dry lamination, or by a bonding method, as shown in FIG. 4C (b), wherein an emulsion of acid-modified polyethylene is coated onto the conversion treated layer, the coating is dried and baked (13h), and a metallocene LLDPE film as a sealant layer is then stacked onto the baked layer by hot lamination.

The present inventors have further confirmed that stable bonding strength can also be provided by the following lamination methods.

Specifically, a substrate layer 11 is laminated by dry lamination onto one side of a barrier layer 12 with both sides thereof being conversion treated. Thereafter, as shown in FIG. 4C (c), acid-modified polyethylene 13es is extruded on the other side of the barrier layer 12 to laminate a sealant layer 14 by sandwich lamination, or alternatively, as shown in FIG. 4C (d), an acid-modified polyethylene resin 13ec and a metallocene LLDPE resin as a sealant layer 14 are coextruded. Thus, a laminate is prepared. The laminate is then heated to such a state that the acid-modified polyethylene resin reaches a temperature at or above the softening point of the acid-modified polyethylene resin.

Specific examples of heating methods include a hot roll contact method, a hot air method, and a near-infrared or far-infrared method. In the present invention, any heating method may be used so far as, as described above, the adhesive resin can be heated at a temperature at or above the softening point thereof.

A laminate having stable bonding strength can also be prepared by a further method wherein, at the time of the above sandwich lamination or coextrusion lamination, heating is carried out so that the temperature of the surface of the aluminum 12 on its sealant layer side reaches the softening point of the acid-modified polyolefin resin 13e. The polyethylene resin may be used as the adhesive resin. In this case, a useful lamination method is that lamination is carried out while subjecting an extruded melted polyethylene resin film on its lamination face in the aluminum side to ozone treatment.

Another lamination method is that a substrate layer 11 is laminated by dry lamination onto one side of a barrier layer 12 with both sides thereof being conversion treated, as shown in FIG. 4C (c), only acid-modified polyethylene 13es is extruded onto the other side of the barrier layer 12 to prepare an intermediate laminate, and the intermediate laminate is heated to such a state that the temperature of the acid-modified polyethylene resin reaches the softening point thereof or above, followed by extrusion of a metallocene LLDPE resin as a sealant layer 14 to prepare a laminate. The above extrusion, which is carried out twice, may be carried out in an in-line manner using a tandem machine, or alternatively may be carried out in an off-line manner using a conventional extruder.

The heating may be carried out after the extrusion of the metallocene LLDPE resin. However, heating after the extrusion of the acid-modified polyethylene 13*es* (before the extrusion of the metallocene LLDPE resin) is preferred, because the slipperiness of the sealant layer 14 in the laminate is not deteriorated and, thus, emboss moldability can be further improved.

As described above, according to the present invention, by virtue of the adoption of the above specific lamination method, delamination between the barrier layer and the sealant layer (or the adhesive resin layer) can be prevented. Further, the formation of the sealant layer using metallocene LLDPE or a metallocene LLDPE-containing resin can prevent the formation of wrinkles, pinholes and the like in the emboss molding process. Further, the use of the above sealant can provide higher seal strength than the use of the conventional LLDPE. Therefore, the present invention can offer very good molding quality and productivity improvement effects such as an improvement in hermetical sealing properties and cycle shortening in the filling/sealing process.

The packaging material for a battery is used for the formation of an armor body for packaging a battery body, and types of the packaging material may be divided according to the type of the armor body into a pouch type as shown in FIG. 4D and an emboss type as shown in FIG. 4E (a), FIG. 4E (b), or FIG. 4E (c). The pouch type may be a bag type such as a three sided seal type, a four sided seal type, or a pillow type. FIG. 4D shows a pillow type as an example of the type of the armor body.

In the emboss type, as shown in FIG. 4E (a), a concave portion may be formed on one side of the armor body. Alternatively, a construction may be adopted wherein, as shown in FIG. 4E (b), a concave portion is formed on both sides of the armor body, a battery body is housed in the armor body, and the four peripheral sides of the armor body are heat sealed to hermetically seal the assembly. Further, a construction may also be adopted wherein, as shown in FIG. 4E (c), a concave portion is formed on both sides of the armor body with a folded portion sandwiched, a battery is housed in the armor body, and the three sides of the armor body are heat sealed. When the packaging material for a battery is of an emboss type, as shown in FIGS. 4F (a) to 4F (d), the stacked packaging material 10 is subjected to press molding to form a concave portion 7.

Next, each layer constituting the packaging material for a battery according to the present invention will be described.

The substrate layer 11 in the armor body is formed of an oriented polyester or a nylon film. Polyester resins usable herein include polyethylene terephthalate, polybutylene terephthalate, polyethylene naphthalate, polybutylene naphthalate, interpolyester, and polycarbonate. Nylons usable herein include polyamide resins, that is, nylon 6, nylon 6, 6, a copolymer of nylon 6 with nylon 6, 6, nylon 6, 10, and poly-m-xylyleneadipamide (MXD 6).

When the substrate layer 11 is used as a battery, the substrate layer 11 is a site which comes into direct contact with the hardware. Therefore, basically, the substrate layer 11 is preferably a resin layer having insulating properties. When the presence of pinholes in the film per se, the occurrence of pinholes at the time of fabrication and the like are taken into consideration, the substrate layer should have a thickness of not less than 6 µm, preferably 12 to 30 µm.

In order to improve anti-pinhole properties and insulating properties of the armor body for a battery, the substrate layer 11 may be in the form of a laminate.

When the substrate layer is in the form of a laminate, the substrate layer includes at least one unit of two or more resin layers and, in this case, the thickness of each layer is not less than 6 µm, preferably 12 to 30 µm. Examples of the substrate layer having a multilayer structure include the following layer constructions 1) to 8).

1) Oriented polyethylene terephthalate/oriented nylon, and

2) Oriented nylon/oriented polyethylene terephthalate. Further, from the viewpoint of machinability (stable carriage in a packaging machine or a processing machine) of the packaging material, surface protective properties (heat resistance and electrolyte resistance), a reduction in frictional resistance between the mold and the substrate layer at the time of embossing to form an emboss-type armor body for a battery by fabrication, or protection of the substrate layer upon the deposition of an electrolysis solution, preferably, the substrate layer has a multilayer structure, and a fluororesin layer, an acrylic resin layer, a silicone resin layer, a polyester resin layer, a resin layer formed of a blend of two or more of the above materials or the like is provided on the surface of the substrate layer. Examples of this type of substrate layer include 3) fluororesin/oriented polyethylene terephthalate (the fluororesin layer is constituted by a fluororesin film or is formed by liquid coating and then drying), 4) silicone resin/oriented polyethylene terephthalate (the silicone resin layer is constituted by a silicone resin film or is formed by liquid coating and then drying), 5) fluororesin/oriented polyethylene terephthalate/oriented nylon, 6) silicone resin/oriented polyethylene terephthalate/oriented nylon, 7) acrylic resin/oriented nylon (the acrylic resin layer is constituted by an acrylic resin film or is formed by liquid coating and then drying for curing), and 8) acrylic resin+polysiloxane-grafted acrylic resin/oriented nylon (the acrylic resin layer is constituted by an acrylic resin film or is formed by liquid coating and then drying for curing).

The barrier layer 12 is a layer for preventing the entry of particularly water vapor in the battery from the exterior. From the viewpoints of pinholes in the barrier layer per se and stabilization of fabricability (pouching or emboss moldability) and of imparting anti-pinhole properties, not less than 15 µm-thick aluminum, nickel or other metal, or a film with an inorganic compound, for example, silicon oxide or alumina, vapor deposited thereon may be mentioned as the barrier layer. Preferably, however, the barrier layer is 20 to 80-µm thick aluminum.

When a further reduction in occurrence of pinholes and the formation of an emboss-type armor body for a battery are contemplated, studies conducted by the present inventors have revealed that, in order to prevent cracking and the like at the time of emboss molding, when the barrier layer is formed of aluminum having an iron content of 0.3 to 9.0% by weight, preferably 0.7 to 2.0% by weight, as compared with iron-free aluminum, the iron-containing aluminum has better ductility and the occurrence of pinholes of the laminate by folding can be reduced and, at the same time, the formation of the side wall at the time of molding of the emboss-type armor body is easier. When the iron content is less than 0.3% by weight, for example, the effect of preventing the occurrence of pinholes and the effect of improving emboss moldability cannot be attained. On the other hand, when the iron content of the aluminum exceeds 9.0% by weight, the flexibility as the aluminum is hindered and the suitability of the laminate for bag making is deteriorated.

For aluminum produced by cold rolling, the flexibility, the nerve, and the hardness vary depending upon conditions for annealing treatment. For aluminum used in the present invention, somewhat or fully annealed aluminum, which is relatively soft, is preferred rather than a hardening treated product not subjected to annealing.

The present inventors have found that, when conversion treatment is carried out on the front and back sides of aluminum as the barrier layer 12 in the packaging material for a battery, a laminate, which is satisfactory as the packaging material, can be provided. Specifically, the conversion treatment refers to the formation of an acid-resistant film of a salt of phosphoric acid, a salt of chromic acid, a fluoride, a triazinethiol compound or the like. Phosphoric acid chromate treatment using a three-component system of a phenolic resin, a chromium(III) fluoride compound, and phosphoric acid among the above acid-resistant film forming materials can provide good results. Further, a conversion treating agent comprising a resin component containing at least a phenolic resin and, added thereto, a metal, such as molybdenum, titanium, or zirconium, or a metal salt can provide good results. Advantageously, the formation of the acid-resistant film can prevent delamination between the aluminum and the substrate layer at the time of emboss molding, can prevent dissolution and corrosion of the surface of aluminum, particularly dissolution and corrosion of aluminum oxide present on the surface of the aluminum, by hydrogen fluoride produced as a result of a reaction of an electrolyte in the battery with water, can improve the adhesion (wettability) of the surface of aluminum, can prevent delamination between the substrate layer 11 and the aluminum 12 at the time of emboss molding and heat sealing, and can prevent delamination on the inner side of the aluminum by hydrogen fluoride produced as a result of a reaction of the electrolyte with water.

The present inventors have carried out conversion treatment of the surface of the aluminum using various materials and have made studies on the effect of the conversion treatment. As a result, it was found that phosphoric acid chromate treatment using a three-component system of a phenolic resin, a chromium(III) fluoride compound, and phosphoric acid among the above acid-resistant film forming materials can provide good results.

Further, a conversion treating agent comprising a resin component containing at least a phenolic resin and, added thereto, a metal, such as molybdenum, titanium, or zirconium, or a metal salt can provide good results.

When the armor body is of a pouch type, the conversion treatment of aluminum may be carried out on one side (only sealant layer side) of the aluminum or both sides (substrate layer side and sealant layer side) of the aluminum. On the other hand, when the armor body of the battery is of an emboss type, conversion treatment of both sides of the aluminum can prevent delamination between the aluminum and the substrate layer at the time of emboss molding.

In the packaging material for a battery according to the present invention, the adhesive resin used for lamination of the barrier layer and the sealant layer onto top of each other by sandwich lamination or coextrusion lamination is preferably acid-modified polyethylene. The acid-modified polyethylene is polyethylene onto which an unsaturated carboxylic acid has been graft polymerized. The acid-modified polyethylene has good adhesion to both the surface of the conversion treated layer in the barrier layer and the resin in the lamination surface of the sealant layer.

As described above, the sealant layer in the packaging material for a battery according to the present invention may have a single-layer structure of a metallocene PE resin, a single-layer structure of a metallocene PE-blended resin, or a multilayer structure containing at least the above single layer.

In the present invention, each of the layers constituting the laminate for armor body formation may be properly subjected to surface activation treatment, such as corona treatment, blast treatment, oxidation treatment, or ozone treatment, from the viewpoints of improving or stabilizing film forming properties, lamination, and suitability for fabrication of the final product (pouching or emboss molding).

EXAMPLES

A. First Aspect of Invention

The packaging material for a battery according to the first aspect of the present invention will be described in more detail with reference to the following examples.

<Common Conditions A>

Conditions common to Example A and Comparative Example A are as follows.

(1) Armor Body

In the following Example A and Comparative Example A, the size of a pouch-type armor body was 30 mm in width (inside dimension)×50 mm in length inside dimension). In the case of an emboss-type armor body, only one side was embossed, and moldability was evaluated by press molding using a mold having a concave (a cavity) having a size of 30 mm×50 mm and a depth of 3.5 mm.

(2) Total Thickness of Sealant Layer

In all cases, the total thickness of a sealant layer was 30 μm.

(3) Conversion Treatment

For both Example A and Comparative Example A, the conversion treatment of a barrier layer in the armor body was carried out as follows. An aqueous solution composed of a phenolic resin, a chromium(III) fluoride compound, and phosphoric acid was provided as a treatment liquid. The treatment liquid was roll coated onto the barrier layer, and the coating was baked under conditions such that the film temperature was 180° C. or above. The coverage of chromium was 2 mg/m$^2$ on a dry weight basis.

(4) Lead and Film for Lead

For both Example A and Comparative Example A, a lead having a thickness of 100 μm, a width of 6 mm, and a length of 25 mm was used. For both Example A and Comparative Example A, a 30-μm acid-modified polypropylene film was provided as a film for a lead, was wound around a predetermined position of the lead for the battery body, and the battery body was then inserted into the armor body.

(5) Conditions for Heat Sealing

Heat sealing was carried out under conditions of 190° C., 1 MPa, and 3 sec.

However, only for the evaluation of short-circuiting, heat sealing was carried out under conditions of 190° C., 2 MPa, and 5 sec.

Example A1

Both sides of 20 μm-thick aluminum were subjected to conversion treatment, and an oriented polyester film (thickness 12 μm) was laminated onto one conversion treated side of the aluminum by dry lamination. Next, a sealant layer was laminated onto the other conversion treated side of the aluminum by dry lamination. A pillow-type pouch as an armor body was formed using the laminate thus obtained.

The sealant layer had a two-layer structure of low-fluidity PP <6>/high-fluidity PP (inner side)<4>. These PPs had the following MI and melting point. Figures in brackets indicate layer thickness ratio in coextruded multilayer. This is true of Example A and Comparative Example A which will be described later.

Low-fluidity PP: MI 0.59/10 min, m.p. 147° C.

High-fluidity PP: MI 20 g/10 min, m.p. 160° C.

A battery body was inserted into the above armor body, and the assembly was then heat sealed for hermetic sealing to prepare a sample of Example A1.

Example A2

Both sides of 40 μm-thick aluminum were subjected to conversion treatment, and an oriented nylon film (thickness 25 μm) was laminated onto one conversion treated side of the aluminum by dry lamination. Next, a sealant layer was laminated onto the other conversion treated side of the aluminum by dry lamination. A tray was formed by emboss molding using the laminate thus obtained. An emboss-type armor body was prepared using this tray and the unmolded laminate as a lid.

The sealant layer had a two-layer structure of low-fluidity PP <9>/high-fluidity PP (inner side)<1>. These PPs had the following MI and melting point.

Low-fluidity PP: MI 3 g/10 min, m.p. 147° C.

High-fluidity PP: MI 7 g/10 min, m.p. 147° C.

A battery body was placed in the tray in the armor body, and the tray was then covered with the lid. The peripheral edge of the tray was heat sealed for hermetic sealing to prepare a sample of Example A2.

Example A3

Both sides of 40 μm-thick aluminum were subjected to conversion treatment, and an oriented nylon film (thickness 25 μm) was laminated onto one conversion treated side of the aluminum by dry lamination. Next, a sealant layer was laminated onto the other conversion treated side of the aluminum by dry lamination. A tray was formed by emboss molding using the laminate thus obtained. An emboss-type armor body was prepared using this tray and the unmolded laminate as a lid.

The sealant layer had a three-layer structure of high-fluidity PP ① <1>/low-fluidity PP <8>/high-fluidity PP (inner side) ② <1>. These PPs had the following MI and melting point.

High-fluidity PP ①: MI 10 g/10 min, m.p. 147° C.

Low-fluidity PP: MI 1 g/10 min, m.p. 160° C.

High-fluidity PP ②: MI 10 g/10 min, m.p. 147° C.

A battery body was placed in the tray in the armor body, and the tray was then covered with the lid. The peripheral edge of the tray was heat sealed for hermetic sealing to prepare a sample of Example A3.

Example A4

Both sides of 40 μm-thick aluminum were subjected to conversion treatment, and an oriented nylon film (thickness 25 μm) was laminated onto one conversion treated side of the aluminum by dry lamination. Next, a sealant layer was laminated onto the other conversion treated side of the aluminum by dry lamination. A tray was formed by emboss molding using the laminate thus obtained. An emboss-type armor body was prepared using this tray and the unmolded laminate as a lid.

The sealant layer had a three-layer structure of high-fluidity PP ① <1>/low-fluidity PP <6>/high-fluidity PP (inner side) ② <3>. These PPs had the following MI and melting point.

High-fluidity PP ①: MI 20 g/10 min, m.p. 147° C.

Low-fluidity PP: MI 3 g/10 min, m.p. 160° C.

High-fluidity PP ②: MI 8, m.p. 147° C.

A battery body was placed in the tray in the armor body, and the tray was then covered with the lid. The peripheral edge of the tray was heat sealed for hermetic sealing to prepare a sample of Example A4.

Comparative Example A1

Both sides of 20 μm-thick aluminum were subjected to conversion treatment, and an oriented polyester film (thickness 12 μm) was laminated onto one conversion treated side of the aluminum by dry lamination. Next, a sealant layer was laminated onto the other conversion treated side of the aluminum by dry lamination. A pillow-type pouch as an armor body was formed using the laminate thus obtained.

The sealant layer had a two-layer structure of low-fluidity PP <2>/high-fluidity PP (inner side)<8>. These PPs had the following MI and melting point.

Low-fluidity PP: MI 3 g/10 min, m.p. 147° C.

High-fluidity PP: MI 7 g/10 min, m.p. 147° C.

A battery body was inserted into the above armor body, and the assembly was then heat sealed for hermetic sealing to prepare a sample of Comparative Example A1.

Comparative Example A2

Both sides of 40 μm-thick aluminum were subjected to conversion treatment, and an oriented nylon film (thickness 25 μm) was laminated onto one conversion treated side of the aluminum by dry lamination. Next, a sealant layer was laminated onto the other conversion treated side of the aluminum by dry lamination. A tray was formed by emboss molding using the laminate thus obtained. An emboss-type armor body was prepared using this tray and the unmolded laminate as a lid.

The sealant layer had a single-layer structure of high-fluidity PP.

High-fluidity PP: MI 20 g/10 min, m.p. 160° C.

A battery body was placed in the tray in the armor body, and the tray was then covered with the lid. The peripheral edge of the tray was heat sealed for hermetic sealing to prepare a sample of Comparative Example A2.

Comparative Example A3

40 μm-thick aluminum not subjected to conversion treatment was provided. An oriented nylon film (thickness 25 μm) was laminated onto one side of the aluminum by dry lamination. Next, a sealant layer was laminated onto the other side of the aluminum by dry lamination. A tray was formed by emboss molding using the laminate thus obtained. An emboss-type armor body was prepared using this tray and the unmolded laminate as a lid.

The sealant layer had a three-layer structure of high-fluidity PP ① <1>/low-fluidity PP <8>/high-fluidity PP (inner side) ② <1>. These PPs had the following MI and melting point.

High-fluidity PP ①: MI 10 g/10 min, m.p. 147° C.
Low-fluidity PP: MI 1 g/10 min, m.p. 160° C.
High-fluidity PP ②: MI 10, m.p. 147° C.

A battery body was placed in the tray in the armor body, and the tray was then covered with the lid. The peripheral edge of the tray was heat sealed for hermetic sealing to prepare a sample of Comparative Example A3.

<Evaluation Method A>

(1) Short-Circuit Between Lead and Barrier Layer in Armor Body

The heat sealed part in the lead part was cut, and a photograph of the cross section thereof was inspected for short-circuit between the lead part and the armor body. For a sample having a fear of short-circuiting between the lead and the barrier layer in the armor body, contact was examined with a tester, and, when there was no film between the lead and the barrier layer in the armor body in the observation of a photograph of the cross-section thereof, the sample was regarded as being in a state just before short-circuiting. A sample which had been found to be in a short-circuited state by the tester was regarded as a short-circuited sample. In this way, the number of short-circuited samples was counted.

(2) Insulating Property

For each sample, an armor body with one side thereof being opened was formed. An electrolysis solution was poured into the armor body through the opening. The insulating property was examined in terms of resistance value in the electrolysis solution and the barrier layer in the armor body (the barrier layer having been exposed onto the outer surface of the armor body and brought into contact with an electrode). When the resistance value was infinite (∞), the sample was regarded as being free from cracks from root cutting.

Contents: 3 g of a mixed liquid composed of ethylene carbonate, diethyl carbonate, and dimethyl carbonate (1:1:1) which provided 1 M $LiPF_6$ electrolysis solution.

(3) Leakage and Delamination

The heat sealed product was stored at 80° C. for 24 hr and was inspected for leakage of the contents from the lead part and delamination of the laminate on the content side.

Contents: 3 g of a mixed liquid composed of ethylene carbonate, diethyl carbonate, and dimethyl carbonate (1:1:1) which provided 1 M $LiPF_6$ electrolysis solution.

(4) Residual Thickness of Heat Sealed Part

In the cross section of the heat sealed part, after heat sealing, the thickness of the sealant layer (two layers) between the upper and lower barrier layers were measured, and the thickness of the sealant layer after heat sealing was expressed in terms of residual thickness (percentage retention) by presuming the thickness of the sealant layer before heat sealing to be 100.

<Results A>

Example A

For Examples A1 to A4, none of short-circuit at the lead part, root cutting, and leakage of contents was observed.

Further, there was no delamination of the laminate. The residual thickness of the heat sealed part was as follows.

| Example A1 | 50 |
| Example A2 | 45 |
| Example A3 | 60 |
| Example A4 | 45 |

Comparative Example A

In Comparative Example A1, neither short-circuit nor delamination was observed. The insulation property, however, was 0.1 MΩ, and the photograph of the cross section showed the presence of cracks. Delamination was not observed.

In Comparative Example A2, short-circuit was observed. Further, the insulating property was 0.1 MΩ. The photograph of the cross section showed the presence of cracks. Delamination was not observed.

In Comparative Example A3, there was no short-circuit. For the insulating property, the resistance value was infinite (∞). Further, the presence of cracks was not observed. However, delamination occured. The residual thickness was as follows.

| Comparative Example A1 | 40 |
| Comparative Example A2 | 30 |
| Comparative Example A3 | 60 |

<Effect A>

As is apparent from the above results, in the packaging material for a battery according to the present invention, when at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing and the innermost layer is the high-fluidity polypropylene layer, at the time of housing a battery body in a pouch or an emboss molded part of the armor body and heat sealing of the peripheral edge of the armor body, the bridged sealant layer functions as an insulating layer. By virtue of this, the packaging material for a battery can eliminate a fear of causing contact (short-circuit) between the barrier layer in the armor body and the lead and can prevent root cutting around the heat sealed part, that is, is stable. Further, the lamination of the sealant layer by dry lamination can prevent corrosion of the aluminum face by hydrogen fluoride evolved as a result of a reaction of the electrolyte in the battery with water, and, thus, in the armor body, the delamination of aluminum from the content-side layer can also be prevented.

B. Second Aspect of Invention

The packaging material for a battery according to the second aspect of the present invention will be described in more detail with reference to the following examples.

<Common Conditions B>

Conditions common to Example B and Comparative Example B are as follows.

(1) Armor Body

In the following Example B and Comparative Example B, the size of a pouch-type armor body was 30 mm in width (inside dimension)×50 mm in length (inside dimension). In the case of an emboss-type armor body, only one side was embossed, and moldability was evaluated by press molding using a mold having a concave (a cavity) having a size of 30 mm×50 mm and a depth of 3.5 mm.

(2) Total Thickness of Sealant Layer

In all cases, the total thickness of a sealant layer was 30 µm.

(3) Conversion Treatment

For both Example B and Comparative Example B, the conversion treatment of a barrier layer in the armor body was carried out as follows. An aqueous solution composed of a phenolic resin, a chromium(III) fluoride compound, and phosphoric acid was provided as a treatment liquid. The treatment liquid was roll coated onto the barrier layer, and the coating was baked under conditions such that the film temperature was 180° C. or above. The coverage of chromium was 2 mg/m$^2$ on a dry weight basis. (3) lead (4) Lead and Film for Lead For both Example B and Comparative Example B, a lead having a thickness of 100 µm, a width of 6 mm, and a length of 25 mm was used. For both Example B and Comparative Example B, a 30-µm acid-modified polypropylene film was provided as a film for a lead, was wound around a predetermined position of the lead for the battery body, and the battery body was then inserted into the armor body.

(5) Conditions for Heat Sealing

Heat sealing was carried out under conditions of 190° C., 1 MPa, and 3 sec.

However, only for the evaluation of short-circuit, heat sealing was carried out under conditions of 190° C., 2 MPa, and 5 sec.

Example B1

Both sides of 20 µm-thick aluminum were subjected to conversion treatment, and an oriented polyester film (thickness 12 µm) was laminated onto one conversion treated side of the aluminum by dry lamination. Next, the other conversion treated side of the aluminum was heated at a temperature at or above the softening point of acid-modified polypropylene (hereinafter referred to as "PPa") as an adhesive resin layer, and PPa was extruded to laminate a multi-layered film as a sealant layer by sandwich lamination. A pillow-type pouch as an armor body was formed using the laminate thus obtained.

The sealant layer had a two-layer structure of low-fluidity PP <6>/high-fluidity PP (inner side)<4>. These PPs had the following MI and melting point. Figures in brackets indicate layer thickness ratio in coextruded multilayer. This is true of Example B and Comparative Example B which will be described later.

Low-fluidity PP: MI 0.5 g/10 min, m.p. 160° C.
High-fluidity PP: MI 30 g/10 min, m.p. 160° C.

A battery body was inserted into the above armor body, and the assembly was then heat sealed for hermetic sealing to prepare a sample of Example B1.

Example B2

Both sides of 40 µm-thick aluminum were subjected to conversion treatment, and an oriented nylon film (thickness 25 µm) was laminated onto one conversion treated side of the aluminum by dry lamination. Next, an emulsion liquid of acid-modified polypropylene was coated onto the other conversion treated side of the aluminum, and the coating was dried and further baked at a temperature of 180° C. Thereafter, a sealant layer was laminated onto the surface of the baked layer by hot lamination. A tray was formed by emboss molding using the laminate thus obtained. An emboss-type armor body was prepared using this tray and the unmolded laminate as a lid.

The sealant layer had a two-layer structure of low-fluidity PP <9>/high-fluidity PP (inner side)<1>. These PPs had the following MI and melting point.

Low-fluidity PP: MI 3 g/10 min, m.p. 147° C.
High-fluidity PP: MI 7 g/10 min, m.p. 147° C.

A battery body was placed in the tray in the armor body, and the tray was then covered with the lid. The peripheral edge of the tray was heat sealed for hermetic sealing to prepare a sample of Example B2.

Example B3

Both sides of 40 µm-thick aluminum were subjected to conversion treatment, and an oriented nylon film (thickness 25 µm) was laminated onto one conversion treated side of the aluminum by dry lamination. Next, a sealant layer was laminated onto the other conversion treated side of the aluminum by sandwich lamination using acid-modified polypropylene as an adhesive resin. The laminate thus obtained was heated at a temperature at or above the softening point of acid-modified polypropylene and was then subjected to emboss molding to form a tray. An emboss-type armor body was prepared using this tray and the unmolded laminate as a lid.

The sealant layer had a three-layer structure of high-fluidity PP ① <1>/low-fluidity PP <8>/high-fluidity PP (inner side) ② <1>. These PPs had the following MI and melting point.

High-fluidity PP ①: MI 10 g/10 min, m.p. 147° C.
Low-fluidity PP: MI 1 g/10 min, m.p. 160° C.
High-fluidity PP ②: MI 10 g/10 min, m.p. 147° C.

A battery body was placed in the tray in the armor body, and the tray was then covered with the lid. The peripheral edge of the tray was heat sealed for hermetic sealing to prepare a sample of Example B3.

Example B4

Both sides of 40 µm-thick aluminum were subjected to conversion treatment, and an oriented nylon film (thickness 25 µm) was laminated onto one conversion treated side of the aluminum by dry lamination. Next, a sealant layer was laminated onto the other conversion treated side of the aluminum by coextrusion lamination using acid-modified polypropylene as an adhesive resin. The laminate thus obtained was heated at a temperature at or above the softening point of acid-modified polypropylene. A tray was then formed by emboss molding using the heated laminate. An emboss-type armor body was prepared using this tray and the unmolded laminate as a lid.

The sealant layer had a three-layer structure of high-fluidity PP ① <1>/low-fluidity PP <6>/high-fluidity PP (inner side) ② <3>. These PPs had the following MI and melting point.

High-fluidity PP ①: MI 20 g/10 min, m.p. 160° C.
Low-fluidity PP: MI 3 g/10 min, m.p. 160° C.
High-fluidity PP ②: MI 89/10 min, m.p. 147° C.

A battery body was placed in the tray in the armor body, and the tray was then covered with the lid. The peripheral edge of the tray was heat sealed for hermetic sealing to prepare a sample of Example B4.

Comparative Example B1

Both sides of 40 μm-thick aluminum were subjected to conversion treatment, and an oriented nylon film (thickness 25 μm) was laminated onto one conversion treated side of the aluminum by dry lamination. Next, an emulsion liquid of acid-modified polypropylene was coated onto the other conversion treated side of the aluminum, and the coating was dried and further baked at a temperature of 180° C. Thereafter, a sealant layer was laminated onto the surface of the baked layer by hot lamination. A tray was formed by emboss molding using the laminate thus obtained. An emboss-type armor body was prepared using this tray and the unmolded laminate as a lid.

The sealant layer had a two-layer structure of low-fluidity PP <2>/high-fluidity PP (inner side)<8>. These PPs had the following MI and melting point.

Low-fluidity PP: MI 3 g/10 min, m.p. 147° C.
High-fluidity PP: MI 7 g/10 min, m.p. 147° C.

A battery body was inserted into the armor body, followed by heat sealing for hermetic sealing to prepare a sample of Comparative Example B1.

Comparative Example B2

Both sides of 40 μm-thick aluminum were subjected to conversion treatment, and an oriented nylon film (thickness 25 μm) was laminated onto one conversion treated side of the aluminum by dry lamination. Next, a sealant layer was laminated onto the other conversion treated side of the aluminum by sandwich lamination using acid-modified polypropylene as an adhesive resin. The laminate thus obtained was heated at a temperature at or above the softening point of acid-modified polypropylene and was then subjected to emboss molding to form a tray. An emboss-type armor body was prepared using this tray and the unmolded laminate as a lid.

The sealant layer had a single-layer structure of high-fluidity PP.

High-fluidity PP: MI 20 g/10 min, m.p. 160° C.

A battery body was placed in the tray in the armor body, and the tray was then covered with the lid. The peripheral edge of the tray was heat sealed for hermetic sealing to prepare a sample of Comparative Example B2.

Comparative Example B3

40 μm-thick aluminum not subjected to conversion treatment was provided, and an oriented nylon film (thickness 25 μm) was laminated onto one side of the aluminum by dry lamination. Next, a sealant layer was laminated by coextrusion lamination using acid-modified polypropylene as an adhesive resin onto the other side of the aluminum. The laminate thus obtained was heated at a temperature at or above the softening point of acid-modified polypropylene and was then subjected to emboss molding to form a tray. An emboss-type armor body was prepared using this tray and the unmolded laminate as a lid.

The sealant layer had a single-layer structure of high-fluidity PP, three layers, i.e., ① <1>/low-fluidity PP <8>/high-fluidity PP (inner side) ② <1>. These PPs had the following MI and melting point.

High-fluidity PP ①: MI 10 g/10 min, m.p. 147° C.
Low-fluidity PP: MI 1 g/10 min, m.p. 160° C.
High-fluidity PP ②: MI 10 g/10 min, m.p. 147° C.

A battery body was placed in the tray in the armor body, and the tray was then covered with the lid. The peripheral edge of the tray was heat sealed for hermetic sealing to prepare a sample of Comparative Example B3.

<Evaluation Method B>

(1) Short-Circuit Between Lead and Barrier Layer in Armor Body

The heat sealed part in the lead part was cut, and a photograph of the cross section thereof was inspected for short-circuit between the lead part and the armor body. For a sample having a fear of short-circuiting between the lead and the barrier layer in the armor body, contact was examined with a tester, and, when there was no film between the lead and the barrier layer in the armor body in the observation of a photograph of the cross section thereof, the sample was regarded as being in a state just before short-circuiting. A sample which had been found to be in a short-circuited state by the tester was regarded as a short-circuited sample. In this way, the number of short-circuited samples was counted.

(2) Insulating Property

For each sample, an armor body with one side thereof being opened was formed. An electrolysis solution was poured into the armor body through the opening. The insulating property was examined in terms of resistance value in the electrolysis solution and the barrier layer in the armor body (the barrier layer having been exposed onto the outer surface of the armor body and brought into contact with an electrode). When the resistance value was infinite (∞), the sample was regarded as being free from cracks from root cutting.

Contents: 3 g of a mixed liquid composed of ethylene carbonate, diethyl carbonate, and dimethyl carbonate (1:1:1) which provided 1 M $LiPF_6$ electrolysis solution.

(3) Leakage and Delamination

The heat sealed product was stored at 80° C. for 24 hr and was inspected for leakage of the contents from the lead part and delamination of the laminate on the content side.

Contents: 3 g of a mixed liquid composed of ethylene carbonate, diethyl carbonate, and dimethyl carbonate (1:1:1) which provided 1 M $LiPF_6$ electrolysis solution.

(4) Residual Thickness of Heat Sealed Part

In the cross section of the heat sealed part, after heat sealing, the thickness of the sealant layer (two layers) between the upper and lower barrier layers were measured, and the thickness of the sealant layer after heat sealing was expressed in terms of residual thickness (percentage retention) by presuming the thickness of the sealant layer before beat sealing to be 100.

<Results B>

For Examples B1 to B4, none of short-circuit at the lead part, root cutting, and leakage of contents was observed. Further, there was no delamination of the laminate. The residual thickness of the heat sealed part was as follows.

| Example B1 | 52 |
| Example B2 | 45 |
| Example B3 | 60 |
| Example B4 | 45 |

In Comparative Example B1, neither short-circuit nor delamination was observed. The insulating property, however, was 0.1 MΩ, and the photograph of the cross section showed the presence of cracks. In Comparative Example B2, short-circuit was observed. Further, the insulating property was 0.1 MΩ. The photograph of the cross section showed the presence of cracks. Delamination was not observed. In Comparative Example B3, there was no short-circuit. For the insulating property, the resistance value was infinite (∞). Further, the presence of cracks was not observed. However, delamination occured. The residual thickness was as follows.

| | |
|---|---|
| Comparative Example B1 | 40 |
| Comparative Example B2 | 30 |
| Comparative Example B3 | 60 |

<Effect B>

As is apparent from the above results, in the packaging material for forming an armor body for a battery according to the second aspect of the present invention, the armor body being adapted for use in such a manner that a battery body is inserted into the armor body and the peripheral edge of the armor body is then heat sealed for hermetic sealing, the packaging material being a laminate comprising at least a substrate layer, an adhesive layer, a barrier layer, an adhesive resin layer, and a sealant layer, when at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing and the innermost layer is the high-fluidity polypropylene layer, in housing a battery body in a pouch or emboss molded part in the armor body and then heat sealing the peripheral edge of the armor body to hermetically seal the assembly, the low-fluidity polypropylene layer functions as an insulating layer. By virtue of this, the packaging material for a battery can eliminate a fear of causing contact (short-circuit) between the barrier layer in the armor body and the lead and can prevent root cutting around the heat sealed part.

Further, since the sealant layer is formed by sandwich lamination or coextrusion lamination through an adhesive resin layer and heating is carried out at the time of or after the formation of the laminate, the corrosion of the aluminum face by hydrogen fluoride evolved as a result of a reaction of an electrolyte in the battery with water can be prevented, and, thus, in the armor body, delamination of aluminum from the content-side layer can also be prevented.

C. Third Aspect of Invention

The packaging material for a battery according to the third aspect of the present invention will be described in more detail with reference to the following examples.

<Common Conditions C>

(1) Construction of Packaging Material for Battery

For both Example C and Comparative Example C, the pouch type and the emboss type had the following basic construction. The composition of the adhesive resin layer, the lamination method, etc. in Example C and those in Comparative Example C were as described below.

(Pouch type)

PET 12/DL 3/ALM 20/conversion treatment/adhesive resin layer 15/sealant layer 30

(Emboss type)

ON 25 μm/DL 3 μm/conversion treatment/ALM 40 μm/conversion treatment/adhesive resin layer 15 μm/sealant layer 30 μm

[Abbreviation PET: biaxially oriented polyester film, ON: biaxially oriented nylon film, ALM: aluminum, DL: dry laminate, and ALM: aluminum]

The acid-modified polypropylene was unsaturated carboxylic acid-grafted random propylene. In all cases, the sealant layer was a film or extruded layer of a random polypropylene resin. In Example C and Comparative Example C, when the adhesive resin is a blend resin, the blending ratio is by weight.

(2) Conversion Treatment

For both Example C and Comparative Example C, the conversion treatment of a barrier layer in the armor body was carried out as follows. An aqueous solution composed of a phenolic resin, a chromium(III) fluoride compound, and phosphoric acid was provided as a treatment liquid. The treatment liquid was roll coated onto the barrier layer, and the coating was baked under conditions such that the film temperature was 180° C. or above. The coverage of chromium was 1 mg/m$^2$ on a dry weight basis.

(3) Type of Armor Body

In the case of the pouch type, a pillow type having a size of 30 mm in width (inside dimension)×50 mm in length (inside dimension) was used for evaluation. In the case of the emboss type, one-side emboss type was prepared, and the moldability was evaluated by press molding using a mold having a concave (a cavity) having a size of 30 mm×50 mm and a depth of 3.5 mm. In all examples of the emboss type, the embossed laminate not subjected to molding was used as a lid.

(4) Conditions for Heat Sealing

190° C., 1.0 MPa, 3 sec

Example C1

One side of 20 μm-thick aluminum was subjected to conversion treatment, and an oriented polyester film (thickness 12 μm) was laminated by dry lamination onto the aluminum in its side not subjected to conversion treatment. Next, the conversion treated side of the aluminum was heated at a temperature at or above the softening point of a polypropylene resin as an adhesive resin by far infrared radiation and hot air. In this state, a 15 μm-thick adhesive resin, which will be described later, was extruded to laminate a 30 μm-thick polypropylene film as a sealant layer by sandwich lamination.

The adhesive resin was a blend of 60 parts of polypropylene (MI 26 g/10 min) with 40 parts of acid-modified polypropylene (MI 1.0 g/10 min). The MI value of the blend resin was 5 g/10 min. A pouch-type armor body was formed using the laminate thus obtained.

Example C2

One side of 20 m-thick aluminum was subjected to conversion treatment, and an oriented polyester film (thickness 12 μm) was laminated by dry lamination onto the aluminum in its side not subjected to conversion treatment. Next, an adhesive resin (15 μm), which will be described later, and a polypropylene resin (30 μm) as a sealant layer were coextruded and laminated onto the conversion treated side of the aluminum. The laminate thus obtained was then heated at a temperature at or above the softening point of the adhesive resin.

The adhesive resin was a blend of 90 parts of high-MI acid-modified polypropylene with 10 parts of low-density polyethylene. The MI value of the adhesive resin was 18 g/10 min.

A pouch-type armor body was formed using the laminate thus obtained.

Example C3

Both sides of 40 µm-thick aluminum were subjected to conversion treatment, and an oriented nylon film (thickness 25 µm) was laminated by dry lamination onto one side of the conversion treated aluminum. Next, the other conversion treated side of the aluminum was heated at a temperature at or above the softening point of a polypropylene resin as an adhesive resin by far infrared radiation and hot air. In this state, a 15 µm-thick adhesive resin, which will be described later, was extruded to laminate a 30 µm-thick polypropylene film as a sealant layer by sandwich lamination.

The adhesive resin was a blend of 74 parts of polypropylene (MI 26 g/10 min) with 26 parts of acid-modified polypropylene (MI 1.0 g/10 min). The MI value of the blend resin was 5 g/10 min.

A tray was formed by emboss molding using the laminate thus obtained. An armor body was prepared using this tray and the unmolded laminate as a lid material.

Example C4

Both sides of 40 µm-thick aluminum were subjected to conversion treatment, and an oriented nylon film (thickness 25 µm) was laminated by dry lamination onto one side of the conversion treated aluminum. Next, a 15 µm-thick adhesive resin, which will be described later, was extruded to laminate a 30 µm-thick polypropylene film as a sealant layer by sandwich lamination onto the other conversion treated side of the aluminum. The laminate thus obtained was then heated at a temperature at or above the softening point of the adhesive resin.

The adhesive resin was a blend of 80 parts of acid-modified polypropylene, 10 parts of LDPE, 10 parts of butadiene, and 10 parts of butadiene. The MI value of the adhesive resin was 9 g/10 min.

A tray was formed by emboss molding using the heated laminate. An armor body was prepared using this tray and the unmolded laminate as a lid material.

Example C5

Both sides of 40 µm-thick aluminum were subjected to conversion treatment, and an oriented nylon film (thickness 25 µm) was laminated by dry lamination onto one side of the conversion treated aluminum. Next, the other conversion treated side of the aluminum was heated at a temperature at or above the softening point of a polypropylene resin as an adhesive resin by far infrared radiation and hot air. In this state, an adhesive resin (15 µm), which will be described later, and a polypropylene resin (30 µm) as a sealant layer were coextruded and laminated onto the aluminum.

The adhesive resin was a blend of 80 parts of acid-modified polypropylene, 10 parts of LDPE, 5 parts of butadiene, and 5 parts of an ethylene-propylene copolymer. The MI value of the adhesive resin was 12 g/10 min. A tray was formed by emboss molding using the laminate thus obtained. An armor body was prepared using this tray and the unmolded laminate as a lid material.

Comparative Example C1

Both sides of 40 µm-thick aluminum were subjected to conversion treatment, and an oriented nylon film (thickness 25 µm) was laminated by dry lamination onto one side of the conversion treated aluminum. Next, the other conversion treated side of the aluminum was heated at a temperature at or above the softening point of a polypropylene resin as an adhesive resin by far infrared radiation and hot air. In this state, a 15 µm-thick adhesive resin, which will be described later, was extruded to laminate a 30 µm-thick polypropylene film as a sealant layer by sandwich lamination.

The adhesive resin was acid-modified polypropylene (MI 0.1 g/10 min).

A tray was formed by emboss molding using the laminate thus obtained. An armor body was prepared using this tray and the unmolded laminate as a lid material.

Comparative Example C2

Both sides of 40 µm-thick aluminum were subjected to conversion treatment, and an oriented nylon film (thickness 25 µm) was laminated by dry lamination onto one side of the conversion treated aluminum. Next, a 15 µm-thick adhesive resin, which will be described later, was extruded to laminate a 30 µm-thick polypropylene film as a sealant layer by sandwich lamination onto the other conversion treated side of the aluminum. The laminate thus obtained was then heated at a temperature at or above the softening point of the adhesive resin.

The adhesive resin was a blend of 90 parts of acid-modified polypropylene and 10 parts of LDPE. The MI value of the adhesive resin was 25.

A tray was formed by emboss molding using the heated laminate. An armor body was prepared using this tray and the unmolded laminate as a lid material.

Comparative Example C3

40 µm-thick aluminum not subjected to conversion treatment was provided. An oriented nylon film (thickness 25 µm) was laminated by dry lamination onto one side of the aluminum. Next, a 30 µm-thick polypropylene film as a sealant layer was laminated by sandwich lamination using a resin, which will be described later, as an adhesive resin (15 µm) onto the other side of the aluminum. The laminate thus obtained was then heated at a temperature at or above the softening point of the adhesive resin.

The adhesive resin was a blend of 80 parts of acid-modified polypropylene, 10 parts of LDPE, and 10 parts of butadiene. The MI value of the adhesive resin was 9 g/10 min.

A tray was formed by emboss molding using the heated laminate. An armor body was prepared using this tray and the unmolded laminate as a lid material.

<Evaluation Item C>

1) Root Cutting at Sealed Part

A battery body was housed in the armor body, followed by hermetic sealing. The cross section of the sealed part and the nonsealed part continued to the sealed part was observed under a microscope for root cutting at the adhesive resin layer portion 2) Percentage Retention of Thickness of Heat Seal LKayer (Adhesive Resin Layer and Sealant layer)

After heat sealing, the thickness of the heat seal layer was measured, and the proportion of the thickness of the heat seal layer after heat sealing relative to the total thickness of the heat seal layer before heat sealing was calculated.

3) Delamination 3 g of a mixed liquid composed of ethylene carbonate, diethyl carbonate, and dimethyl carbonate (1:1:1), which provided 1 M $LiPF_6$, was filled into the armor body, and the armor body was held at a temperature of 85° C. for 7 days. Thereafter, visual inspection was carried out for delamination between ALM and the adhesive resin layer.

<Results C>

Example C

Neither root cutting at the sealed part nor delamination between ALM and the adhesive resin layer was observed for Examples C1 to C5 (number of samples: 100 for each evaluation item).

The percentage retention of the thickness of the heat seal layer was as follows.

| | |
|---|---|
| Example C1 | 60% |
| Example C2 | 32% |
| Example C3 | 70% |
| Example C4 | 60% |
| Example C5 | 55% |

Comparative Example C

For Comparative Example C1, neither root cutting at the sealed part nor delamination between ALM and the adhesive resin layer was observed (number of samples: 100 for each evaluation item). In the emboss molding, however, cracking of ALM occurred in 25 samples out of 100 samples.

For Comparative Example C2, heat sealing resulted in reduced thickness of the heat seal layer, and root cutting occurred in 3 samples out of 100 samples. Delamination between ALM and the adhesive resin layer was not observed.

For Comparative Example C3, root cutting was not observed. However, delamination between ALM and the adhesive resin layer occurred in 54 samples out of 100 samples. The percentage retention of the thickness of the heat seal layer in Comparative Example C was as follows.

| | |
|---|---|
| Comparative Example C1 | 75% |
| Comparative Example C2 | 22% |
| Comparative Example C3 | 60% |

<Effect C>

In a packaging material for forming an armor body for a battery, the armor body being adapted for use in such a manner that a battery body is inserted into the armor body and the peripheral edge of the armor body is then heat sealed for hermetic sealing, when the packaging material is a laminate comprising at least a substrate layer, an adhesive layer, aluminum, a conversion treated layer, an adhesive resin layer, and a polypropylene resin-based sealant layer and the adhesive resin layer is formed of a resin having a melt index in the range of 5 to 20 g/10 min, the effect of preventing short-circuit between the barrier layer and the lead can be attained. Further, the formation of a resin pool around the inner edge of the sealed part and root cutting caused at the end of resin pool can be prevented.

D. Fourth Aspect of Invention

The packaging material for a battery according to the fourth aspect of the present invention will be described in more detail with reference to the following examples.

<Common Conditions D>

Conditions common to Example D and Comparative Example D were as follows.

(1) Armor Body

In all cases, the armor body was of emboss type and had a construction of oriented nylon 25 µm/adhesive layer (1)/conversion treated layer/ALM 40 µm/conversion treated layer/adhesive layer (2)/sealant layer 30 µm. The laminates used in Example D and Comparative Example D were produced by lamination according to the following method unless otherwise specified.

A conversion treated layer was formed by chromate treatment on both sides of aluminum (thickness 40 µm). An oriented nylon film (thickness 25 µm) was laminated by dry lamination onto one side of the aluminum with the conversion treated layer formed on its both sides to form an adhesive layer (1). An adhesive layer (2) was formed on the other side of the aluminum by a method indicated in Example D and Comparative Example D, and a sealant layer (thickness 30 µm) was laminated to prepare a laminate.

For both Example D and Comparative Example D, the chromate treatment was carried out by roll coating an aqueous solution containing a phenolic resin, a chromium (III) fluoride compound, and phosphoric acid as a treatment liquid and baking the coating under conditions for bringing the film temperature to 180° C. or above. The coverage of chromium was 2 $mg/m^2$ on a dry weight basis.

Next, a tray was formed by emboss molding using the laminate thus obtained. An armor body was prepared using this tray and the unmolded laminate as a lid.

(2) Type of Armor Body

In all cases, the armor body was of one-side emboss type. For the mold for emboss molding for the formation of the tray, the size of the concave portion (cavity) was 30 mm×50 mm, and the molding depth was regulated in increments of 0.5 mm by regulating the intrusion level of the convex portion.

(3) Abbreviations

Abbreviations used in the following description are as follows.

Main Resins

ON: oriented nylon film
ALM: aluminum foil
LL: conventional linear low-density polyethylene with density of 0.925
MLL1: metallocene LLDPE with density of 0.92
MLL2: metallocene LLDPE with density of 0.90
MD: medium-density polyethylene with density of 0.93
LD: low-density polyethylene with density of 0.90
PEa: acid-modified polyethylene
PEaH: acid-modified polyethylene emulsion Example D1

Both sides of ALM (thickness 40 µm) were subjected to conversion treatment. ON (thickness 25 µm) was laminated onto one conversion treated side of ALM by dry lamination, and a film as a sealant layer was laminated onto the other conversion treated side of ALM by dry lamination to prepare a laminate of Example D1.

The film as the sealant layer had a two-layer structure of LL (thickness 25 μm), provided on the laminate side, and MLL1 (thickness 5 μm) provided on the inner side.

Example D2

Both sides of ALM (thickness 40 μm) were subjected to conversion treatment. ON (thickness 25 μm) was laminated onto one conversion treated side of ALM by dry lamination, and a film as a sealant layer was laminated onto the other conversion treated side of ALM by dry lamination to prepare a laminate of Example D2.

The film as the sealant layer had a single-layer structure of MLL1 (thickness 30 μm).

Example D3

Both sides of ALM (thickness 40 μm) were subjected to conversion treatment. ON (thickness 25 μm) was laminated onto one conversion treated side of ALM by dry lamination. 15 μm-thick PEa as an adhesive resin was extruded to laminate a 30-μm sealant layer film onto the other conversion treated side of ALM by sandwich lamination. The laminate thus obtained was heated at a temperature at or above the softening point of PEa to prepare a laminate of Example D3.

The film as the sealant layer had a two-layer structure of LL (thickness 25 μm), provided on the laminate side, and MLL1 (thickness 5 μm) provided on the inner side.

Example D4

Both sides of ALM (thickness 40 μm) were subjected to conversion treatment. ON (thickness 25 μm) was laminated onto one conversion treated side of ALM by dry lamination. The other conversion treated side of ALM was heated at a temperature at or above the softening point of PEa, and 15 μm-thick PEa as an adhesive resin was extruded to laminate a 30-μm sealant layer film by sandwich lamination to prepare a laminate of Example D4.

The film as the sealant layer had a two-layer structure of MD (thickness 10 μm), provided on the laminate side, and a resin blend (thickness 20 μm) of MLL2 and MD (blending weight ratio: MLL2:MD=9:1) provided on the inner side.

Example D5

Both sides of ALM (thickness 40 μm) were subjected to conversion treatment. ON (thickness 25 μm) was laminated onto one conversion treated side of ALM by dry lamination. The other conversion treated side of ALM was heated at a temperature at or above the softening point of PEa, and 15 μm-thick PEa as an adhesive resin was extruded to laminate a 30-μm sealant layer film by sandwich lamination to prepare a laminate of Example D5.

The film as the sealant layer had a single-layer structure of MLL1 (thickness 30 μm).

Example D6

Both sides of ALM (thickness 40 μm) were subjected to conversion treatment. ON (thickness 25 μm) was laminated onto one conversion treated side of ALM by dry lamination. PEa (15 μm) as an adhesive resin and a resin for a sealant layer (30 μm) were coextruded and laminated onto the other conversion treated side of ALM. The laminate thus obtained was heated at a temperature at or above the softening point of PEa to prepare a laminate of Example D6.

The resin for the sealant layer was a resin blend of MLL1 and LD (blending weight ratio: MLL1:LD=7:3).

Example D7

Both sides of ALM (thickness 40 μm) were subjected to conversion treatment. ON (thickness 25 μm) was laminated onto one conversion treated side of ALM by dry lamination. PEa as an adhesive resin was extruded on the other conversion treated side of ALM. Subsequently, a resin for a sealant layer (30 μm) was extruded, and the laminate thus obtained was heated at a temperature at or above the softening point of PEa to prepare a laminate of Example D7.

The resin for the sealant layer was a resin blend of MLL1 and LD (blending weight ratio: MLL1:LD=7:3).

Example D8

Both sides of ALM (thickness 40 μm) were subjected to conversion treatment. ON (thickness 25 μm) was laminated onto one conversion treated side of ALM by dry lamination. PEa as an adhesive resin was extruded on the other conversion treated side of ALM. The intermediate laminate thus obtained was then heated at a temperature at or above the softening point of PEa, and a resin for a sealant layer (30 μm) was then extruded to prepare a laminate of Example D8.

The resin for the sealant layer was a resin blend of MLL1 and LL (blending weight ratio: MLL1:LL=8:2).

Example D9

Both sides of ALM (thickness 40 μm) were subjected to conversion treatment. ON (thickness 25 μm) was laminated onto one conversion treated side of ALM by dry lamination. PEaH was roll coated onto the other conversion treated side of ALM, and the coating was dried and heat baked, followed by hot lamination of a film as a sealant layer onto the baked layer to prepare a laminate of Example D9.

The film as the sealant layer was MLL1 (thickness 30 μm).

Comparative Example D1

Both sides of ALM (thickness 40 μm) were subjected to conversion treatment. ON (thickness 25 μm) was laminated onto one conversion treated side of ALM by dry lamination, and a film as a sealant layer was laminated onto the other conversion treated side of ALM by dry lamination to prepare a laminate of Comparative Example D1.

The film as the sealant layer had a single-layer structure of LL (thickness 30 μm).

Comparative Example D2

ALM (thickness 40 μm) both sides of which had not been subjected to conversion treatment was provided. ON (thickness 25 μm) was laminated onto one side of ALM by dry lamination, and a film as a sealant layer was laminated onto the other side of ALM by dry lamination to prepare a laminate of Comparative Example D2.

The film as the sealant layer had a single-layer structure of MLL1 (thickness 30 μm).

Comparative Example D3

Both sides of ALM (thickness 40 μm) were subjected to conversion treatment. ON (thickness 25 μm) was laminated onto one conversion treated side of ALM by dry lamination. 15 μm-thick PEa as an adhesive resin was extruded to laminate a 30-μm film for a sealant layer onto the other conversion treated side of ALM by sandwich lamination. The laminate thus obtained was heated at a temperature at or above the softening point of PEa to prepare a laminate of Comparative Example D3.

The film as the sealant layer was LL (thickness 30 μm).

Comparative Example D4

ALM (thickness 40 μm) not subjected to conversion treatment was provided. ON (thickness 25 μm) was laminated onto one side of ALM by dry lamination. 15 μm-thick PEa as an adhesive resin was extruded to laminate a 30-μm film for a sealant layer onto the other side of ALM by sandwich lamination. The laminate thus obtained was heated at a temperature at or above the softening point of PEa to prepare a laminate of Comparative Example D4.

The film as the sealant layer had a two-layer structure of LL (thickness 25 μm) on the laminate side and MLL1 (thickness 5 μm) on the inner side.

Comparative Example D5

Both sides of ALM (thickness 40 μm) were subjected to conversion treatment. ON (thickness 25 μm) was laminated onto one conversion treated side of ALM by dry lamination. PEaH was roll coated onto the other conversion treated side of ALM, and the coating was dried and heat baked, followed by hot lamination of a film as a sealant layer onto the baked layer to prepare a laminate of Comparative Example D5.

The film as the sealant layer was LL (thickness 30 μm).

<Evaluation Method D>

(1) Delamination

An electrolysis solution was filled into each armor body formed using the laminates prepared in the examples and comparative examples. The assembly was then stored at 60° C. for 24 hr in the case where the laminate was prepared by dry lamination, while the assembly was stored at 85° C. for 24 hr in the case where the laminate was prepared by extrusion lamination using an adhesive resin. Thereafter, the assemblies were inspected for delamination of the aluminum (conversion treated layer) from the adhesive layer.

Electrolysis solution: 3 g of a mixed liquid composed of ethylene carbonate, diethyl carbonate, and dimethyl carbonate (volume ratio=1:1:1), which provided 1 M $LiPF_6$.

(2) Moldability

For each of Example D and Comparative Example D, 50 trays were formed by molding to determine the molding intrusion level (mm) for stably providing trays free from pinholes, wrinkles, and whitening.

(3) Sealing Strength

After hermetic sealing under conditions of 190° C., surface pressure of 1.0 MPa, and 3.0 sec, the peel strength at the sealed part was measured. Unit: N/15 mm.

<Results D>

Example D

For Examples D1 to D9, delamination did not occur. Regarding the moldability, the trays formed by molding were free from pinholes, wrinkles and the like, that is, the moldability was good. The seal in the heat sealed part also had stable strength. For Example D, the moldability and the sealing strength were as follows.

|  | Molding depth | Sealing strength |
|---|---|---|
| Example D1 | 5.0 | 12 |
| Example D2 | 5.5 | 12 |
| Example D3 | 4.5 | 13 |
| Example D4 | 4.0 | 11 |
| Example D5 | 5.0 | 13 |
| Example D6 | 4.5 | 11 |
| Example D7 | 4.5 | 11 |
| Example D8 | 5.0 | 12 |
| Example D9 | 5.0 | 12 |

Comparative Example D

For Comparative Example D1, delamination did not occur, and the moldability was also good. However, the sealing strength was low.

For Comparative Example D2 and Comparative Example D4, delamination occurred, although there was no problem of moldability and sealing strength.

For Comparative Example D3 and Comparative Example D5, the sealing strength was low, although delamination did not occur and the moldability was also good.

The moldability and the sealing strength for Comparative Example D were as follows.

|  | Molding depth | Sealing strength |
|---|---|---|
| Comparative Example D1 | 4.5 | 9 |
| Comparative Example D2 | 5.5 | 12 |
| Comparative Example D3 | 4.0 | 9 |
| Comparative Example D4 | 4.5 | 13 |
| Example D5 | 5.0 | 8 |

<Effect D>

In the packaging material for a battery, when at least the sealant layer or the innermost layer in the sealant layer is formed of a metallocene LLDPE resin or a metallocene LLDPE-blended resin, the moldability at the time of emboss molding could be improved over that in the case of conventional LLDPE and, consequently, the occurrence of wrinkles and pinholes could be prevented. Further, the sealing strength was advantageously higher than that in the case of conventional LLDPE. In the armor body, when the conversion treatment is carried out on both sides of aluminum, the occurrence of delamination between the substrate layer and the aluminum can be prevented at the time of emboss molding and at the time of heat sealing. When the sealant layer is formed by dry lamination, hot lamination, sandwich lamination, or coextrusion lamination, heating at the time of or after the formation of the laminate can prevent the corrosion of the aluminum face by hydrogen fluoride evolved as a result of a reaction of an electrolyte in the battery with water and, thus, can also prevent delamination of aluminum from the content-side layer.

The invention claimed is:

1. A packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, a dry laminate layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer.

2. The packaging material for a battery according to claim 1, characterized in that the barrier layer comprises at least a conversion treated layer provided on its dry laminate layer side.

3. The packaging material for a battery according to claim 1, characterized in that the sealant layer has a two-layer structure of the low-fluidity polypropylene layer and the high-fluidity polypropylene layer and the high-fluidity polypropylene layer is the innermost layer.

4. The packaging material for a battery according to claim 1, characterized in that the sealant layer has a three-layer structure of the high-fluidity polypropylene layer, the low-fluidity polypropylene layer, and the high-fluidity polypropylene layer.

5. The packaging material for a battery according to claim 1, characterized in that a film for a lead is interposed between the armor body for a battery and a lead part in the battery body.

6. A packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, a barrier layer, an adhesive resin layer, and a sealant layer, characterized in that at least the sealant layer comprises a low-fluidity polypropylene layer having low susceptibility to collapse upon exposure to heat and pressure at the time of heat sealing and a high-fluidity polypropylene layer having high susceptibility to collapse upon exposure to heat and pressure at the time of heat sealing, and the innermost layer is the high-fluidity polypropylene layer.

7. The packaging material for a battery according to claim 6, characterized in that the barrier layer comprises at least a conversion treated layer provided on its adhesive resin layer side.

8. The packaging material for a battery according to claim 6, characterized in that the sealant layer has a two-layer structure of the low-fluidity polypropylene layer and the high-fluidity polypropylene layer and the high-fluidity polypropylene layer is the innermost layer.

9. The packaging material for a battery according to claim 6, characterized in that the sealant layer has a three-layer structure of the high-fluidity polypropylene layer, the low-fluidity polypropylene layer, and the high-fluidity polypropylene layer.

10. The packaging material for a battery according to claim 6, characterized in that the adhesive resin layer is a baked layer of an emulsion of an acid-modified polyolefin, and the sealant layer has been adhered to the baked layer by heat lamination.

11. The packaging material for a battery according to claim 6, characterized in that the adhesive resin layer is formed of acid-modified polypropylene and the sealant layer has been previously formed and has been stacked onto the adhesive resin layer by sandwich lamination.

12. The packaging material for a battery according to claim 6, characterized in that the adhesive resin layer is formed of acid-modified polypropylene and the sealant layer has been stacked onto the adhesive resin layer by coextrusion lamination.

13. The packaging material for a battery according to claim 6, characterized in that an adhesive film is interposed between the armor body for a battery and a lead part in the battery body.

14. A packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer, aluminum, a conversion treated layer, an adhesive resin layer, and a polypropylene resin-based sealant layer, characterized in that the adhesive resin layer is formed of a resin having a melt index in the range of 5 to 20 g/10 min.

15. The packaging material for a battery according to claim 14, characterized in that the adhesive resin layer comprises a polypropylene resin.

16. The packaging material for a battery according to claim 14, characterized in that the adhesive resin layer comprises acid-modified polypropylene.

17. The packaging material for a battery according to claim 14, characterized in that the adhesive resin layer comprises an acid-modified polypropylene resin and, added to the acid-modified polypropylene resin, at least one component selected from a low-density polyethylene resin, a low crystalline ethylene-butene-propylene copolymer with a density of 900 $kg/M^3$, a noncrystalline ethylene-propylene copolymer, a propylene-α-olefin copolymer, and a rubber component.

18. The packaging material for a battery according to claim 14, characterized in that the adhesive resin layer is formed of a blend of at least two polypropylene resins with different melt indexes.

19. The packaging material for a battery according to claim 18, characterized in that at least one of the at least two polypropylene resins constituting the adhesive resin layer is an acid-modified polypropylene resin.

20. The packaging material for a battery according to claim 14, characterized in that the laminate comprises at least the substrate layer, the adhesive layer, a conversion treated layer (1), aluminum, a conversion treated layer (2), the adhesive resin layer, and the polypropylene resin-based sealant layer.

21. A battery characterized by comprising a battery body housed and hermetically sealed into an armor body formed of the packaging material for a battery according to claim 14.

22. A packaging material for forming an armor body for a battery, said armor body being adapted for use in such a manner that a battery body is inserted into the armor body and the peripheral edge of the armor body is then heat sealed for hermetic sealing, said packaging material being a laminate comprising at least a substrate layer, an adhesive layer 1, a barrier layer, an adhesive layer 2, and a sealant layer, characterized in that the sealant layer comprises one resin layer or a laminate of two or more resin layers comprising metallocene linear low-density polyethylene.

23. The packaging material for a battery according to claim 22, characterized in that the sealant layer is formed of a metallocene linear low-density polyethylene resin.

24. The packaging material for a battery according to claim 22, characterized in that the sealant layer is formed of a polyethylene resin containing not less than 10% of a metallocene linear low-density polyethylene resin.

25. The packaging material for a battery according to claim 22, characterized in that the sealant layer has a multilayer structure comprising at least a layer formed of a metallocene linear low-density polyethylene resin.

26. The packaging material for a battery according to claim 22, characterized in that the sealant layer has a multilayer structure comprising a polyethylene resin layer containing not less than 10% of a metallocene linear low-density polyethylene resin.

27. The packaging material for a battery according to claim 22, characterized in that the adhesive layer 2 has been formed by dry lamination.

28. The packaging material for a battery according to claim 22, characterized in that the adhesive layer 2 is an acid-modified polyolefin coating-baked layer.

29. The packaging material for a battery according to claim 22, characterized in that the adhesive layer 2 is an extruded layer of an acid-modified polyolefin.

* * * * *